United States Patent
Campbell et al.

(10) Patent No.: US 6,856,970 B1
(45) Date of Patent: Feb. 15, 2005

(54) ELECTRONIC FINANCIAL TRANSACTION SYSTEM

(75) Inventors: Eric Campbell, Plandome, NY (US); Maris Norbert Lemanis, Smithtown, NY (US); Robert F. Hoffman, Auburndale, NY (US); Eve Renee Nebenhaus, Manhasset, NY (US)

(73) Assignee: Bottomline Technologies, Portsmouth, NH (US)

( * ) Notice: Subject to any disclaimer, the term of this patent is extended or adjusted under 35 U.S.C. 154(b) by 769 days.

(21) Appl. No.: 09/670,266

(22) Filed: Sep. 26, 2000

(51) Int. Cl.[7] .............................................. G06F 17/60
(52) U.S. Cl. .......................................... 705/35; 705/37
(58) Field of Search ...................... 705/35–42; 709/224, 709/228, 331, 332; 707/9, 10, 102, 103, 516

(56) References Cited

U.S. PATENT DOCUMENTS

| | | | |
|---|---|---|---|
| 5,262,942 A | | 11/1993 | Earle |
| 5,729,594 A | * | 3/1998 | Klingman ..................... 705/35 |
| 5,809,483 A | | 9/1998 | Broka et al. |
| 5,815,657 A | | 9/1998 | Williams et al. |
| 5,890,140 A | | 3/1999 | Clark et al. |
| 5,913,202 A | | 6/1999 | Motoyama |
| 6,023,684 A | * | 2/2000 | Pearson ........................ 705/35 |
| 6,105,012 A | * | 8/2000 | Chang et al. .................. 705/64 |
| 6,141,699 A | * | 10/2000 | Luzzi et al. ................. 709/331 |
| 6,151,588 A | | 11/2000 | Tozzoli et al. |
| 6,505,175 B1 | | 1/2003 | Silverman et al. |

FOREIGN PATENT DOCUMENTS

| | | | | |
|---|---|---|---|---|
| JP | 57101980 A | * | 6/1982 | .................. 705/35 |

OTHER PUBLICATIONS

PR Newswire, "Horsepower.com Escro.com Announce Alliance to Offer Escrow and Transaction Management Services on Agricultural Website", Aug. 10, 2000.*

* cited by examiner

Primary Examiner—Richard Chilcot

(57) ABSTRACT

A financial transaction system consistent with the invention allows clients of a financial institution to use a web-based workstation to interface with a plurality of back office systems within one or more financial institutions. In an exemplary embodiment, a financial transaction system comprises a hub server, a plurality of financial institutions, at least one web server, and at least one database server. The hub server receives data in the form of a plurality of disparately formatted instructions and communicates the instructions to the financial institutions, which are connected to the hub server for receiving the data and have a plurality of differing reception formats to receive the reformatted data. Data is transmitted between the web server and at least one user via a network interface, and between the web server and the hub server. The web server stores data and at least one application in an application database. Data is transmitted between the database server, the hub server, and the web server, and is stored in a hub database. The hub server maps data received from the financial institutions and loads it onto the hub database. The web server receives the mapped data from the hub database, transmits it onto the application database, and permits the user to manipulate it using the application. In another exemplary embodiment, a method of executing a financial transaction consistent with the present invention comprises the steps of receiving into an application database an instruction to execute a financial transaction from at least one user using an application, receiving the instruction into a hub database, reformatting the instruction, and routing the reformatted instruction to at least one financial institution.

5 Claims, 42 Drawing Sheets

| Base Routing Table 1800 | | | | | | |
|---|---|---|---|---|---|---|
| Orig Group 1801 | Product 1802 | Type 1803 | Method 1804 | Amount 1805 | Curr 1806 | Dest Group 1807 |
| ABC | FT | Fed Wire | Free | 100,000 | USD | ABCP |
| ABC | FT | Fed Wire | Template | 1,000,000 | USD | ABCP |
| ABC | FT | SWIFT | Free | 10,000 | EUR | ABCP |
| ABC | LC | Commercial | Free | 100,000 | GBP | ABCP |
| ABC | ST | Buy/Sell | Free | 100,000 | CAN | ABCP |

Figure 18

| Account Routing Override 1900 | | | |
|---|---|---|---|
| Orig Group 1901 | Product 1902 | Account 1908 | Dest Group 1907 |
| ABC | FT | 123456 | ABC2 |

Figure 19

| Base Routing Record 2000 | |
|---|---|
| Product 2001 | Destination 2002 |
| FT | HOST1 |
| ST | HOST4 |
| LC | HOST5 |

Figure 20

| Branch Override 2100 | | |
|---|---|---|
| Product 2101 | Branch 2102 | Destination 2103 |
| FT | New York | HOST2 |

Figure 21

| Type Override 2200 | | | |
|---|---|---|---|
| Product 2201 | Branch 2202 | Type 2203 | Destination 2204 |
| FT | New York | SWIFT | HOST3 |

Figure 22

| Sub Type Override 2300 | | | | |
|---|---|---|---|---|
| Product 2301 | Branch 2302 | Type 2303 | Sub Type 2304 | Destination 2305 |
| FT | New York | SWIFT | Cancel | NYBranch User Group |

Figure 23

| Action Code 2901 | Action Description 2902 | Action Qualifer 2903 | Action Details 2904 |
|---|---|---|---|
| LOGON | Logon Successful | Web or Wktation | None |
| LFAILG | Bad Group Code | Web or Wktation | Group Code Entered |
| LFAILU | Invalid User ID | Web or Wktation | User ID Entered |
| LFAILP | Invalid Password | Web or Wktation | None |
| LOGOFF | User Logs Off | Web or Wktation | None |
| TIMEOUT | User Times Out | Web or Wktation | None |
| UGMAINT | User Group Maintenance | None | Add, Change, Delete User Group Code Old Value and New Value |
| SGMAINT | Security Group Maintenance | None | Add, Change, Delete Security Group Code Old Value and New Value |
| UMAINT | User Maintenance | None | Add, Change, Delete Security Group Code Old Value and New Value |
| PASSCHG | Password Change | None | None |
| RPTREQ | Report Request | Product Code | Report Code |
| EXPREQ | Export Request | Product Code | Export Code |
| IMPORT | Transaction Import | Product Code | Import Code No. of Successful Trans. No. of Failed Trans. |
| TRAN | Transaction | Product Code | Add,Modify,Approve,Delete,Cancel Trans. Type and Trans. Number |
| TMAINT | Admin/Operations Table Maintenance | Table Name | Add, Change, Delete Table Maintenance Key Old Value and New Value |
| LSTART | Loader Starts | Identifier | Unique Name Assigned |
| LEND | Loader Ends | Identifier | Records Loaded |
| ALSTART | App Loader Starts | Identifier | None |
| ALEND | App Loader Ends | Identifier | Records Transferred |
| DLR | Download Request | Message Class | Time Stamp |
| DLC | Download Completes | Message Class | Download Records |
| DLA | Download Aborts | Message Class | None |
| WSI | Workstation Inst. | Product | Type and Message Image |

Figure 29

| Reports | | | | | |
|---|---|---|---|---|---|
| Standard Report | | | | | |
| Ad-Hoc Report | | | | | |
| Profile Report | | | | | |
| Main Menu | | | | | |
| Logoff | | | | | |

ICM — Preview

Interim Transaction – Summary Report          Report Date: 1 Oct 99 ←3600

Company ID:         COMPB ←3601
Company Name:       Company B ←3602
Company Number:     456204820934 ←3603
Currency:           USD ←3604
                    ↑3605

| Value Date | Tran Type | OR/CR | Amount | Account Owner's Ref |
|---|---|---|---|---|
| | ↑3606 | ↑3607 | ↑3608 | ↑3609 |
| Post Date:2 Nov 98 | | | | |
| 2 Nov 98 | NTRF | CR | 814,729.42 | NONREF ←3650 |
| 2 Nov 98 | NTRF | CR | 700.00 | IBMOT8102433 |
| 25 Oct 98 | NTRF | CR | 2,940.00 | AZILV3656 |
| 2 Nov 98 | NTRF | CR | 120.00 | 90828342034 |
| 2 Nov 98 | NTRF | CR | 40.00 | 2084298723 |
| 2 Nov 98 | NTRF | CR | 125.00 | VERDEGRS312 |
| 2 Nov 98 | NTRF | CR | 800.00 | 23484572 |
| 2 Nov 98 | NTRF | CR | 1,000.00 | 20948395 |
| 2 Nov 98 | NTRF | CR | 1,300.00 | 923402523 |
| 2 Nov 98 | NTRF | CR | 1,000.00 | 239860234 |
| 2 Nov 98 | NTRF | CR | 800.00 | 2302345 |

↑3514

Sort | OK | Reset

Figure 36

| Tran Ref Num | ST. Rst | Tran Date | Mail Date | Branch | Account | Dest Matt | Acct Title | Amount | Curr |
|---|---|---|---|---|---|---|---|---|---|
| 1,033 | EN | 25 Oct 99 FEDWIRE | 25 Oct 99 | SSBBOS | 23457023 | abc | | 814,729.42 | USD |
| 1,034 | BC | 25 Oct 00 SWIFT | 25 Oct 00 | SSDBOX | 98398273 | aaaaa | Company C | 2,940.00 | USD |
| 1,035 | BC | 25 Nov 00 FEDWIRE | 25 Nov 00 | SSBBOX | 2347985B | 2345 | 0948023 Security | 40.00 | USD |
| 1,036 | EN | 26 Oct 99 FEDWIRE | 26 Oct 99 | SSBBOX | 2345BS35 | eric | 09283405BNST | 800.00 | USD |
| 1,037 | BC | 26 Oct 00 SWIFT | 26 Oct 00 | SSBBOX | 2345098C | dddd | 08950232MTGH | 1,300.00 | USD |
| 1,038 | BC | 26 Nov 00 SWIFT | 26 Nov 00 | SSBBOX | 98WE234 | end | 9870293450HG1 | 1,000.00 | USD |
| 1,039 | BC | 26 Dec 00 | 26 Dec 00 | SSBBOX | 1230IEFZ | | 88457692HDYE | 800.00 | USD |

Figure 37

Reports

Standard Report

Ad-Hoc Report

Profile Report

Main Menu

Logoff

ICM

Preview | Preview 1 of 125  100%  4567 ~3902  ~3901

~3900

Company ID: COMPA
Company Name: Company A
Account Number: 456204820934
Currency: USD

| Value Date | Tran Type | OR/CR | Amount | Account Owner's Ref |
|---|---|---|---|---|
| 2 Nov 98 | NTRF | CR | 814,729.42 | NONREF |
| 2 Nov 98 | NTRF | CR | 700.00 | IBMOT8102433 |
| 25 Oct 98 | NTRF | CR | 2,940.00 | AZILV3656 |
| 2 Nov 98 | NTRF | CR | 120.00 | 90828342034 |
| 2 Nov 98 | NTRF | CR | 40.00 | 20842298723 |
| 2 Nov 98 | NTRF | CR | 125.00 | VERDEGRS312 |
| 2 Nov 98 | NTRF | CR | 800.00 | 23484572 |
| 2 Nov 98 | NTRF | CR | 1,000.00 | 209483395 ~3903 |
| 2 Nov 98 | NTRF | CR | 1,300.00 | 9234402523 |
| 2 Nov 98 | NTRF | CR | 1,000.00 | 239860234 |
| 2 Nov 98 | NTRF | CR | 800.00 | 2302345 |

Sort | OK | Reset ~3904

Figure 39

ELECTRONIC FINANCIAL TRANSACTION SYSTEM

BACKGROUND OF THE INVENTION

1. Field of the Invention

The present invention relates to a system and method for electronic financial transactions, and more particularly, to a web browser-based system for the execution of transactions by clients of a financial institution.

2. Brief Description of Related Art

Corporate and individual clients of banks and other financial institutions have traditionally accessed the electronic cash management systems of their banks by phone, fax, or dumb terminal at the low end of the service spectrum, and by Microsoft Windows™ or DOS-based workstations at the high end. Recently, there has been an increase in the popularity of banking on the World Wide Web, as more and more businesses and individuals are recognizing the benefits of performing online transactions over the ever-growing internet. With the recent explosion in e-commerce, the increasing acceptance of the Internet as a less expensive and more efficient way of doing business, and the advent of new server technology and sophisticated online security systems, online banking by both businesses and individuals is becoming ever more common. Banks desiring to stay competitive must therefore provide to their clients internet-based electronic cash management (ECM) services. According to a 1997 research study, most banks predicted that within a year they would be providing browser-based electronic banking services to their corporate and institutional clients. Despite the increased customer demand for such services, less than 2% of banking services were provided via a web browser, according to research in 1999. It has been predicted that by 2005, electronic transaction-based cash management revenue will reach $12.8 billion.

One hurdle to implementing unified browser-based ECM has been the wide range of hardware and software systems used by financial institutions. Even within a single financial institution, multiple hardware and software systems have made integration difficult. During the microcomputer revolution of the early 1980s, in which computers started becoming smaller, faster and less expensive, financial institutions raced to install "treasury workstations" into their top clients' offices, resulting in enormous outlays. The treasury workstations included terminals or microcomputers directly linked to back office systems in the corresponding financial institution, so that clients of the financial institutions could perform many banking and other financial transactions on-site. Such workstations performed functions such as corporate funds transfer, international funds transfer, balance and transaction reporting, securities management, and bank relationship management. Toward the late 1980s, banks and other financial institutions became unable to justify the huge expense of developing and re-developing these treasury workstations, which, although a boon to their clients, did not directly increase the revenue of the financial institutions. Thus, in order to increase their own business, the financial institutions ended up buying, borrowing, and developing new workstations focused on increasing the volume of bank core transactions, including elaborate PC front ends for funds transfer, letters of credit, securities, commercial paper, FX, and account reporting. Some of the larger financial institutions ended up with many different systems, each performing similar or identical functions. The new workstations included, for example, "letter of credit" workstations, "commercial paper issuance" workstations, "custody" workstations, and "balance and transaction reporting" workstations. Despite the availability of these new workstations, however, many financial institutions and their clients continued to use the older treasury workstations, often still using dumb terminal systems developed in the late 1970s and early 1980s. The decentralization of client-delivery systems was deliberate and resulted in speed-to-market advantages. Unfortunately, costs were now escalating due to duplication of development and support organizations. Moreover, clients ended up with many different systems, passwords and technologies just to deal with the same financial institution, whereby the financial institution appeared disorganized and fragmented to the client. There is thus a need to integrate multiple data sources and a variety of workstation technologies, platforms and communications methods into a single point of access for the financial institution client.

SUMMARY OF THE INVENTION

By providing financial institution clients with a single point of access, clients can use one workstation to interface to any back office system within a financial institution, thus eliminating the multitude of user interfaces and passwords and the management thereof. By providing financial institution clients with web browser-based access, the particular technology used by the clients and the geographic circumstances of the clients are no longer hurdles to an effective financial transaction system. Moreover, since the end user access to and operation of the present invention is embodied in a standard browser-based interface, user training, service and upgrade requirements are kept to a minimum on the financial institution client/user side.

It is therefore an object of the present invention to provide an electronic financial transaction system which is accessible via a standard web browser.

Another object of the present invention is to provide an electronic financial transaction system with failsafe backup and archival capabilities.

A further object of the present invention is to provide an electronic financial transaction system with reduced training time and costs.

Yet a further object of the present invention is to provide an electronic financial transaction system with a single point of access for all services.

Still another object of the present invention is to provide an electronic financial transaction system capable of reporting and instruction across multiple financial institutions, thereby eliminating the need for a separate access system for each financial institution with which a client transacts business.

Still a further object of the present invention is to provide an electronic financial transaction system delivering immediate online access to data.

Still yet a further object of the present invention is to provide an electronic financial transaction system with data import and export capabilities to reduce or eliminate the need for information to be re-keyed.

Still yet another object of the present invention is to provide an electronic financial transaction system with advanced workflow management and security features.

In one embodiment, a financial transaction system is provided comprising at least one financial institution, at least one hub server, at least one web server, at least one database server. The hub server is operable to transmit data to and receive data from the financial institution. The web server is operable to transmit data to and receive data from at least one user via a network interface and is operable to transmit data to and receive data from the hub server. The web server is also capable of storing data and at least one application in an application database. The database server is operable to transmit data to and receive data from the hub server and the web server and is capable of storing data in a hub database. The hub server is also operable to map data received from the financial institution into mapped data and load the mapped data onto the hub database. The web server is also operable to receive the mapped data from the hub database, transmit the mapped data onto the application database, and permit the user to manipulate the mapped data using the application.

In another embodiment, a financial transaction system is provided comprising a hub server, a plurality of financial institutions, at least one web server, and at least one database server. The hub server is operable to receive data in the form of a plurality of disparately formatted instructions and to communicate the instructions to the plurality of financial institutions. The plurality of financial institutions are connected to the hub server for receiving the data and have a plurality of differing reception formats to receive the reformatted data. The web server is operable to transmit data to and receive data from at least one user via a network interface and also to transmit data to and receive data from the hub server. The web server is further capable of storing data and at least one application in an application database. The database server is operable to transmit data to and receive data from the hub server and the web server and is capable of storing data in a hub database. The hub server is further operable to map data received from the financial institutions into mapped data and load the mapped data onto the hub database. The web server is further operable to receive the mapped data from the hub database, transmit the mapped data onto the application database, and permit the user to manipulate the mapped data using the application. In this embodiment, at least one financial instruction of the data is in a different format from the reception format.

In another embodiment, a method of executing a financial transaction consistent with the present invention comprises the steps of: receiving into an application database an instruction to execute a financial transaction from at least one user using an application, receiving the instruction into a hub database, reformatting the instruction, and routing the reformatted instruction to at least one financial institution.

BRIEF DESCRIPTION OF THE DRAWINGS

FIG. 18 is a base routing table in an exemplary configuration of the remote approval routing mechanism in one embodiment of a financial transaction system consistent with the present invention;

FIG. 19 is an account routing override table in an exemplary configuration of the remote approval routing mechanism in one embodiment of a financial transaction system consistent with the present invention;

FIG. 20 is a base routing record table in an exemplary configuration of the remote approval routing mechanism in one embodiment of a financial transaction system consistent with the present invention;

FIG. 21 is a branch override table in an exemplary configuration of the remote approval routing mechanism in one embodiment of a financial transaction system consistent with the present invention;

FIG. 22 is a type override table in an exemplary configuration of the remote approval routing mechanism in one embodiment of a financial transaction system consistent with the present invention;

FIG. 23 is a subtype override table in an exemplary configuration of the remote approval routing mechanism in one embodiment of a financial transaction system consistent with the present invention;

FIG. 29 is a table illustrating action codes, action qualifiers, and action details employed in the audit trail log in one embodiment of a financial transaction system consistent with the present invention;

FIG. 36 is an exemplary screen view of an interim transaction summary report in one embodiment of a financial transaction system consistent with the present invention;

FIG. 37 is an exemplary screen view of a summary funds transfer status report in one embodiment of a financial transaction system consistent with the present invention;

FIG. 39 is an exemplary screen view of a searchable report in one embodiment of a financial transaction system consistent with the present invention;

Figure 1:
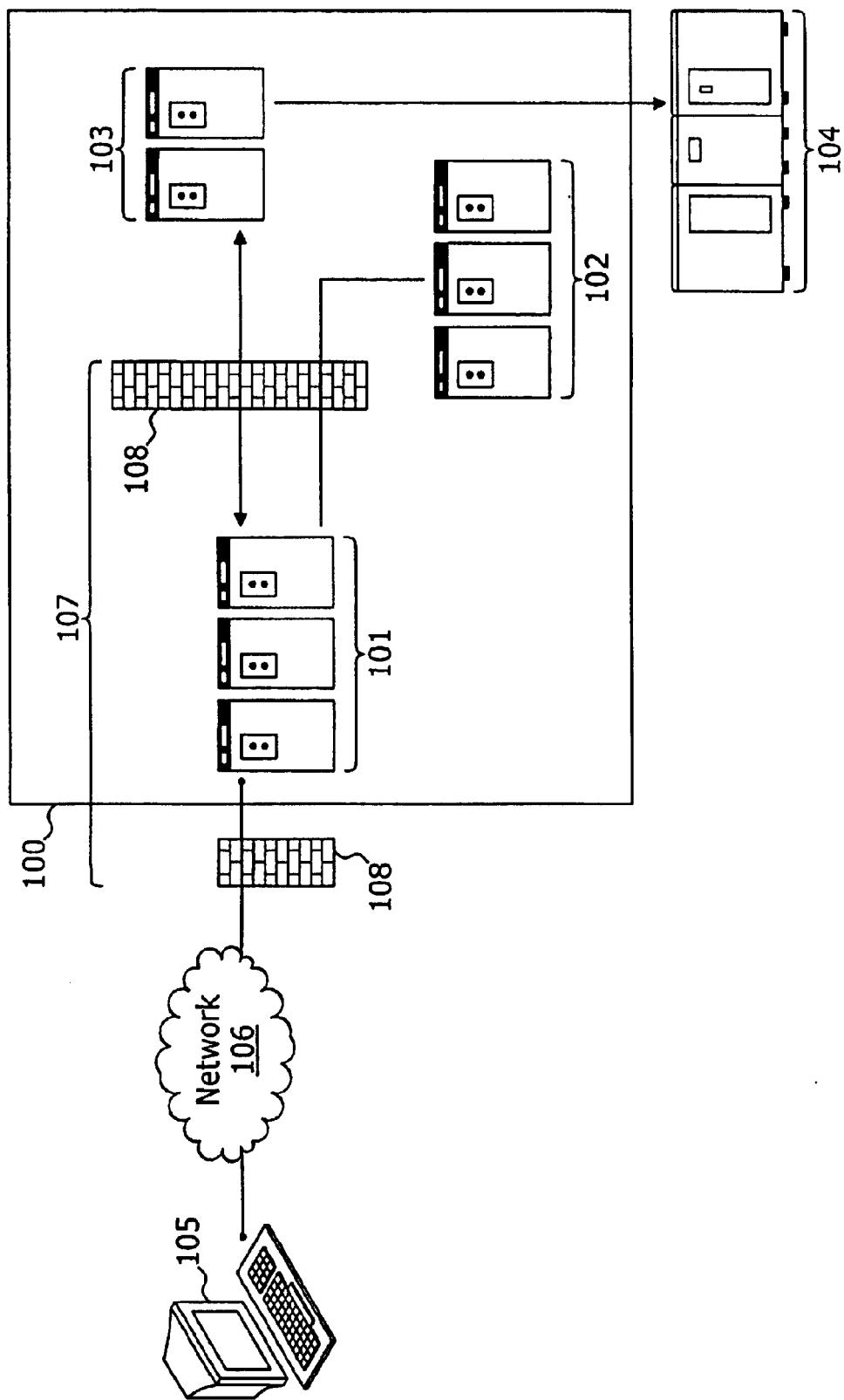
FIG. 1 is a system-wide view of one embodiment of a financial transaction system consistent with the present invention.

It will be appreciated by those skilled in the art that although the following Detailed Description will proceed with reference being made to preferred embodiments, the present invention is not intended to be limited to these embodiments. For example, it should be understood from the outset that although preferably the functional components of the preferred embodiments of the system of the present invention are embodied as one or more distributed computer program processes, data structures, dictionaries or other stored data on one or more conventional general purpose computers (e.g. IBM-compatible, Apple Macintosh, and/or RISC microprocessor-based computers), mainframes, minicomputers, conventional telecommunications (e.g. modem, DSL, satellite and/or ISDN communications), memory storage means (e.g. RAM, ROM) and storage devices (e.g. computer-readable memory, disk array, direct access storage) networked together by conventional network hardware and software (e.g. LAN/WAN network backbone systems and/or Internet), other types of computers and network resources may be used without departing from the present invention.

The invention as described herein may be embodied in a computer residing on a network transaction server system, and input/output access to the invention may comprise appropriate hardware and software (e.g. personal and/or mainframe computers provisioned with Internet wide area network communications hardware and software (e.g. CQI-based, FTP, Netscape Navigator™ or Microsoft Internet Explorer™ HTML Internet browser software, and/or direct real-time TCP/IP interfaces accessing real-time TCP/IP sockets) for permitting human users to send and receive data, or to allow unattended execution of various operations of the invention, in real-time and/or batch-type transactions. Likewise, it is preferred that the system of the present invention be a remote internet-based server accessible through conventional communications channels (e.g. conventional telecommunications, broadband communications, wireless communications) using conventional browser software (e.g. Netscape Navigator™ or Microsoft Internet Explorer™). Thus, the present invention is preferably appropriately adapted to include such communication functionality and internet browsing ability. Additionally, those skilled in the art will recognize that the various components of the server system of the present invention can be remote from one another, and may further comprise appropriate communications hardware/software and/or LAN/WAN hardware and/or software to accomplish the functionality herein described.

Preferably, each of the functional components of the present invention are embodied as one or more distributed computer program processes running on one or more conventional general purpose computers networked together by conventional networking hardware and software. Most preferably, each of these functional components is embodied by running distributed computer program processes (e.g., generated using "full-scale" relational database engines such as IBM DB2™, Microsoft SQL Server™, Sybase SQL Server™, Oracle 7.3 ™, or Oracle 8.0™ database managers, and/or a JDBC interface to link to such databases) on networked computer systems (e.g. comprising mainframe and/or symmetrically or massively parallel computing systems such as the IBM SB2™ or HP 9000™ computer systems) including appropriate mass storage, networking, and other hardware and software for permitting these functional components to achieve the stated function. Preferably, these computer systems are geographically distributed and connected together via appropriate wide- and local-area network hardware and software. In one embodiment, program data can be made accessible to the user via standard SQL queries for analysis and reporting purposes.

Primary elements of the invention can be server-based and can reside on hardware supporting an operating system such as Microsoft Windows NT/2000™ or UNIX. Clients can include a PC that supports Apple Macintosh™, Microsoft Windows 95/98/NT/ME/2000™, a UNIX Motif workstation platform, or other computer capable of TCP/IP or other network-based interaction. In a preferred embodiment, no software other than a web browser is required on the client platform.

Alternatively, the aforesaid functional components may be embodied by a plurality of separate computer processes (e.g. generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as is necessary to permit these functional components to achieve the stated functionalities. In this alternative configuration, since such personal computers typically are unable to run full-scale relational database engines of the types presented above, a non-relational flat file "table" (not shown) may be included in at least one of the networked personal computers to represent at least portions of data stored by a system according to the present invention. Preferably, these personal computers run the Unix, Microsoft Windows NT/2000™ or Windows 95/98/ME™ operating system. The aforesaid functional components of a system according to the present invention may also comprise a combination of the above two configurations (e.g. by computer program processes running on a combination of personal computers, RISC systems, mainframes, symmetric or parallel computer systems, and/or other appropriate hardware and software, networked together via appropriate wide- and local-area network hardware and software).

A system according to the present invention may also be part of a larger computerized financial transaction system comprising multi-database or multi-computer systems or "warehouses" wherein other data types, processing systems (e.g. transaction, financial, administrative, statistical, data extracting and auditing, data transmission/reception, and/or accounting support and service systems), and/or storage methodologies may be used in conjunction with those of the present invention to achieve an overall information management, processing, storage, search, statistical and retrieval solution for a particular lock box service provider, e-payment warehouser, biller organization, financial institution, payment system, commercial bank, and/or for a cooperative or network of such systems.

As those in the art will recognize, another possible embodiment of the invention includes two-way data encryption and digital certification for data being input and output, to provide security to data during transfer. A further embodiment may comprise security means including one or more of the following: password or PIN number protection, use of a semiconductor, magnetic or other physical key device, biometric methods (including fingerprint, nailbed, palm, iris, or retina scanning, handwriting analysis, handprint recognition, voice recognition, or facial imaging), or other log-on security measures known in the art.

In a preferred embodiment, source code is written in an object-oriented programming language using relational databases. Such a preferred embodiment includes the use of programming languages such as C++.Other programming languages which can be used in constructing a system according to the present invention include Java, HTML, Perl, UNIX shell scripting, assembly language, Fortran, Pascal, Visual Basic, and QuickBasic. Those skilled in the art will recognize that the present invention may be implemented in hardware, software, or a combination of hardware and software.

The translation or mapping of EDI-type financial data, particularly of the X12, UN/EDIFACT, and NACHA formats, as discussed herein, is provided herein only as an example of transaction data capable of interacting with the invention and should not be construed so as to limit the use of the invention solely in such a setting. While the discussion herein presumes the use of the invention with respect to EDI, transactional, or financial data, it is anticipated that the invention may have utility in other contexts, as well.

DETAILED DESCRIPTION OF THE DRAWINGS

System Overview

In a preferred embodiment of the present invention, a financial transaction system is provided which is accessible to the end user client of one or more financial institutions via a web browser or workstation, and which is readily capable of integration with a plurality of back-office systems in the financial institution. Alternate embodiments of the present invention may include features such as failsafe backup and archival capabilities, reporting and instruction capabilities, data import and export capabilities, and advanced workflow management and security features. The financial institution client may utilize the present invention to execute virtually any financial transaction at the financial institution, including balance and transaction reporting, lockbox reporting, controlled disbursements, positive pay, check imaging, stop payments, and electronic funds transfer instruction. A system according to the present invention thus provides the financial institution client complete access to cash management, trade finance and securities processing capabilities through a single browser-based application.

With reference now to FIG. 1, one embodiment of a financial transaction system 100 consistent with the present invention includes a plurality of web servers 101, a plurality of database servers 102, and a plurality of hub servers 103. The web servers are located in a secured zone 107 between two firewalls 108, one for protecting the bank's network and one for blocking unauthorized internet access. This zone is often referred to idiomatically as a DMZ (i.e. "de-militarized zone"). It is noted that one or more firewalls may be placed between any one of a number of components of the present invention for security purposes. Using a web browser 105, a client can access the web servers 101 across a network 106. The web browser 105 can be a program such as Netscape Navigator™ or Microsoft Internet Explorer™ HTML Internet browser software, or can be one or more direct real-time or batch-controlled interfaces accessing real-time TCP/IP or other network type sockets. The network 106 can be a local area network, wide area network, internet, intranet, extranet, proprietary network, virtual private network, a TCP/IP-based network, a wireless network, an e-mail based network of e-mail transmitters and receivers, a modem-based telephonic network, an interactive telephonic network accessible to users by telephone, or a combination of one or more of the foregoing. The web servers 101 are configured to transmit data to and receive data from the hub servers 103 and the database servers 102. The hub servers 103 are also configured to transmit data to and receive data from the database servers 102 and the back office environment of a financial institution 104.

Figure 2:
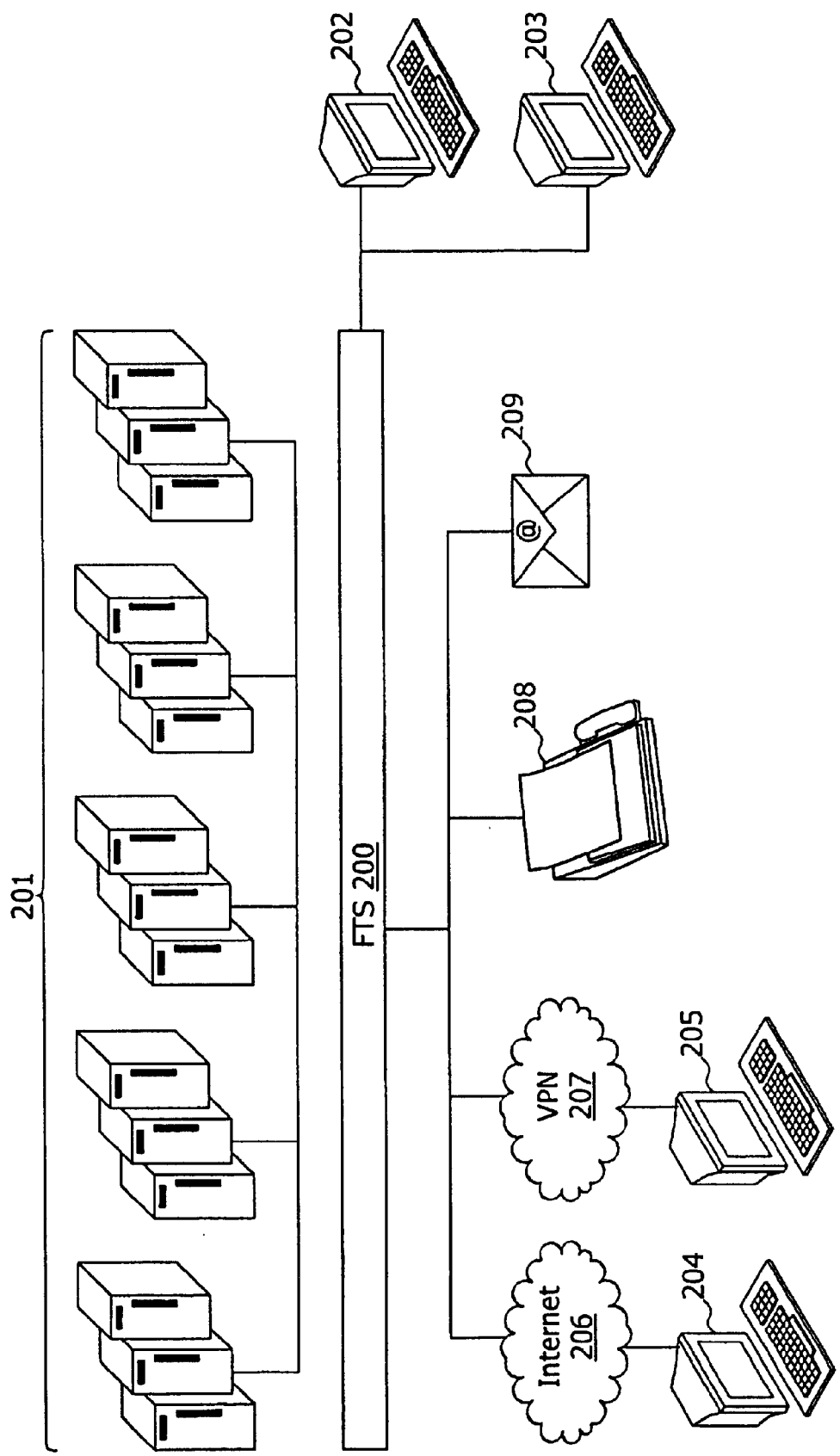
FIG. 2 is a system-wide view of one embodiment of a financial transaction system consistent with the present invention.

Turning now to FIG. 2, a system-wide view of an embodiment of a financial transaction system 200 consistent with the present invention is shown. System 200 transmits data to and receives data from a plurality of data sources 201 in an financial institution, embodied in a variety of workstation technologies, platforms and communications methods (e.g. DDA, ACH, trust, SWIFT, Trade Finance, and EDI/FEDI). An end user, i.e. the client of the financial institution, can access system 200 through the internet 206 using a web browser 204, and/or through a virtual private network (VPN) 207 using a web browser 205. An end user can also receive financial transaction data via fax 208 or e-mail 209. Administration and maintenance of server 200 can be performed either locally or remotely, using a web browser 202 and/or an operations console 203.

Figure 3:
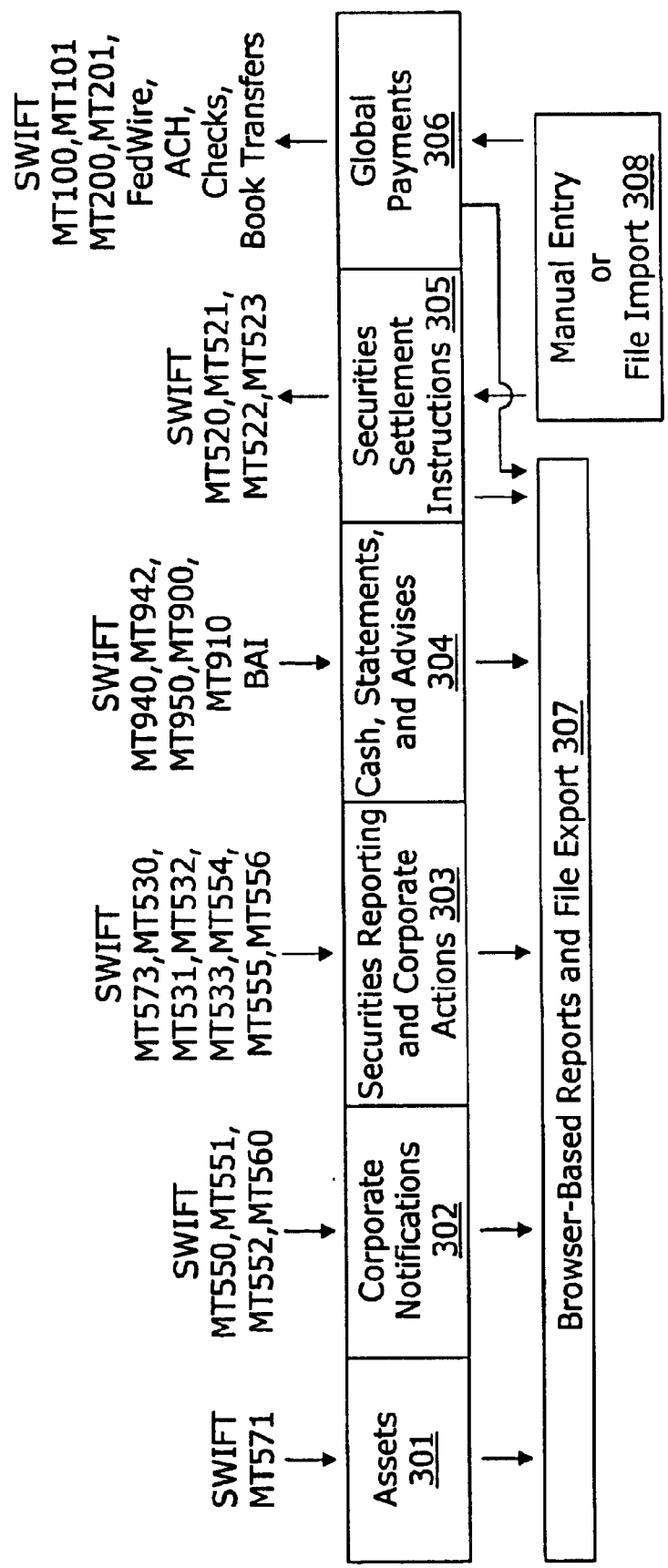
FIG. 3 is a flow diagram illustrating input and output data formats in one embodiment of a financial transaction system consistent with the present invention.

FIG. 3 is a flow diagram illustrating input and output data formats in one embodiment of a financial transaction system consistent with the present invention. Statements of assets 301, corporate notifications 302, securities reporting and corporate actions 303, and cash statements and advices 304 may be received in the form of SWIFT or BAI messages and are output to one or more browser-based reports and/or export files 307. Securities settlement instructions 308 and global payments 306 may also be received via manual entry and/or one or more import files 308 and are output in the form of SWIFT, Fed Wire, ACH, checks, and/or book transfers, or alternatively, to one or more browser-based reports and/or export files 307.

Figure 4:
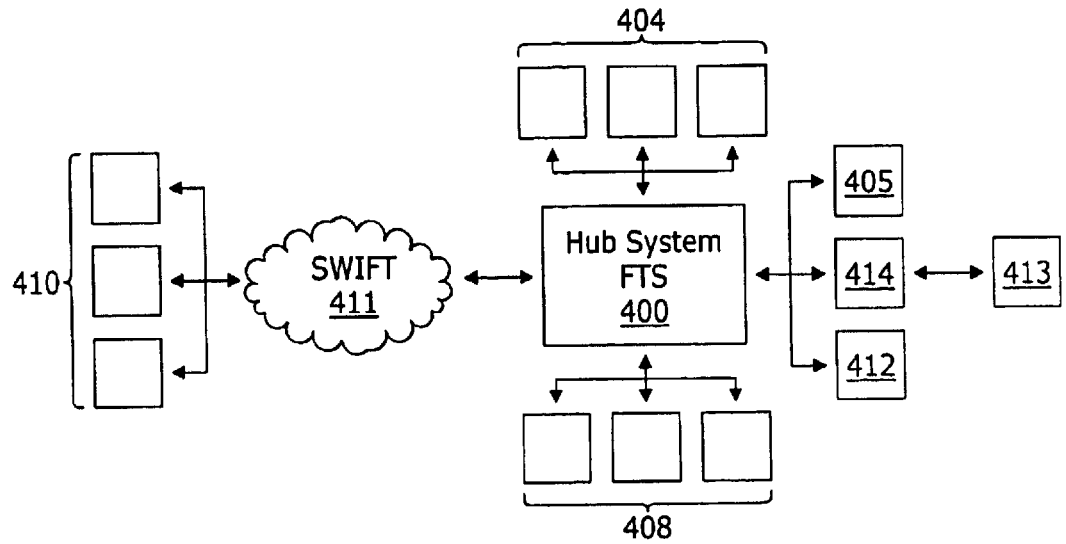
FIG. 4 is a system-wide view of one embodiment of a financial transaction system consistent with the present invention.

FIG. 4 is a system-wide view of one embodiment of a financial transaction system 400 consistent with the present invention. Using a web browser 405, an end user can access server 400, which can be linked to a plurality of back office hosts at one or more financial institutions 404. Branch workstations 408 can also be used to perform transactions using system 400, either by web browser or by direct connection to a server in system 400. The system 400 is preferably configured to transmit and receive SWIFT or other formatted messages 411 to and from a plurality of banks or financial institutions 410 other than financial institution(s) 404. One or more host or server computers or systems within the financial institution 412 may be linked directly to system 400. Alternatively, one or more host or server computers or systems within the financial institution 413 may be linked through integrated applications and/or a standardized user interface 414 to system 400. Thus, in this configuration, a client 405 can link to multiple banks 410 through SWIFT 411, and to multiple hosts 404 and/or host applications. A client 405 can send messages and files to internal workstations 408, and internal workstations 408 can send messages and files to clients 405. Also, clients 405 can have integrated applications and/or a standardized user interface 414 by connecting to the hub of system 400, or link directly to their hosts 413 using a PC workstation.

Administration, Information Recipient and Information Provider Access

Figure 7:
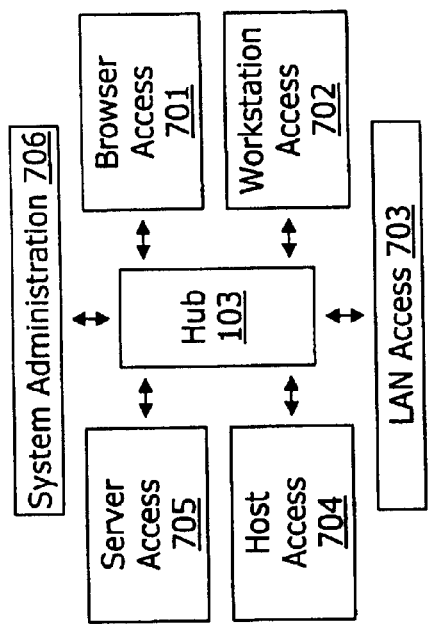
FIG. 7 is a flow diagram illustrating another example of both ownership-based and validation-based routing in one embodiment of a financial transaction system consistent with the present invention.

In a preferred embodiment, there are three classes of access to the hub server(s) 103: administration access, information provider access, and information recipient access. FIG. 7 shows various methods of access to a hub server 103, including browser access 701, workstation access 702, LAN access 703, host access 704, server access 705, and system administration access 706. Administration access 706 to the hub 103 is for configuration and monitoring purposes.

Administration access 706 includes provider and recipient access control (e.g. user groups, user IDs, passwords, host setup); data ownership setup (e.g. account setup, inter-group access control); routing rules (which transactions should be routed where, based on what factors, and into what format); remote approval rules (which transactions require further authorization from another site); transaction cutoff times (taking into consideration time zones, local holidays, and transaction characteristics); job scheduling (when batch operations should take place, how frequently, and what should happen based on different results); system alarms (configure which events should raise concern and what should be done if those events occur); transaction monitoring (tracking instruction transactions through their stages of execution); transaction inquiry (access to all data and what state it is in); audit trail (an independent log of all activity at the hub 103, which can be queried); and reference data maintenance (central tables that can be shared by some or all of the hub user community).

Figure 8:
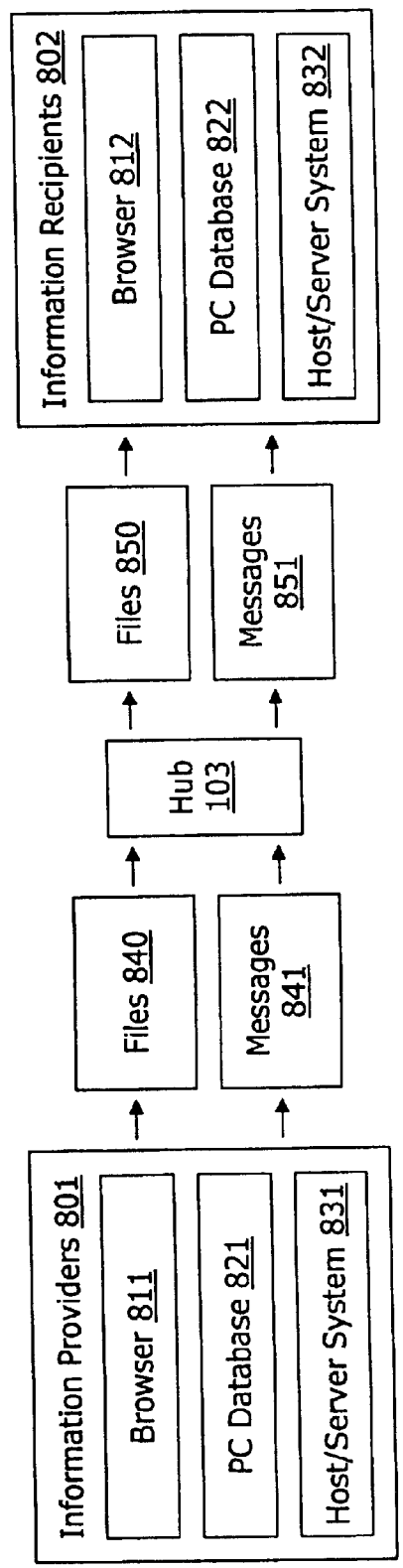
FIG. 8 is a flow diagram illustrating an example of information provider-information recipient data flow in one embodiment of a financial transaction system consistent with the present invention.

Information provider/information recipient data flow is shown in FIG. 8. Data is passed from information providers 801 to information recipient(s) 802 through hub 103. The information provider may comprise a web browser 811, a PC database 821, and/or a host/server system 831 for transmitting information to the hub 103.

The information recipient(s) 802 may comprise a web browser 812, a PC database 822, and/or a host/server system 832. Information recipient access relates to information either requested by the information recipient 802 or information automatically sent to the recipient 802. The information can be incremental in nature (i.e. receipt of all data since last transmission or request) or receipt of specific information, and is transmitted to the information recipient 802 in the form of files 850 or messages 851.

Information provider access relates to one or more information provider(s) 801 sending data to the hub 103 in the form of files 840 or messages 841. The hub 103 determines the recipient based on one of two routing methods: ownership (i.e. what party "owns" or is associated with the data) and validation (or "routing rules", i.e. which routing rule applies based on the characteristics of the transaction).

Web Server

Figure 31:
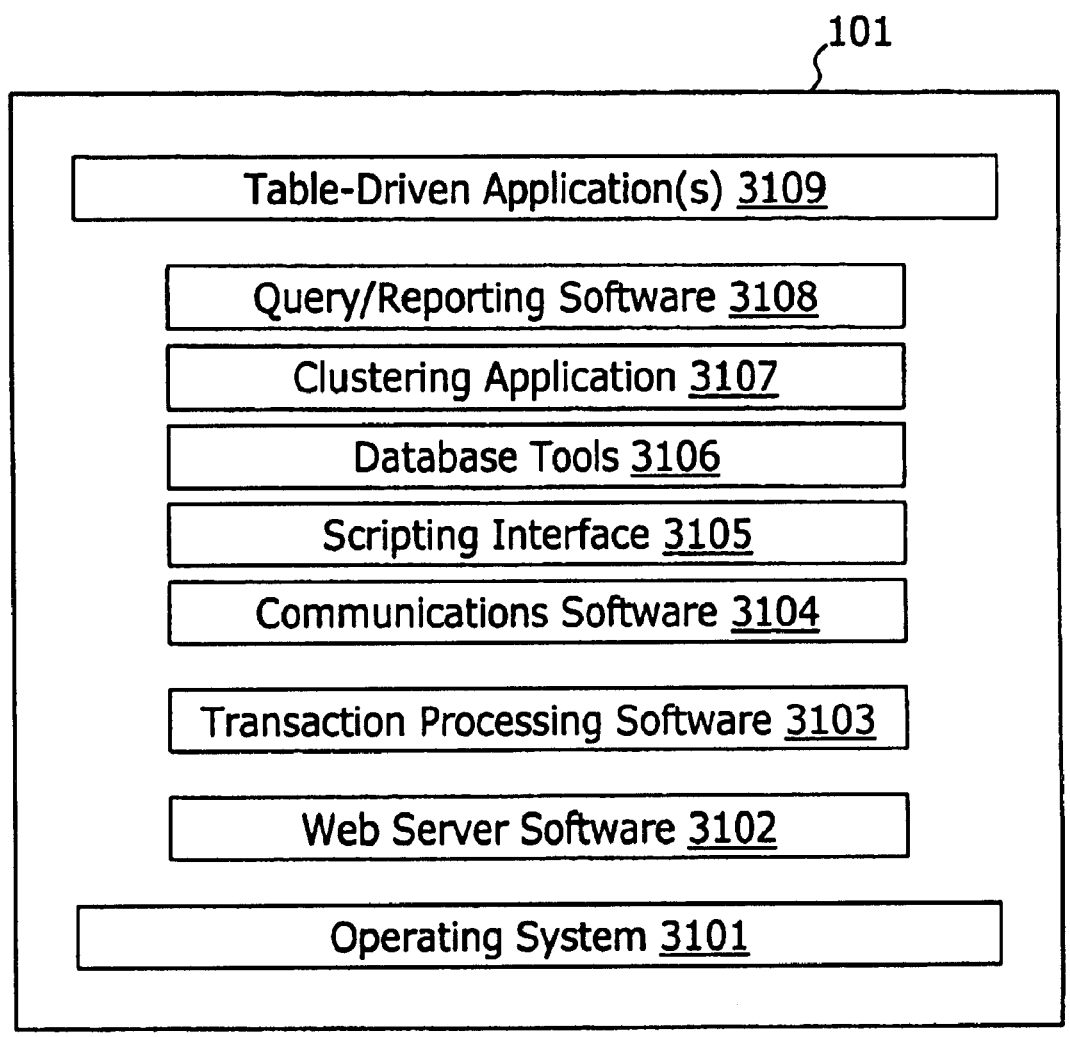
FIG. 31 is a graphic representation of the various components of the web server in one embodiment of a financial transaction system consistent with the present invention.

The web server preferably comprises a plurality of table-driven applications, whereby new products, applications, modules and/or transaction types may easily be integrated. FIG. 31 is a graphic representation of the various components of the web server 101 in one embodiment of the invention. Server 101 includes an operating system 3101 (e.g. Microsoft Windows NT™, Windows 2000™, or Sun Solaris™), web server software 3102 (e.g. Microsoft Internet Information Server™), transaction processing software 3103 (e.g. Microsoft Transaction Server™), communications software 3104, a scripting interface 3105 (e.g. Active Server Pages, or ASP), database tools 3106 (e.g. RogueWave™), query and/or reporting software 3108 (e.g. Seagate's Crystal Reports™), and one or more table-driven applications 3109. The transaction processing software 3103 is preferably a component-based transaction processing application for developing, deploying, and managing high performance, scalable, and robust enterprise, Internet, and intranet server applications, which defines an application programming model for developing distributed, component-based applications and provides a run-time infrastructure for deploying and managing these applications. The scripting interface 3105 is preferably a web interface to one or more databases. A clustering application 3107 may optionally be provided for load balancing and fail-over services to cluster distributed web servers into a single, high-performance, highly available environment of web server resources, thereby avoiding bandwidth, latency, and congestion problems and providing multi-server scalability for unlimited concurrent user access. The query and/or reporting software 3108 is preferably an application providing for an environment in which client reports and file download formats are easily customizable.

Database Server

The database server is an OLTP (on-line transaction processing) system, preferably embodied in an server, such as Microsoft SQL Server 7™, Oracle 8™, Sybase System 11™, DB2™, Informix™, or another ODBC-compliant database. The database server is preferably configurable for sharing with other applications, including access by a report writer application, and preferably comprises a distribution and replication protocol (DRP) device. A backup database server may also be provided, wherein some or all of the data on the database server is mirrored to the backup database server. In this configuration, in the event an application performing a transaction on the database server experiences failure, the application can start at the backup server location and proceed from the point of failure, thereby preserving transaction integrity.

Hub Server

Figure 12:
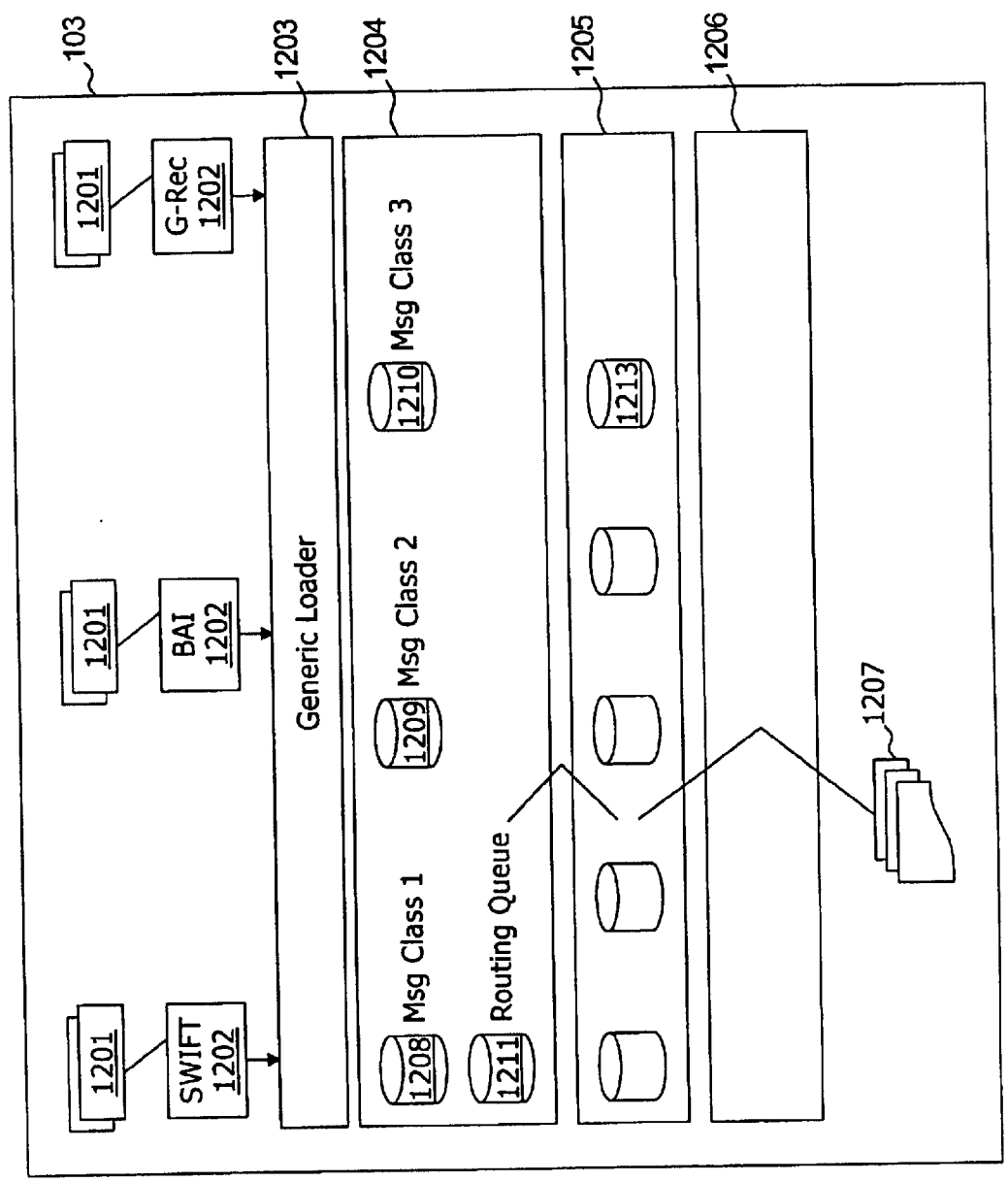
FIG. 12 is a component view of the hub server and its various modules in one embodiment of a financial transaction system consistent with the present invention.

Turning now to FIG. 12, the hub server (which handles integration with the back office of one or more financial institutions) and its various modules in a preferred embodiment of the invention are shown. Hub server 103 comprises a plurality of loading rules 1201, type-specific loaders 1202, a generic loader 1203, a hub data models 1204, a plurality of application databases 1205, application system and data tables 1206, and a report generator 1207. Loading rules 1201 (which may be written in a scripting language) define how a file will be loaded through the type-specific loaders 1202 to the generic loader 1203. Each type-specific loader 1202 (which may comprise object models, C++ code, and/or RogueWave™) is created to accommodate a specific file format (e.g. SWIFT, BAI, fixed format), and is linked to the generic loader 1203, which is maintained as part of the core system. Each of a plurality of hub data models 1204 (which are preferably in SQL database format) is created to handle various message classes 1208, 1209, 1210 into which information is written, as well as to define routing queues 1211 for those messages. (A routing queue contains pointers to messages as well as their destination user groups.) A plurality of application databases 1205 (which may be written in a scripting language) comprises a plurality of individual application databases 1213, each created to handle various application or product (e.g. letter of credit, securities instruction, etc.) types. Information that has been loaded is written to the databases 1205 based on the associated data models 1204. The application system and data tables 1206. (which are preferably in SQL database format) contain entries required to define an application/product and define its presentation. The report generator 1207 (which may be a database access and reporting application such as Seagate's Crystal Reports™) generates reports and/or views using information in the application databases 1205.

While the hub server is often referred to herein in the singular, a plurality of hub servers may be employed to process large quantities of batch data in narrow windows of time. It is appreciated by those skilled in the art that some or all the software/application modules and/or databases described herein as being located on one or more hub servers may alternatively be located on one or more web or other servers.

Figure 13:
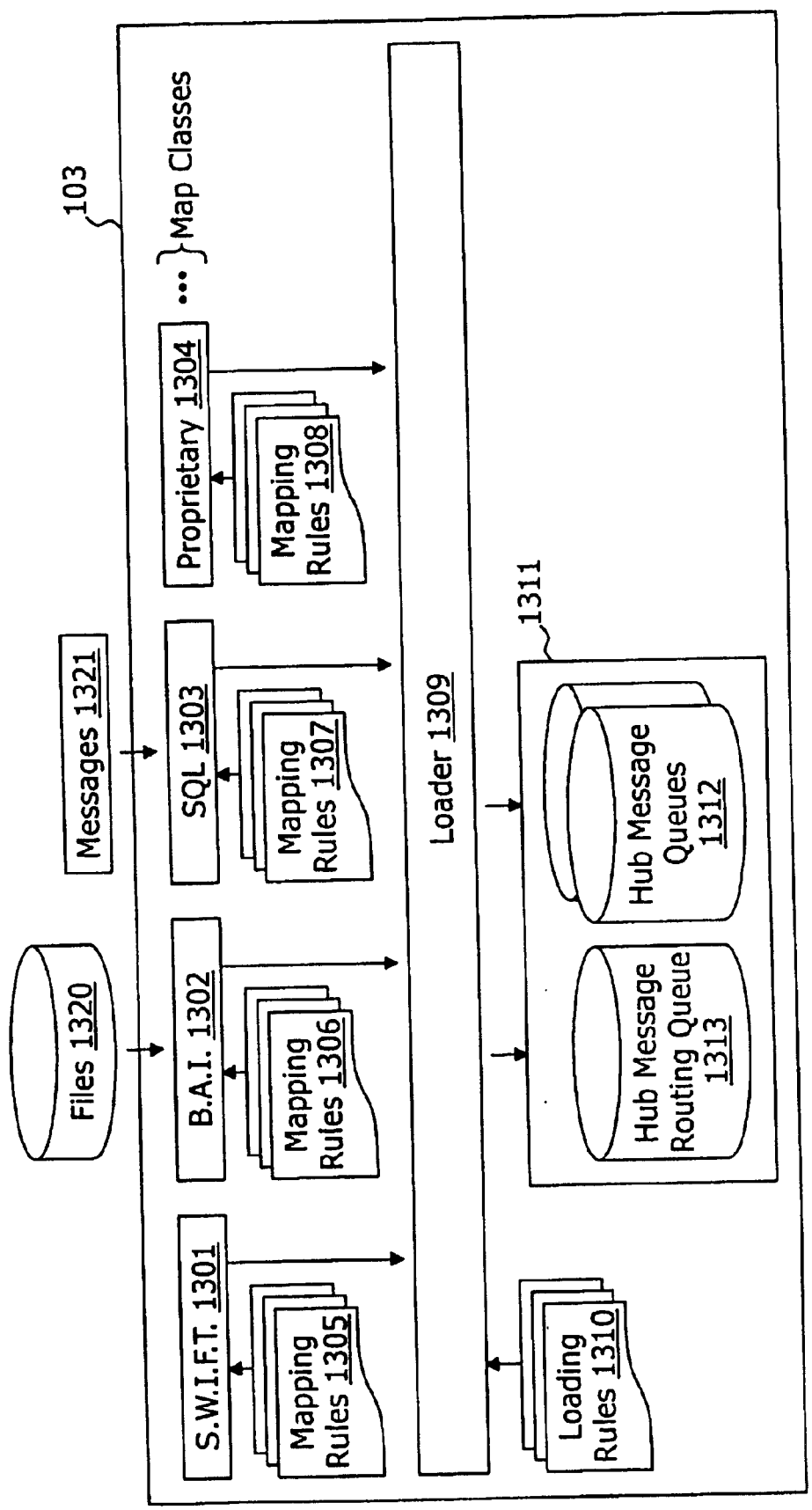
FIG. 13 is a component view of the hub server and its various modules in the loading process in one embodiment of a financial transaction system consistent with the present invention.

With reference now to FIG. 13, the hub server 103 in a preferred embodiment of the present invention is shown. The hub server 103 performs the functions of mapping and loading, and also handles threading and gatekeeping functions. The hub server 103 comprises a set of loaders 1301–1304 (also called reporting information mappers), which are multi-threaded processes allowing for the simultaneous loading of (often large) incoming files 1320, as well as messages 1321. It is noted that, while four loaders are depicted and described herein, any number of loaders of varying types may be used. In FIG. 13, each of the loader types 1301–1304 has a set of mapping rules 1305–1308, respectively, i.e. type-specific loading rules. A generic loader 1309 is also used, having a set of common loading rules 1310, regardless of data type. In a preferred embodiment, there are four types of loaders, or map classes. The first is a fixed length mapper 1304, used for proprietary feeds & interfaces, in which all info regarding the file format must be provided in a script file. The second is a SWIFT format mapper 1301 (for SWIFT or SWIFT-like formats & other tagged message formats), wherein specific rules can be specified regarding how a key tag or code word should be mapped. The third is a BAI format mapper 1302 (for BAI formatted feeds), which accounts for different interpretations of BAI that take place from bank to bank. The fourth is a database mapper 1303, which transfers information from one database (e.g. a SQL database) to another. The database mapper 1303 is used for the application loading process (taking information off the hub database and loading it into the application database) and the archive process (removing historical data from primary application data tables to archive tables with longer data retention and an indexing scheme to support archival lookups). Mappers 1301–1304 apply mapping rules 1305–1308, respectively, and loader 1309 applies loading rules 1310 to files 1320 and messages 1321 received as input. Once the information has been mapped, the first step in the loading process involves loading the mapped information into the hub database 1311, which comprises a hub message routing queue 1313 and one or more hub message queues 1312.

Figure 14:
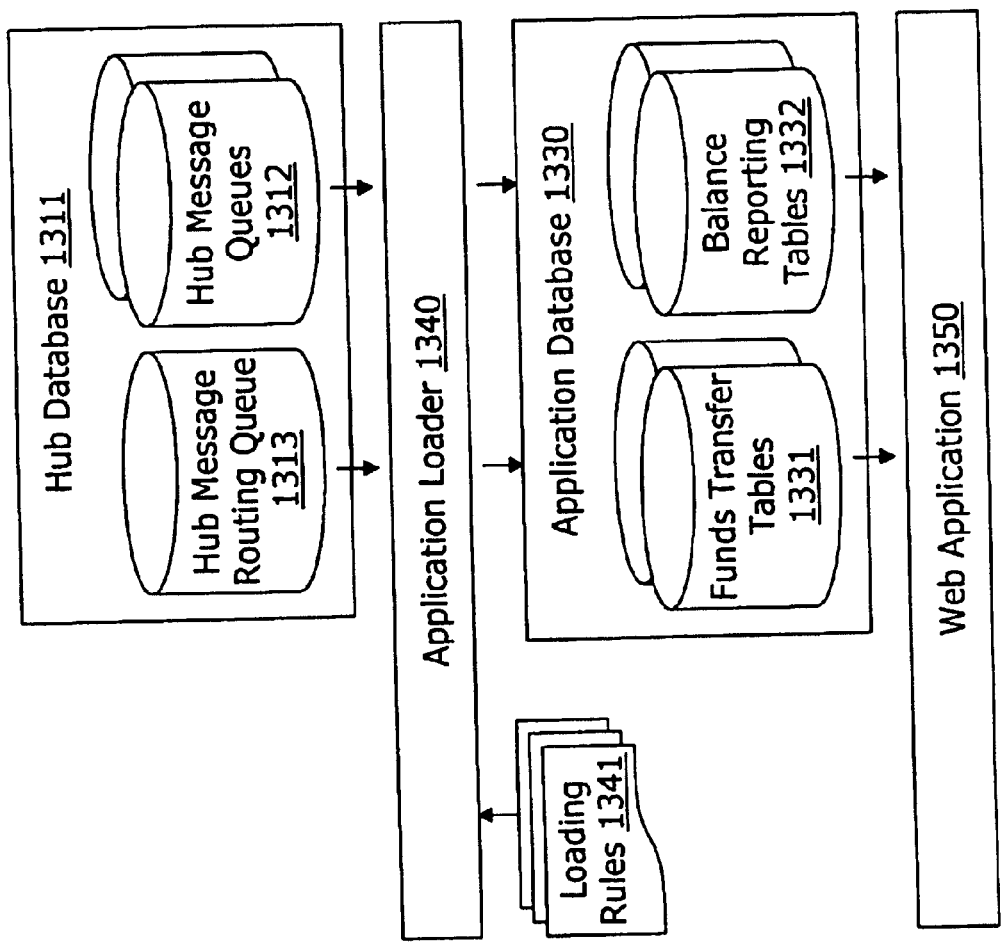
FIG. 14 is a component view of the hub database, application loader, application database, and web application in the application loading process in one embodiment of a financial transaction system consistent with the present invention.

As can be seen in FIG. 14, the data is next loaded from the hub database 1311 using an application loader 1340, based on application loading rules 1341, into one or more applications databases 1330, which may comprise one or more funds transfer tables 1331 and/or one or more balance reporting tables 1332. The data is thus available to be received from the applications database 1330 into one or more web applications 1350 which support a client user interface. Included in this transfer of information can be data ranging from reporting and information feeds to transaction confirmation for instructions. Optionally, additional application logic can be applied to the data upon loading into the application database 1330, to support the user interface and increase system efficiency. The hub database 1311 may include a gatekeeper mechanism to prevent end user clients from seeing partial information. For example, if a client initiates a request to view data while a large data load is in progress, the new info would become available in its entirety when the load is finished, and none of the new information from the data load would be available to the client any sooner. In one embodiment of the invention, transactional data, which is not part of a "statement" or complete group, may be made available to clients incrementally, as soon as it arrives, without requiring the client to wait until all data has been loaded. This functionality may be handled through the gatekeeper mechanism, which sets the "high water" mark on the auto-increment number of the last transaction, prior to the load being executed.

Figure 15:
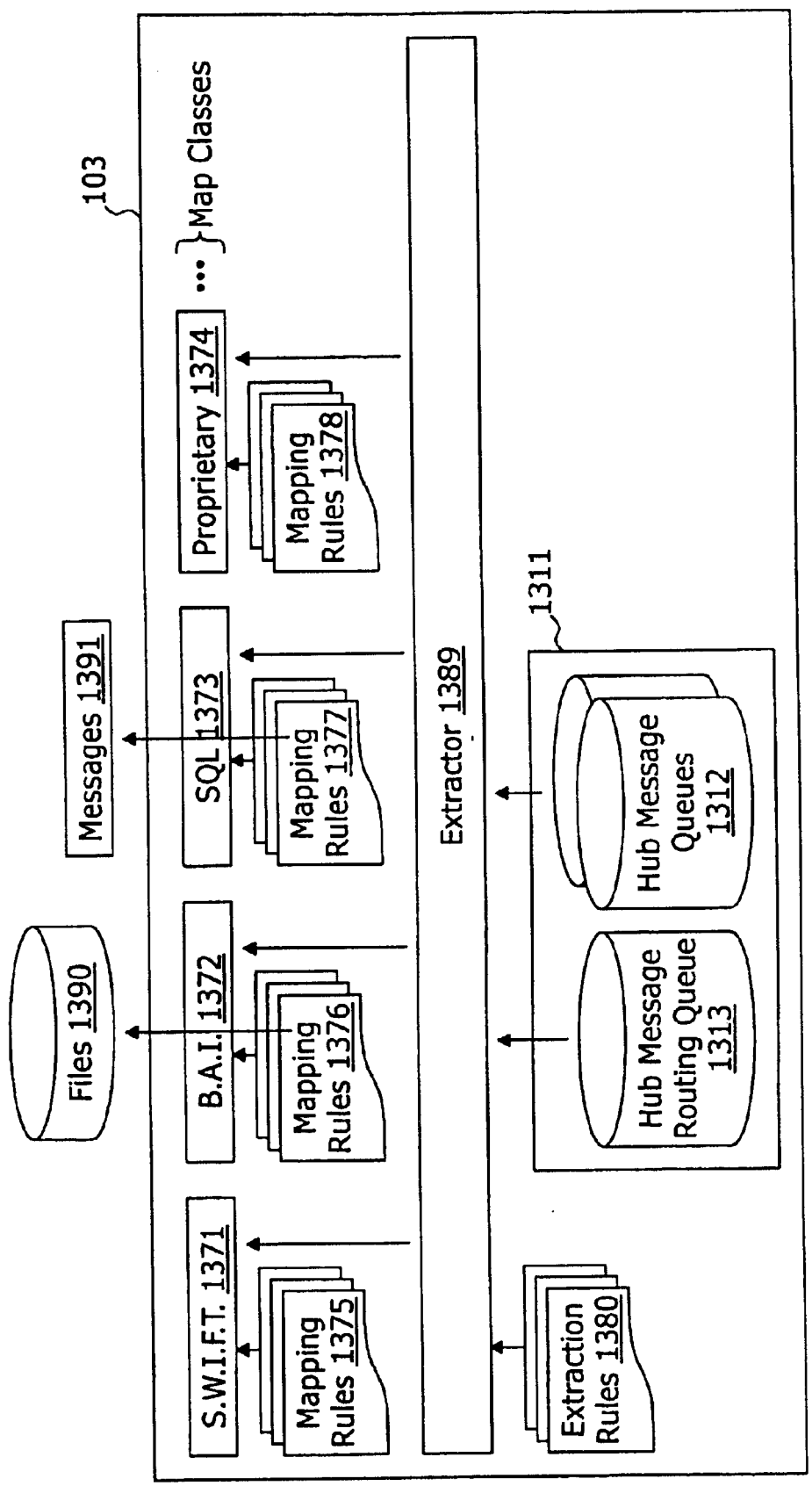
FIG. 15 is a component view of the hub server and its various modules in the extraction/reformatting process in one embodiment of a financial transaction system consistent with the present invention.

FIG. 15 illustrates the extraction and reformatting process performed by the hub server 103 in a preferred embodiment of the invention, which involves formatting an outbound transaction (or other data) before its transmission to a particular host destination. The hub server performs the functions of extraction and reformatting. The hub server 103 comprises a set of extractors (or reformatters) 1371–1374, which are multi-threaded processes allowing for the simultaneous extraction and/or reformatting of incoming files 1390, as well as messages 1391. It is noted that loading and extraction rules are interchangeable, since both deal with the process of reformatting messages by string manipulation, table lookups, and the creation of logical output records expected by the receiving function. Thus, although the extractors/reformatters are described herein as separate modules or program components from the loaders/mappers described herein, it is understood by those skilled in the art that a single set of mappers may be used to perform both the loading and extraction functions. It is also noted that, while four extractors are depicted and described herein, any number of extractors of varying types may be used. In FIG. 15, each of the extractor types 1371–1374 has a set of mapping rules 1375–1378, respectively, i.e. type-specific extraction rules. A generic extractor 1389 is also used, having a set of common extraction rules 1380, regardless of data type. In a preferred embodiment, there are four types of extractors, or map classes. The first is a fixed length mapper 1374, used for proprietary feeds & interfaces, in which all info regarding the file format must be provided in a script file. The second is a SWIFT format mapper 1371 (for SWIFT or SWIFT-like formats & other tagged message formats), wherein specific rules can be specified regarding how a key tag or code word should be mapped. The third is a BAI format mapper 1302 (for BAI formatted feeds), which accounts for different interpretations of BAI that take place from bank to bank. The fourth is a database mapper 1373, which transfers information from one database (e.g. a SQL database) to another. The database mapper 1373 may also be used for the application loading process (taking information off the hub database and loading it into the application database) and the archive process (removing historical data from primary application data tables to archive tables with longer data retention and an indexing scheme to support archival lookups). Mappers 1371–1374 apply mapping rules 1375–1378, respectively, and extractor 1389 applies extraction rules 1380 to data stored in the hub database 1311 received as input. The reformatted/extracted data is outputted in the form of files 1390 and/or messages 1391.

Application Loading

Figure 32:
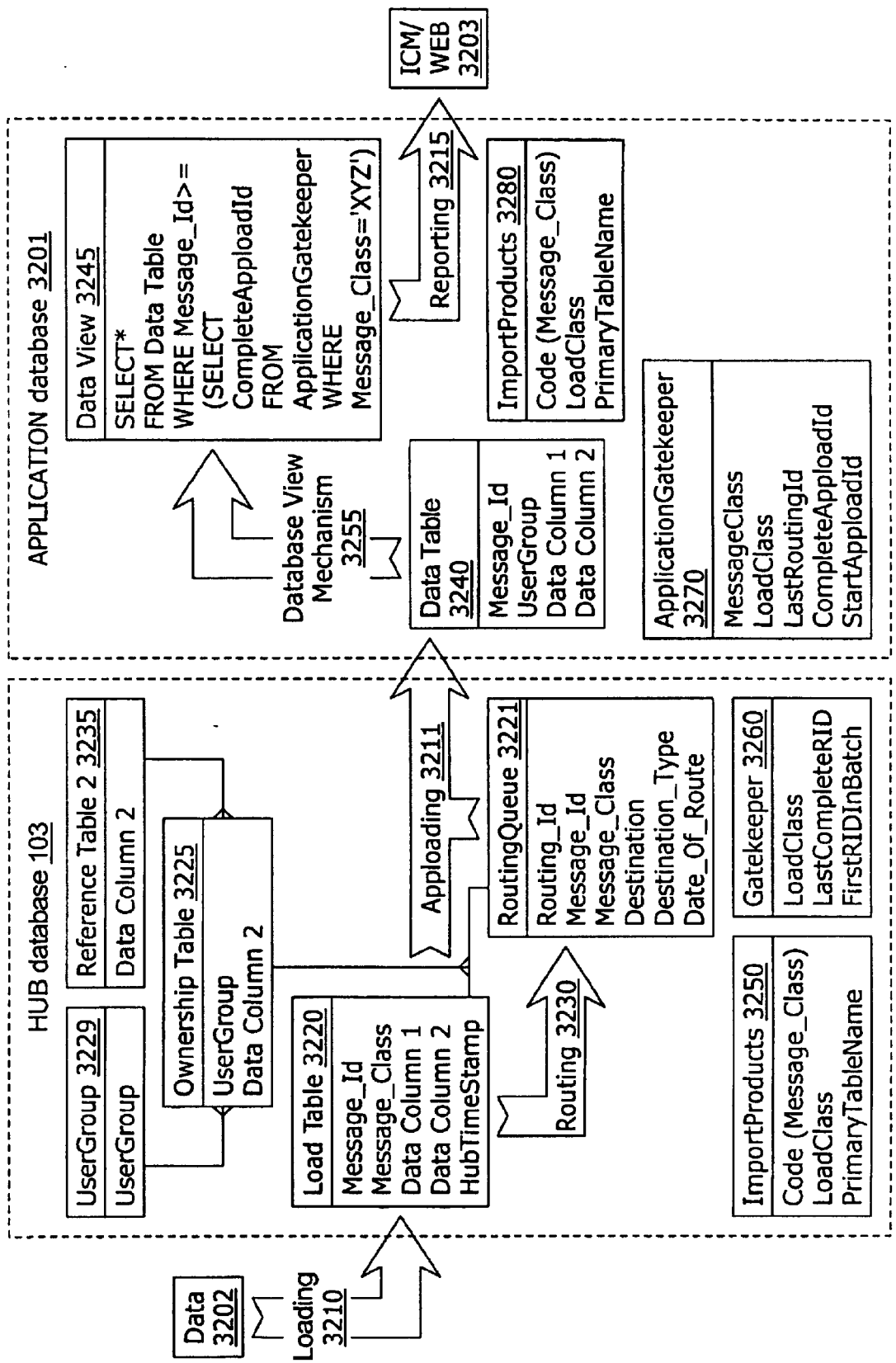
FIG. 32 is a flow diagram illustrating the application loading process in one embodiment of a financial transaction system consistent with the present invention.

As can be seen in FIG. 32, which shows the application loading process, i.e. loading information from the hub database 103 into the application database 3201, in one embodiment of the present invention. The application loading process (or routine) is preferably further separated into two sub-processes (or subroutines): loading (loader) 3210 and apploading (apploader) 3211. The purpose of loading and apploading is to retrieve the data 3202 from a host file feed, apply the necessary formatting thereto, and place the data into a table in the application database, whereby the data become available to an end user for access, including for creating reports.

For each type of data feed there is a corresponding type of smallest unit of information, which translates into one record in the load table 3220. The records in the load table 3220 are called messages, i.e. the smallest units of information for the type of data feed that uses that load table. While these units of information will be referred to herein as "messages", for SWIFT an alternative name "SWIFT statement" may also be used. The load table 3220 is an intermediate storage on the interface between the loading 3210 and apploading 3211 processes. The loader 3210 writes to the load table 3220 and the routing queue table 3221, and the apploader 3211 reads from the two tables. The loading process 3210 comprises the following steps: First, the input data 3202 is read and parsed, and structured into a set of messages. At this point, some of the messages may be dropped, based on per-message ownership rules. Next, either the whole batch is discarded based on the per-file validation rules, or all of the file records are inserted into the load table 3220. Then, the messages are routed 3230 based on the per-message ownership rules. Lastly, orphan messages (those that were not routed) are deleted from the load table 3220, where applicable. The apploading process 3211 comprises the following steps: All new records in the routing queue 3221 are processed. For each record, the corresponding message data is retrieved and a record created in the data table 3240 in the application database. Finally, additional custom data manipulation may be performed for the load class, as required.

In a preferred embodiment, the load table 3220 has the following two columns: Message_Id and Message_Class. The Message_Id is an automatically incrementing column, which is an integer number that enumerates and uniquely identifies loaded messages. The Message_Class column holds the table's message class. The value of this field must be the same for all records in the table. This value must be the same as the value of the field ImportProducts.Code (in the ImportProducts table 3250) in the record for which the field ImportProducts.PrimaryTableName contains the name of this load table. The ImportProducts table 3250 is used by the loader 3210 to look up the load table name by message class. When the loader 3210 starts, it takes into account the known message class, and uses the ImportProducts table 3250 to determine which load table 3220 to use. In a similar manner, the apploader 3211 pulls messages from the correct load table 3220 using the pointer from the routing queue 3221. In a preferred embodiment, the load table 3220 also has the column Hub_TimeStamp, which records the exact date and time of the moment the message was loaded. The rest of the columns are data columns, which are specific to each particular data feed 3202. Some of the data columns may be used in ownership or validation rules.

In a preferred embodiment, each load table 3220 in the hub database 103 has a corresponding data table 3240 in the application (or web) database 3201, which consists of the same columns as the load table 3220, with the addition of UserGroup and BankMnemonic columns and the exclusion of the MessageClass column. During appload 3211, each record in the routing queue 3221 causes one record to be added to one of the data tables 3240. The Destination field is copied from one record to another and is split between UserGroup and BankMnemonic. The pointer to a message in the routing queue 3221 is used to pull the data from the load table 3220 and fill in the data fields in the data table 3240 record. In a manner similar to the loader 3210, the apploader 3211 looks up the name of the data table 3240 in the table ImportProducts 3280 for each message class.

An archive process, which is an alternative implementation of the application loading process, is preferably included. In the archive process, historical data is removed from primary application data tables into archive tables with longer data retention, and an indexing scheme is provided to support archival lookups in the archive tables. It is noted that if the archive process is made part of the application loading process and data is therefore archived at each loading instance, the archive generated will always be representative of the actual data loaded.

Ownership-Based and Validation-Based Routing

In a preferred embodiment of the invention, the hub determines the recipient based on one of two routing methods: ownership (i.e. what party "owns" or is associated with the data) validation (or "routing rules", i.e. which routing rule applies based on the characteristics of the transaction).

An example of a validation rule is a BIC rule: the Bank Identification Code in the message must be present in the BIC table. The BIC represents a list of branches (table BIC) whose data feeds 3202 are accepted and may be entered into the hub database 103. The BIC code is mapped to a branch mnemonic used in conjunction with an account number and account ownership table. Missing BIC codes or data that has no ownership is unwanted. Thus, loading rules are used to discard unwanted data. A client file-imported transaction would have a unique reference number and transaction type. This type of validation rule effectively adds a unique constraint to the load table 3220 by client reference, user group, and transaction type.

The ownership rules determine the list of user groups whose members must be able to access the data of each individual message. When the message is routed, the routing queue 3221 receives as many pointers to the same message as there are user groups 3229 in that list, i.e. one pointer for each user group. The pointer to a message comprises two fields: Message_Class, which identifies the load table 3220 (through the table ImportProducts 3250), and Message_Id, which is the message's ID in its load table 3220. The records in the routing queue 3221 are enumerated by the value of RoutingId field, which is an automatically incrementing column.

An ownership rule is based on a separate ownership table 3225 listing associations between user groups 3229 and at least one reference table 3235. An example would be an account rule, wherein the a table "account" (not shown) contains not just account numbers but also branch code and user group. A table "bank" (not shown) lists available branch codes, and the reference table containing only account numbers is implied. The load table 3220 has the columns account number and branch code account_num and Branch_Cd, so that each message has an account number and branch code associated with it. If the table "account" mentions this combination of account number and branch code at least once, the message is routed to those and only those user groups which are associated with this pair. If the account table contains no relevant associations, the message is not routed, but instead becomes an orphan and is not loaded. An ownership rule creates associations between user groups and messages, as required by the way the application data tables 3240 function. Ownership rules are used primarily to route messages and only indirectly (through the orphan detection mechanism) to discard unwanted data.

Figure 5:
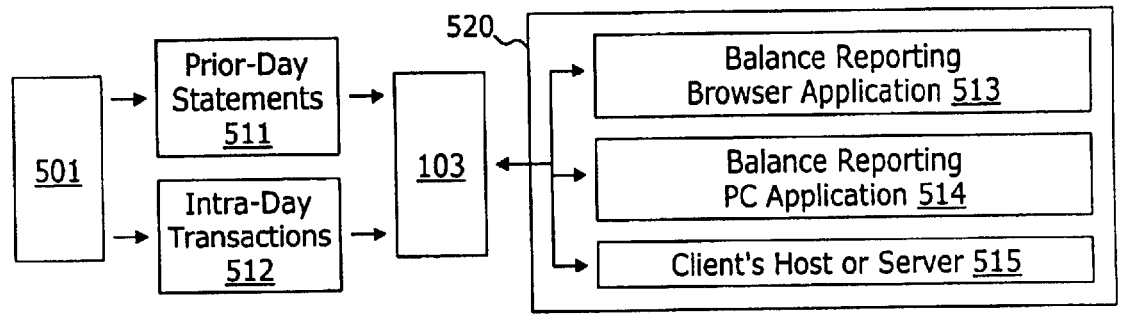
FIG. 5 is a flow diagram illustrating an example of ownership-based routing in one embodiment of a financial transaction system consistent with the present invention.

One example of ownership-based routing can be seen in FIG. 5. DDA host system 501 delivers files and messages of balance data 511 (e.g. prior day statements) and transaction data 512 (e.g. intra-day transactions) to the hub 103. The hub 103 routes the data based on its "owner" 520 to a balance reporting browser application 513 via a network connection to hub 163, a balance reporting PC application 514 directly connected to hub 103, and/or a client's host and/or server 515 directly connected to hub 103.

Figure 6:
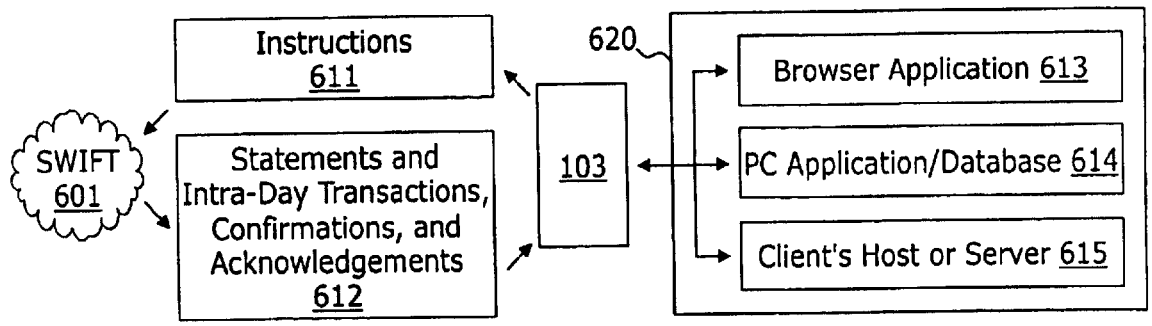
FIG. 6 is a flow diagram illustrating an example of both ownership-based and validation-based routing in one embodiment of a financial transaction system consistent with the present invention.

FIG. 6 illustrates an example of both ownership and validation-based routing. Messages 612 (e.g. statements, intra-day transactions, confirmations and acknowledgements) arrive from SWIFT 601 and are received using ownership routing into the hub 103. The hub 103 routes the data based on its "owner" 620 to a browser application 613 via a network connection to hub 103, a PC application 614 directly connected to hub 103, and/or a client's host and/or server 615 directly connected to hub 103. The owner 620 transmits messages 611 (e.g. instructions) via hub 103, which must be sent to SWIFT 601 using validation-based routing.

Figure 9:
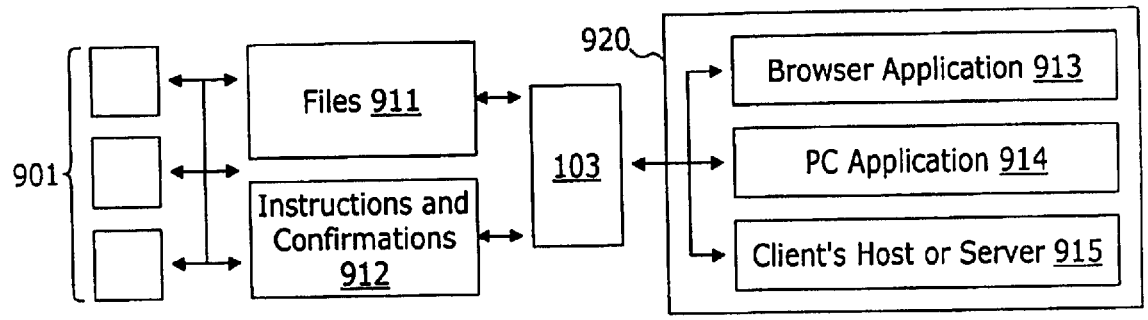
FIG. 9 is a flow diagram illustrating a further example of both ownership-based and validation-based routing in one embodiment of a financial transaction system consistent with the present invention.

FIG. 9 illustrates another example of both ownership and validation-based routing. Branch workstations 901 originate files 911 and transactions 912 (e.g. instructions and confirmations) via hub 103 using ownership routing to the "owner" 920. The owner 920 comprises a browser application 913 via a network connection to hub 103, a PC application 914 directly connected to hub 103, and/or a client's host and/or server 915 directly connected to hub 103. Validation-based routing is used to transmit files 911 and transactions 912 to workstations 901.

Figure 10:
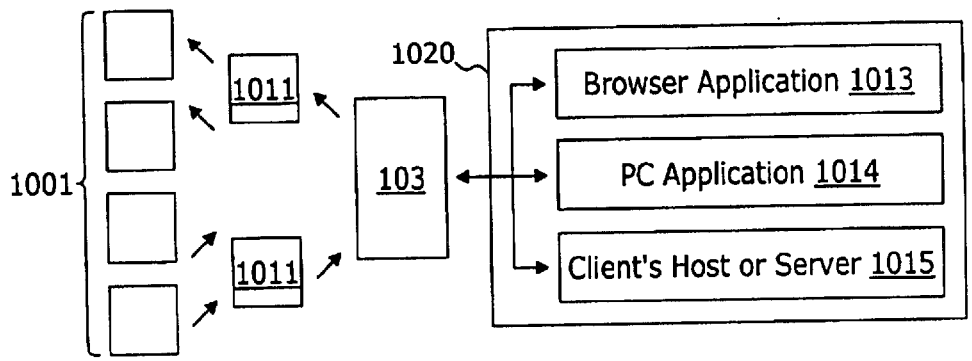
FIG. 10 is a flow diagram illustrating yet a further example of both ownership-based and validation-based routing in one embodiment of a financial transaction system consistent with the present invention.

FIG. 10 illustrates yet another example of both ownership and validation-based routing. The client 1020 sends transactions 1011 to one or more back office host systems 1001, and validation-based routing is employed. Client 1020 comprises a browser application 1013 connected via a network connection to hub 103, a balance reporting PC application 1014 directly connected to hub 103, and/or a client's host and/or server 1015 directly connected to hub 103. Back office host system(s) 1001 return confirmations of the transactions to the client 1020, as the "owner" of the data, using ownership rules.

Figure 11:
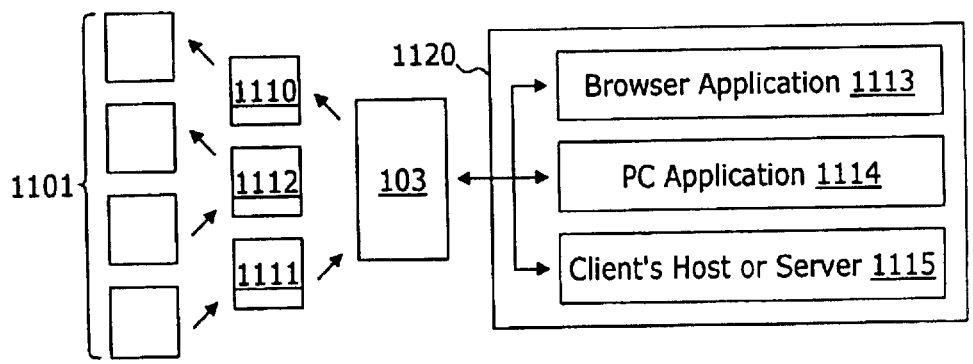
FIG. 11 is a flow diagram illustrating still a further example of both ownership-based and validation-based routing in one embodiment of a financial transaction system consistent with the present invention.

FIG. 11 illustrates a further example of both ownership and validation-based routing. The client 1120 requests information online using a browser application 1113 connected via a network connection to hub 103, a balance reporting PC application 1114 directly connected to hub 103, and/or a client's host and/or server 1115 directly connected to hub 103. The hub 103 validates the request 1110 using ownership-based routing, passes the request 1110 on to the appropriate host(s) 1101 using validation-based routing, and sends the response (in the form of files 911 and/or transactions 912) back to the requesting system of the client 1120 using ownership-based routing. The routing in this example may be used for applications such as negotiated FX trading, intra-day statement requests, or ad-hoc inquiries. Such routing may be preferably used when time is of the essence or when a store-and-forward configuration is not desirable (e.g. if the data requested is a small percentage of volume of potential data).

Gatekeepers

Returning now to FIG. 32, the operation of the gatekeepers may be seen. The report generator 3215 accesses the data tables 3240 indirectly through the data views table 3245 via the database view mechanism 3255. Each data table 3240 has a view 3245 associated with it. The main purpose of the views is to limit the scope of the accessible data by excluding those that are in the process of being apploaded. This lets the system perform sophisticated data manipulation in place without the danger of producing incomplete or inconsistent reports. An example would be a load class having two data tables 3240, one containing the balances and the other containing transaction information. The balance that the user sees must be in agreement with the list of browsable transactions. By using the data view table 3245 and the database view mechanism 3255, the only messages accessible to the user are those whose IDs are less than or equal to the value of a flag variable updated at the end of the appload process.

Gatekeepers, as shown in FIG. 32, include tables gatekeeper 3260 of the hub 103 and application gatekeeper 3270 of the application/web databases 3201. Gatekeepers 3260 and 3270 are used to synchronize access to the load 3220 and data tables 3240 and to prevent access to incomplete or inconsistent data. Because the data of message classes belonging to one load class are usually related, the synchronization is per load class. The synchronization of the loads works as follows: Before loading, the gatekeeper 3260 is locked for the load class, during which time no other process is allowed to load for that same load class. After the load is completed, the loader 3210 unlocks the gatekeeper 3260. All processes are required to clear the gatekeeper 3260 before accessing data in the load tables 3220. Records in the routing queue 3221 which have a routing ID greater than that of the last loaded routing ID, as well as messages in the load tables 3220 with a message ID greater than the maximum message ID among the routing queue 3221 records with the corresponding message class and routing ID not greater than that of the last loaded routing ID, may be incomplete or inconsistent, and the gatekeeper thus prevents access thereto.

The application gatekeeper 3270 works in the same way, except that locking is per message class, not load class, and message IDs, instead of routing IDs, are used, since the application database 3201 does not contain a copy of the routing queue 3221, which would be necessary to look up message IDs as performed by the gatekeeper 3260.

High-Level Message Flow and Routing

Figure 52:
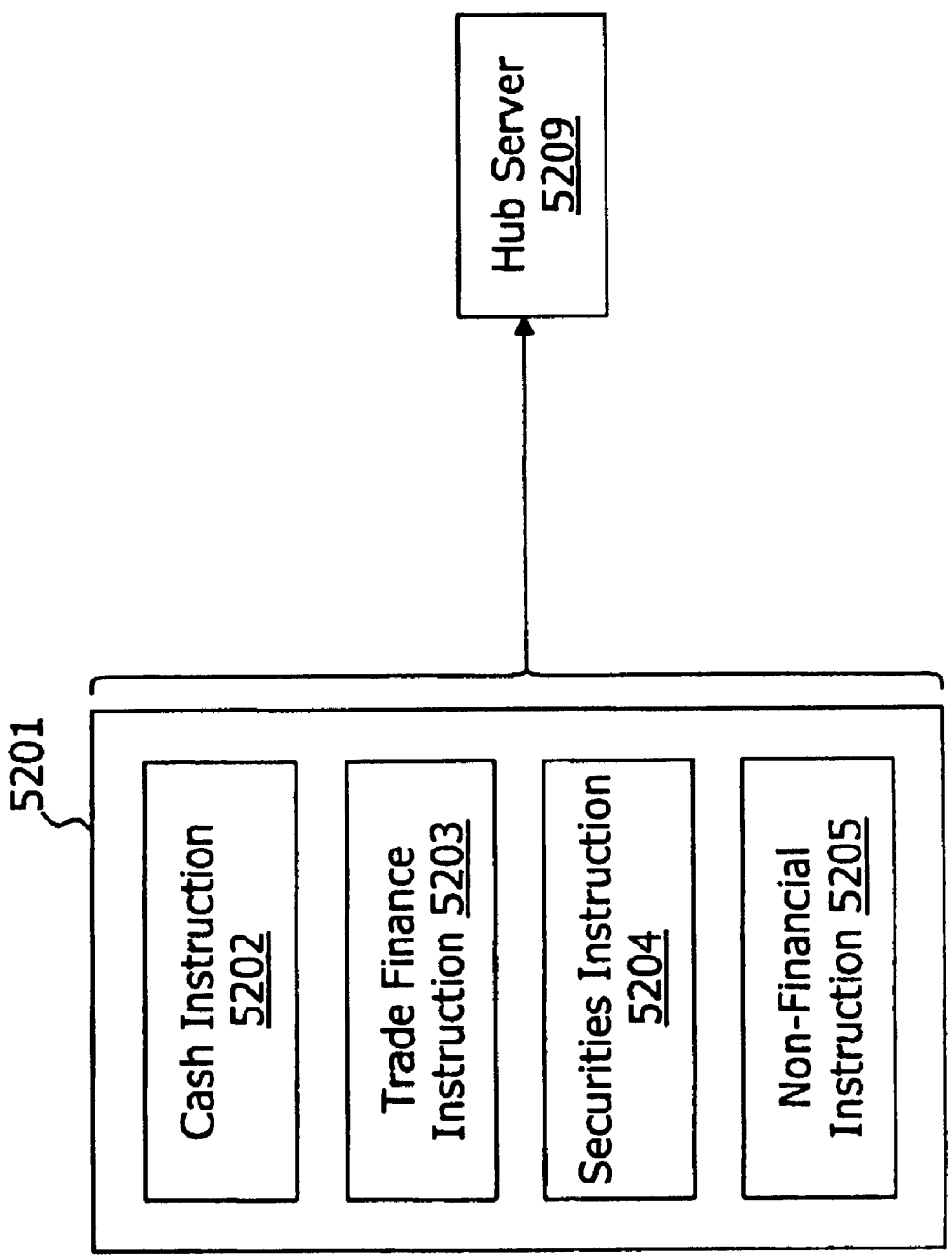
FIG. 52 is an exemplary illustration of instructions which may be received by the hub server in one embodiment of a financial transaction system consistent with the present invention.

While the terms "instruction", "transaction", "message", and "data" are used interchangeably herein to describe information handled by the present invention in its various embodiments, an example of an instruction, as used herein, is a transaction initiated by an end user client. As FIG. 52 shows, a client 5201 may transmit instructions 5202–5205 to the hub server 5209 of varying types, including: cash instructions 5202 (e.g. check, ACH, book transfer, Fed Wire, CHIP, SWIFT message), securities instructions 5203 (e.g. settlement message, instruction to custodian, cancellation), trade finance instructions 5204 (e.g. letter of credit application, amendment, discrepancy advice, purchase order), and non-financial instructions 5205. Transactions may also include loan requests, investments, FX instructions, and/or other, non-financial instructions, such as internal system enhancement requests. Transactional data handled by the present invention can be in almost any format, including NACHA, EPDI (including X12), ANSI (including 810 and 820), UN/EDIFACT, SWIFT, SWIFT/ITISC, BAI, print image file, SQL-based data source, HTML, an extended markup language, a paper-based payment instrument, a check, a draft, a payment format, Fed Wire, PAYORD, a human-readable format, a legacy protocol, a custom format, and/or one or more of the foregoing in combination. Of course, not only are instructions transmitted and received by the present invention, but within an embodiment of the present invention, it is understood by those skilled in the art that various instructions will also be passed back and forth internally, between the various software and/or hardware components of a financial transaction system consistent with the present invention.

Transactions may be entered, modified, deleted, approved, and unapproved within the application database. In one embodiment of the invention, a transaction may require a plurality of electronic confirmations or "signatures" (typically, three) for approval to be complete, at which point the transaction is transferred to the hub's message queues if the "transaction date" of the transaction is equal to the current date. A transaction date is the control date by which a particular business product or transaction is set to process through the back office of a financial institution. In this scenario, transactions that reached full approval prior to their transaction date are held on the application database until the current date is equal to the specified transaction date. Thus, at any time before the transaction date, a transaction can be unapproved, and then modified, deleted, or re-approved. Once a transaction has been fully approved and a predetermined cutoff time relative to the transaction date has passed, the transaction is "released" and can no longer be altered or deleted by the user. At that time, the transaction is inserted into the hub's payment message queue, and entries in the message routing table (specifying the transaction's next destination) and in the message tracking table (allowing immediate access by the hub's transaction status monitor) are created. There are three types of destinations which can be specified in the message routing table: client user group (another application user group must provide further approval based on the transaction profile, i.e. "remote approval"), bank user group (e.g. if a transaction needs repair, manual intervention, or manual interface), and host (the transaction is reformatted and sent to the appropriate system for processing).

Figure 16:
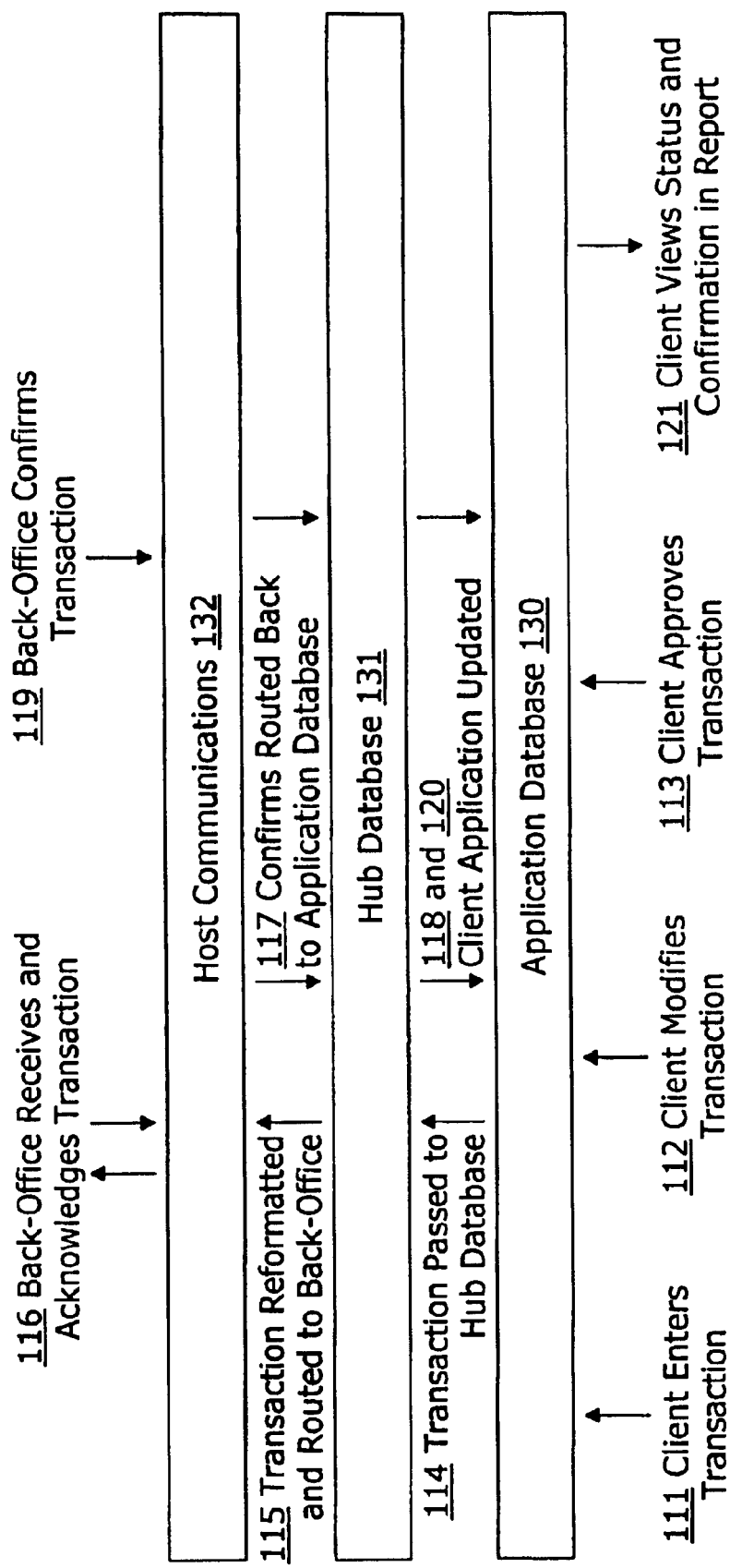
FIG. 16 is a process diagram illustrating the process by which transactions flow through the application database and hub database in one embodiment of a financial transaction system consistent with the present invention.

FIG. 16 is a process diagram illustrating the process by which transactions flow through the application database 130 and hub database 131, in one embodiment of the present invention. The client initiates a transaction 111 using an application stored in the application database 130, and may optionally modify 112 and approve 113 the transaction. The transaction is then passed 114 from the application database 130 to the hub database 131, where the transaction is reformatted and routed 115 to the back office via host communications 132. The back office receives and acknowledges 116 the transaction and initiates the routing of a confirmation 117 back to the application database 130 through the hub database 131. The client application is updated 118 in the application database. The back office confirms 119 the transaction, and the client application is updated 120 with the confirmation. At any time, the client can view 121 in real time the status of the transaction and its confirmation in a report format, on-screen, or otherwise.

Figure 17:
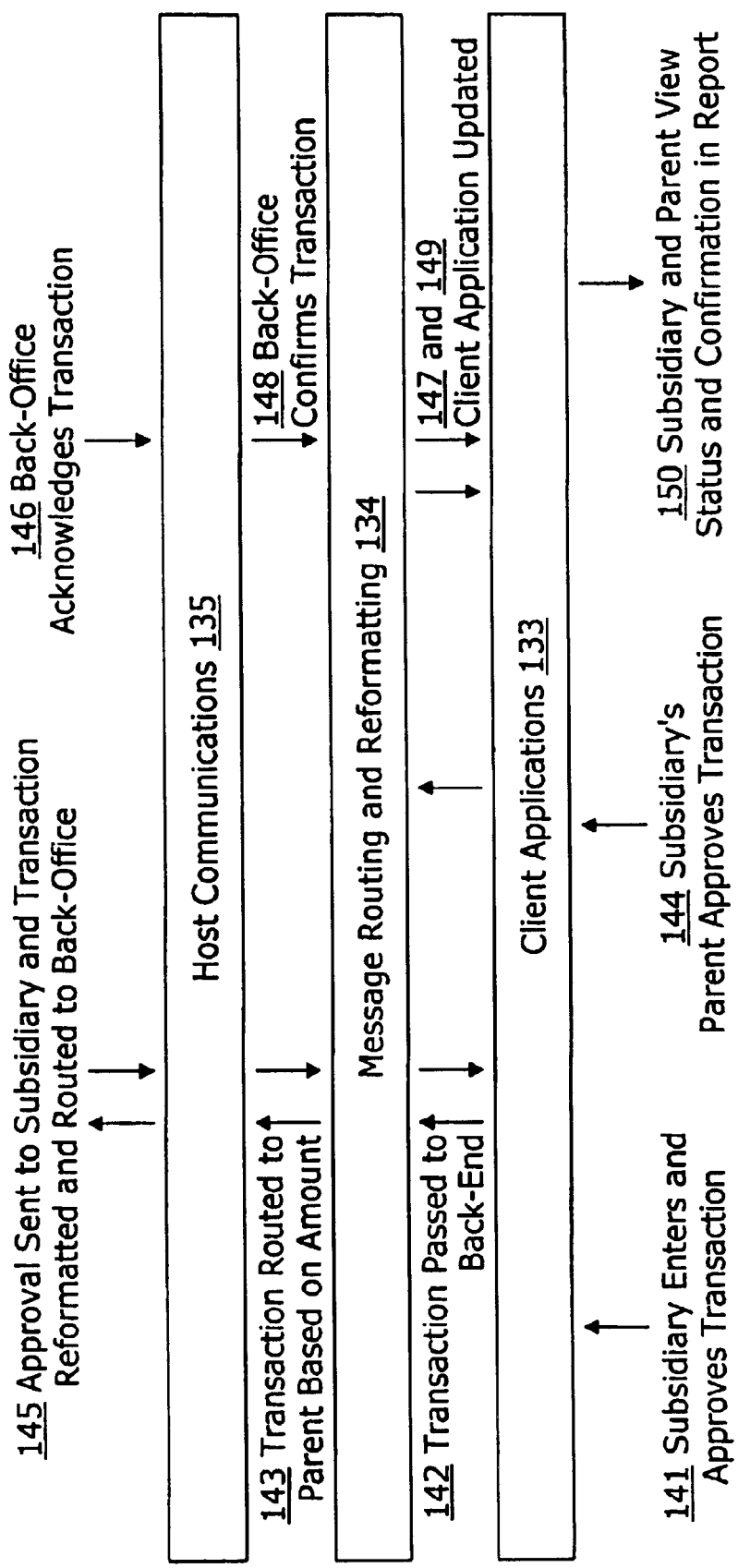
FIG. 17 is a process diagram illustrating the process flow for the remote approval routing phase involving a subsidiary requiring transaction approval by its parent in one embodiment of a financial transaction system consistent with the present invention.

In a preferred embodiment of the invention, the routing mechanism comprises two phases: the first phase resolving any remote approval requirements, and the second phase ("back office routing") resolving the routing to the bank's processing destination. In a scenario in which remote approval routing rules apply to a transaction, the transaction flows into the hub database where a new transaction (an exact copy of the original) is created for the remote approver. The duplicate transaction is then routed to the remote approver user group within the web application database. FIG. 17 illustrates the process flow for the remote approval routing phase in one embodiment of the invention, involving a subsidiary requiring transaction approval by its parent. First, the subsidiary enters and approves 141 a transaction via a client application 133. Next, the transaction is passed 142 to the back end via the message routing and reformatting mechanism 134, where it is routed 143 to its corresponding parent based on the transaction amount (or other criteria). The subsidiary's parent approves 144 the transaction via a client application 133. The approval is sent 145 to the subsidiary, and the transaction is reformatted and routed to the back office of the corresponding financial institution via host communications 135. The back office acknowledges 146 the transaction, and the client application 133 is updated 147 with the acknowledgment. The back office confirms 148 the transaction, and the client application 133 is updated 149 with the confirmation. At any time, the subsidiary and/or the parent can view 150 in real time the status of the transaction and its confirmation in a report format, on-screen, or otherwise.

When the remote approving parent approves the transaction, the subsidiary is notified with an extended status of "remote approved", and the subsidiary will also be notified upon local approval that the transaction has been routed to another user group for further approval. Once the transaction has either been acknowledged or confirmed by the back office of the financial institution, these status updates, as well as confirmation numbers (e.g. Fed. reference no. for a Fed Wire) will be communicated to both the parent (i.e. the remote approver) and the subsidiary (i.e. the originator). Since there are two copies of the transaction on the hub, the financial institution can track and view all of the approvers from both the parent and the subsidiary. Preferably, a transaction-tracking database is configured to track the status of a transaction throughout the routing process.

Turning now to FIG. 18, an exemplary configuration of the remote approval routing mechanism in one embodiment of the invention can be seen. The initial (or base) remote approval parameters are stored in base routing table 1800. The remote approval parameters are origination user group 1801, product 1802, transaction type 1803 (Fed Wire, SWIFT, etc.), entry method 1804 (free form, template, repetitive), monetary amount threshold 1805, currency 1806, and destination group 1807. As FIG. 19 shows, an account routing override may optionally be provided, wherein an account routing override table 1900 contains entries for origination user group. 1901, product 1802, account number 1908, and destination group 1907. In a thus configured scenario, Fed Wire and SWIFT transactions arriving from the ABC group would be selectively routed to the ABCP or ABC2 user groups for remote approval. Transaction types other than Fed Wire or SWIFT would not require any remote approval. Free form Fed Wires over 100,000 USD would require approval from either "ABC2" if the debit account number was "123456" or from "ABCP" for any other account number. Fed Wire template transactions would have a 1,000,000 USD threshold. SWIFT transactions would require remote approval if the currency being transferred exceeded a converted amount of 10,000 EUR (based on the indicative rate table). The account routing override table is applied only if a base routing record triggers remote routing, and irrespective of which base routing record corresponds to the product. There are two remote approval records for the LC (trade finance letter of credit application) and the ST (securities instruction) products. Any "commercial" (the most common type of application) letter of credit application with a face value over 100,000 GBP would be routed to the "ABCP" user group. Any buy/sell instruction with a settlement value over 100,000 CAN would also be routed to "ABCP".

Back office routing, the second phase of the transaction routing mechanism, is executed once the first phase (remote approval) has been resolved, either by creating a new transaction that requires remote approval, or by a determination that no remote approval is needed). The parameters used in the second routing phase are product, branch, type, subtype, and destination. FIG. 20 illustrates an exemplary configuration of a base routing record table 2000 in one embodiment of the invention. Base routing record table 2000 specifies for each base routing record the appropriate routing destination 2002 corresponding to each product 2001. As can be seen in the example branch override table 2100 of FIG. 21, the appropriate routing destination 2103 for a product 2101 with a particular branch code 2102 is specified for each branch override record. FIG. 22 shows an exemplary type override table 2200, wherein the appropriate routing destination 2204 for a product 2201 with a particular branch code 2202 and transaction type 2203 is specified for each type override record. As FIG. 23 shows, subtype override table 2300 specifies the appropriate destination 2305 for a product 2301 with a particular branch code 2302, transaction type 2303 and subtype 2304. The routing tables, as shown in the examples of FIGS. 21–23, are created on an "override basis", i.e. if there is only one destination, one routing record (as seen in FIG. 20) is needed (e.g. all funds transfers are routed to "HOST1"). In a thus configured scenario, four separate destinations for a payment transaction arriving on the hub are specified in tables 2000, 2100, 2200, and 2300. By default, all transactions will be sent to destination "HOST1" In the format specified for that host. The first level override 2100 specifies that transactions with a branch code of "New York" be sent to host destination "HOST2". The second 2200 and third 2300 level overrides specifically identify SWIFT type transactions, such that all "New York" SWIFT transaction types are routed to "HOST3", except for subtype "Cancel", which is routed to a bank browser user group "NYBranch". Thus, all transactions with a branch code other than "New York" are routed to "HOST3" and "New York" branched transactions are routed to "HOST2", so long as they are not SWIFT type transactions. In the foregoing example, securities (ST) and letter of credit (LC) transactions are routed to only one host, regardless of branch, type or subtype.

User Groups, Administration, and Account Configuration

In a preferred embodiment of the present invention, four separate work groups are established to perform the function of system administration, and the functions available to the administration work groups (typically financial institution administrators and support personnel) are separate and distinct from those available to end user clients. These four work groups are central administration and operations (CAO), customer service units (CSU), client enterprise user groups (CEU), and client user groups (CU).

Figure 24:
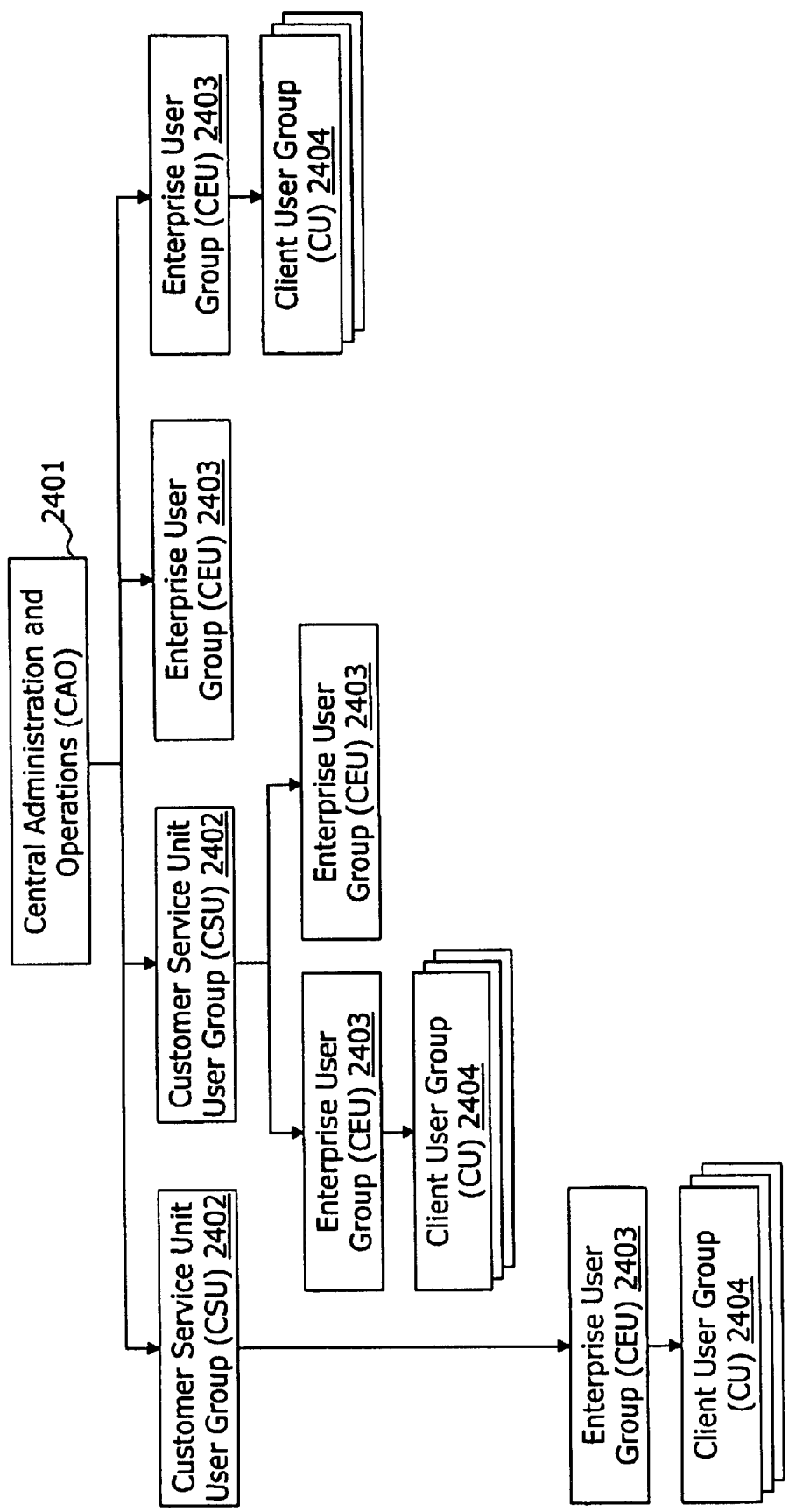
FIG. 24 is a dependency diagram illustrating the dependency relationships between the four workgroups in one embodiment of a financial transaction system consistent with the present invention.

FIG. 24 shows the dependency relationships between the four workgroups in one embodiment of the present invention, including a CAO group, two CSU groups, five CEU groups, and nine CU groups. The lines shown in FIG. 24 indicate dependencies, and not necessarily direct authority, i.e. CEUs are required for the creation of CUs, but a CEU user cannot create CUs. As shown in FIG. 24, the CAO 2401 has the highest level of authority and is responsible for the overall operation of the hub. The CAO can perform any of the activities that the lower level work groups can perform and can access many tables and functions inaccessible to any other users or work groups. The CSUs 2402 are responsible for client setup and support and can also perform the functions of the lower client administration groups (CEU and CU). CSU administrators have access to any of the CEU and CU that have been assigned to a given CSU. For less sophisticated clients, the CSU administrators will perform the functions of the CEU and/or CU. The CEU 2403 can act as a master user group for a given enterprise. A CAO or CSU user must set up a CEU group before the CAO/CSU user can create new CU groups. These new CU groups can be granted access to a subset of any of the accounts granted to the CEU group. Additionally, the CEU group has access to the remote approval rules so that the CEU administrator can configure workflows between user groups across the enterprise. The CU groups 2404 have access to a set number of accounts that has been granted to them by a CAO, CSU, or CEU. The administrator of the CU group decides which products, reports, transaction types, and instruction templates an end user within the group is permitted to access. It is noted that the CAO and CSU groups are critically different from the CEU and CU groups in that only the CAO and CSU groups can create and maintain accounts. The CEU can only allocate accounts that have already been created and allocated by either a CSU or a CAO user. A CEU can exist independent of any ownership of CUs, but must exist to create CUs.

All clients who are end users of the present invention must "belong to" or be associated with a CSU. The CSUs are responsible for setting up and supporting their own client base. CSUs can be organized in a number of ways, including by geographic region and by application product group (e.g. custodial applications may fall under a different support organization from trade finance applications, but both may be implemented on the same server). In a preferred embodiment of the invention, there is only one CAO user group, and user IDs belonging to this group may be used to access central administration and operation functions, as per the security group they belong to. Administration and operational functions may include access and modification to one or more tables, each table storing data relating to one or more of the following functions: CAO user ID setup, CAO security group setup, global banner messages, table maintenance (reference data), event scheduling, transaction alert configuration, console configuration, transaction routing, branch setup and configuration, CSU user group setup, CSU security group setup, CSU banner messages, table maintenance (administrative data), account setup, client inquiry functions, transaction monitoring, cutoff time maintenance (in instruction processing, the backdating, forward dating and end-of-day time limits for each business product), audit trail inquiry, CU user group setup, CEU user group setup, CEU security group setup, account ownership, remote approval rules, CU security group reset, and password reset.

Within the CAO group, there may be CAO "admin" users, who can set up and maintain other CAO users, and "application" users, who can perform the functions made available to their CAO security group. The CAO user ID maintenance function is identical to the current client ID maintenance function; user IDs are assigned to an already defined security group. The CAO maintenance function allows the CAO admin user to specify which CAO functions the security group may access. In a preferred embodiment, when a security group is created, it cannot be tied to user until another CAO admin user has approved the creation of the group. Similarly, if a security group is modified by an admin user, the modifications do not take effect until approval by another admin user.

CAO users create the CSU user groups, which are the bank or financial institution business units that are primarily responsible for setting up clients and handling day-to-day support for those clients within their region or market segment. A CSU table, in a preferred embodiment of the invention, contains data regarding contact names and phone numbers, address, and/or country code. Another table, keyed by CSU code and branch code, may hold all of the branches that the CSU group may access for cutoff time maintenance, which table may be tied to the CSU table. If the CSU is not to be given access to cutoff time maintenance for any branch, then this table will have no entries in it for that CSU code.

The CSU security group maintenance function preferably allows the CAO user or CSU administrator to specify the CSU functions to which the security group has access. Since a CAO user has access to multiple CSU user groups, in operation, the CAO user must first enter the CSU group ID that will direct the security group maintenance function to the appropriate group, at which point the CAO user may access the same functions as would a CSU administrator user. In a preferred embodiment, when a security group is created, it cannot be tied to user until another entitled user has approved the creation of the group. Similarly, if a security group is modified, the modifications do not take effect until approval by another entitled user.

Once a CSU user group entry has been created using the CSU maintenance function, a CSU ID may be set up for that user group. This function may be performed by any CAO user who belongs to a CAO security group with CSU user ID setup access or an admin CSU user. Since a CAO user has access to multiple CSU user groups, in operation, the CAO user must first enter the CSU group ID that will direct the security group maintenance function to the appropriate group, at which point the CAO user may access the same functions as would a CSU administrator user. The CAO or CSU admin user may modify a password or reassign a password which has been lost or forgotten by a user, and a second CAO user would preferably be required to approve the modification or reassignment.

Before a CEU OR CU user group may be set up, the underlying enterprise code must be created. For example, if "GE" were to be set up as a CEU group, and GE UK, GE US, and GE Canada were to be set up as CU groups, then "GE" would first have to be set up as an enterprise code. In a preferred embodiment of the invention, an enterprise table comprises for each enterprise an eight-character code, a 50-character description, and a 1000 character free-form information field.

CEUs differ from normal CUs, as CEUs can set up new CUs, access the user IDs within those CU groups, and set up remote approval workflow rules within their enterprise. CEUs inherit the exact enterprise code to which they are assigned. A CEU must belong to a CSU. If a CSU user is setting up the CEU, then that CSU automatically becomes the owner. If a CAO user is setting up the enterprise, then the CAO user must select an owner CSU from the list of set up CSUs. CSU users can only access CEU groups that belong to their CSU group, for modification or deletion. A financial institution may elect to retain control over the CEU functions if a client lacks the required sophistication to manage the CEU functions, or to provide the CEU functions as a service to its clients. In this scenario, CEUs are not used, and that client or group of clients should be set up as normal CU groups.

A CU group must belong to a CSU and to an enterprise. If a CSU user is setting up the CU group, then that CSU automatically becomes the owner. If a CAO user is setting up the enterprise, then the CAO user must select an owner CSU from the list of set up CSUs. When the CU group is created, it must be assigned to an existing enterprise. CSU users can only access CU groups that belong to their CSU group, for modification or deletion.

In a preferred embodiment, CAO users have the ability to set up banners to all clients. When the banner is created, the user may specify whether a message automatically "pops up" upon logon, or whether the message remains as a minimized icon on the main window of the client's application until viewed by the client. The CAO user may send a banner message to a specific user group (CSU, CEU or CU) or to all user groups belonging to an enterprise (including the enterprise user group). CSU users have the same banner capabilities, but are limited to sending messages to their own user community.

Preferably, a table maintenance function is included for creating and maintaining bank (or other financial institution) codes. These bank codes tie together the branches that are set up for a single bank and consist of a code along with an 8- to 50-character description. Banks can only be set up by CAO users. Creating a branch mnemonic or code allows accounts to be set up against that branch. New branches can only be set up by CAO users. For every branch, the following information may be provided: bank code (the bank to which the branch belongs), branch code (the mnemonic to which an account will be assigned), branch description (the description which will appear in user reports), and detailed bank information.

BIC codes and ABA codes are set as a many-to-one relationship to branches for reporting; however, only one BIC and/or ABA can be set for a branch as the initiation code. A BIC table preferably contains the following data: bank code (the bank to which the branch belongs), branch code (the mnemonic to which an account will be assigned), BIC code (SWIFT BIC code), detailed BIC information, and initiation indicator (if set, this BIC is the only BIC for instructions, i.e. one set per branch). An ABA table preferably contains the following data: bank code (the bank to which the branch belongs), branch code (the mnemonic to which an account will be assigned), ABA code (SWIFT ABA code), detailed ABA information, and initiation indicator (if set, this ABA is the only ABA for instructions, i.e. one set per branch).

Account numbers are set up for the hub and web applications in two steps. The first step defines the account by simply associating a number to a branch code and an enterprise code. At this point, no user groups have access to it, and no transactions can be created against it. An account can belong to only one enterprise code and one branch code. Once an account has been created and the required unique enterprise and branch codes have been associated with the account, CAO, CSU and CEU user groups to allow CU ownership may access the account. Only CEU and CU user groups may own accounts.

Figure 25:
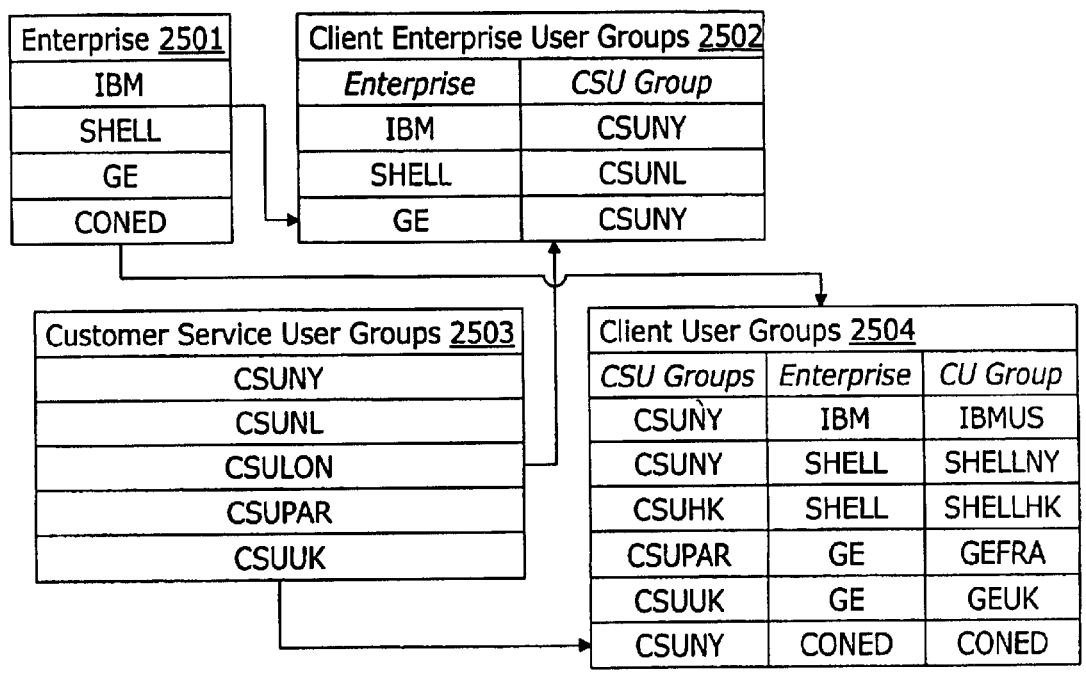
FIG. 25 is a relationship diagram illustrating an exemplary user group configuration in one embodiment of a financial transaction system consistent with the present invention.
Figure 26:
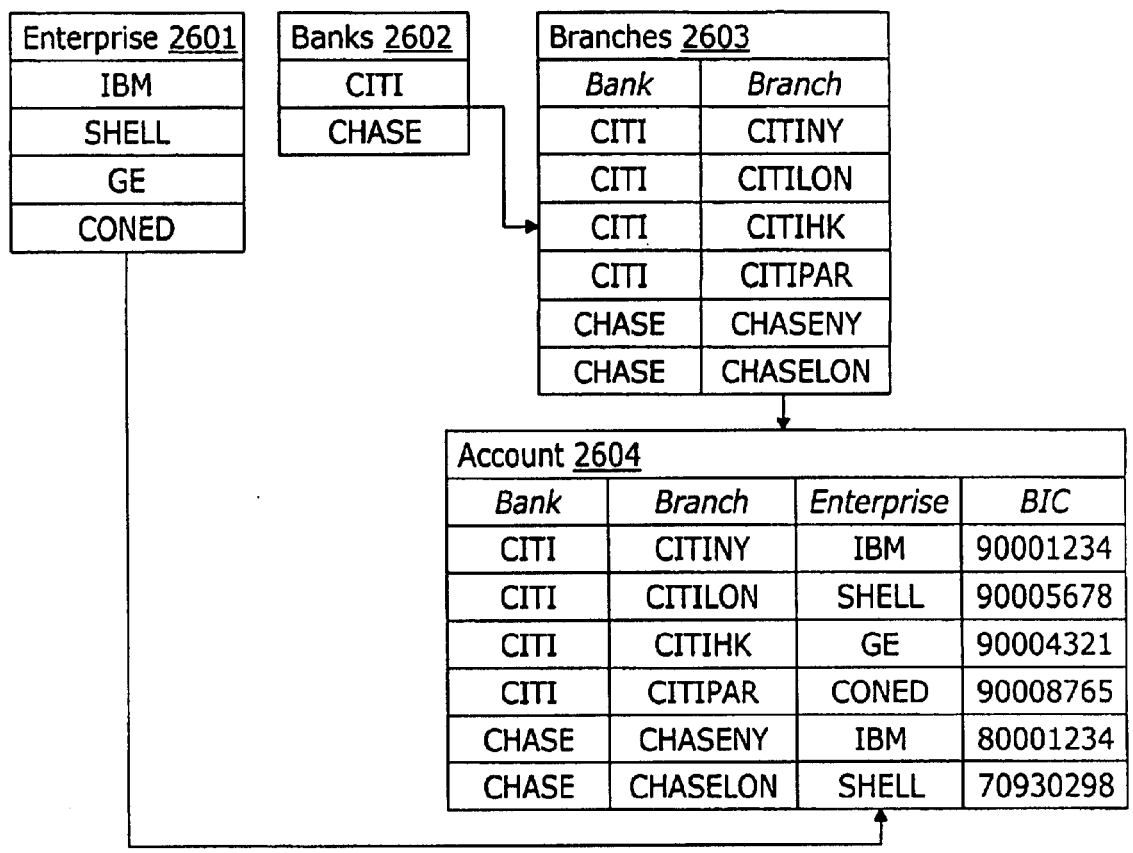
FIG. 26 is a relationship diagram illustrating an exemplary account configuration in one embodiment of a financial transaction system consistent with the present invention.
Figure 27:
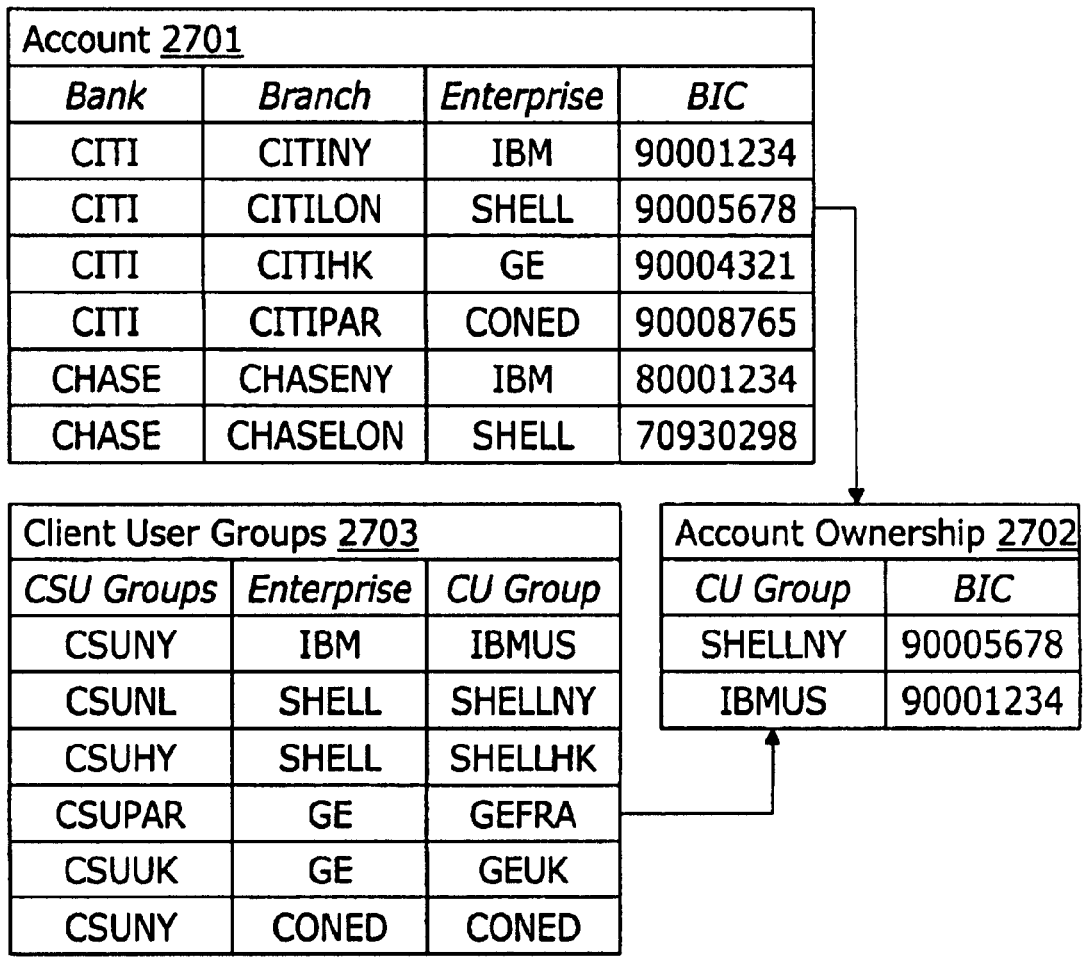
FIG. 27 is a relationship diagram illustrating an exemplary account ownership configuration in one embodiment of a financial transaction system consistent with the present invention.
Figure 28:
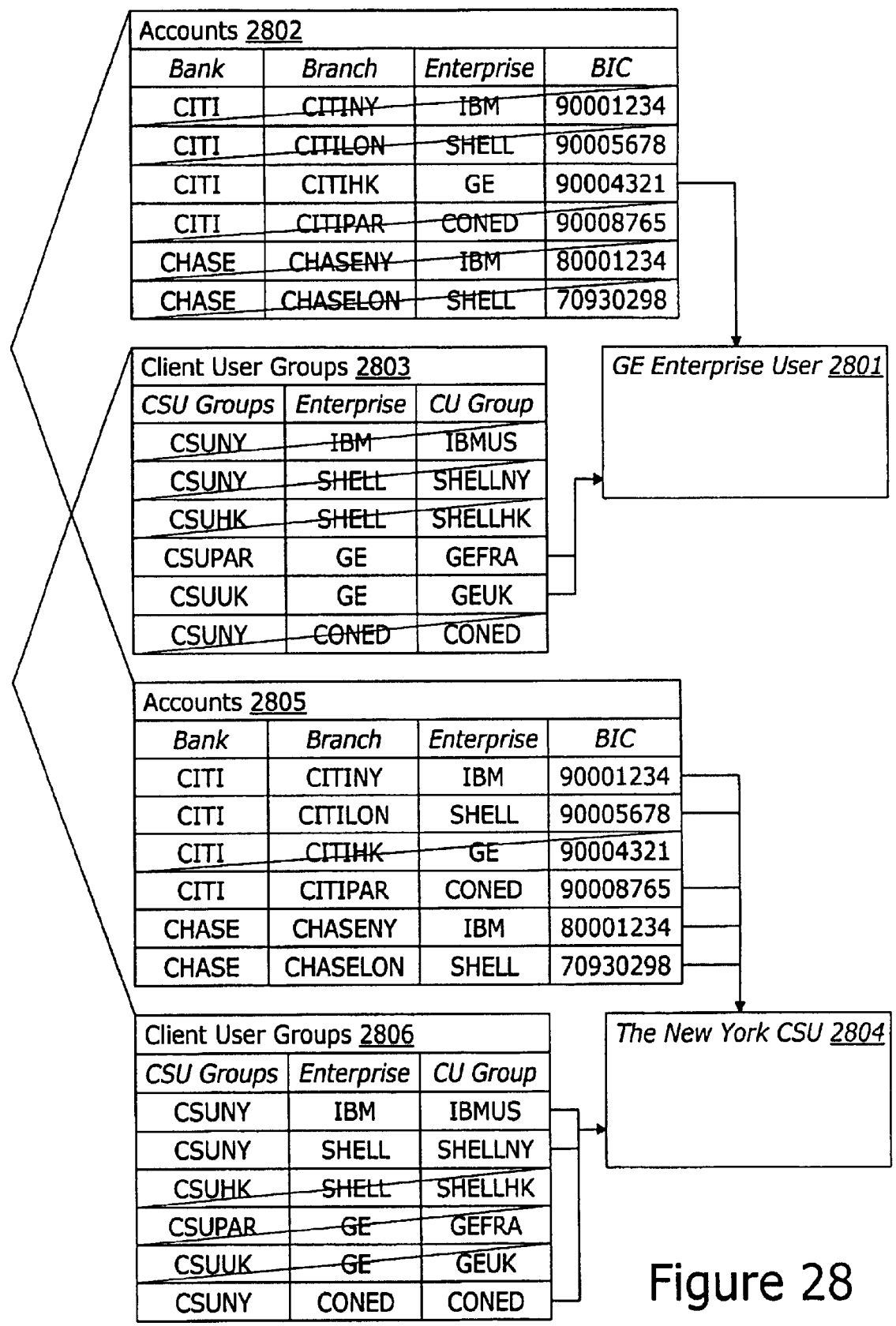
FIG. 28 is a relationship diagram illustrating an example of access rights to account records and user group records in one embodiment of a financial transaction system consistent with the present invention.

FIGS. 25–28 illustrate an exemplary user group and account configuration in one embodiment of the present invention. FIG. 25 illustrates the user group configuration in this example. Each of four enterprises 2501 shown is represented by an enterprise code (i.e. IBM, SHELL, GE, CONED) representing a CEU. In this example, three of the CEU groups (IBM, SHELL, GE) are associated 2502 with CSUs CSUNY, CSUNL, and CSUNY, respectively, which belong to a larger set of CSUs 2503. The CSU groups and associated enterprises are associated 2504 with CU groups IBMUS, SHELLNY, SHELLHK, GEFRA, GEUK, and CONED. FIG. 26 illustrates the account configuration in this example. Each of four enterprises 2601 shown is represented by an enterprise code (i.e. IBM, SHELL, GE, CONED) representing a CEU. Two banks 2602 are represented by bank codes CITI and CHASE. Codes for a plurality of branches are associated 2603 with each of the two banks 2602. BIC codes are associated 2604 with the corresponding bank, branch, and enterprise. FIG. 27 illustrates the account ownership configuration in this example. The administrator draws ownership 2702 from an account 2702 (via the BIC reference number) and a client user group 2703 (via the CU group code). Selection of accounts to the CU group is limited to those accounts linked to the same enterprise of the CU group. When a CSU user group creates account ownership records, it can only see those CEUs or CUs that belong to that CSU. User groups can only be matched to accounts if the enterprise codes match, i.e. once a user group is chosen, only accounts for that same enterprise can be associated with that user group. As FIG. 28 illustrates, when a CEU user 2801 is creating ownership records, it can only see account records and user group records belonging to that enterprise. In the example shown, a GE CEU user 2801 can only see GE enterprise client user groups 2803 and accounts 2802. In this same example, a New York CSU 2804 can only see CSUNY CSU groups 2806, but can also see all accounts 2805 related through those enterprises. Thus, the branch code, the account number, and the user group together embody a unique entry in the account ownership table.

Audit Trail

In a preferred embodiment, an audit trail log is provided, which is operable to store successful and/or unsuccessful user logon attempts, user maintenance activities, security group maintenance activities, and/or the originating IP address. One or more audit trail tables may also be provided to store some or all activity performed on the hub server, the web server, and/or the database server by web application users, as well as hub administrators and operators. An audit trail table preferably contains the following column definitions: user group (the user group logged on to perform the action), user group type (CAO, CSU, CEU or CU), user ID (the user ID logged on to perform the action), date and time of when the action occurred, action code, action qualifier, and action details. The action code, action qualifier, and action details in one embodiment of the invention are set forth in the table of FIG. 29. FIG. 29 shows for each action code the 2901 associated description of the action 2902, action qualifier 2903, and details 2904.

Secure Access

Figure 30:
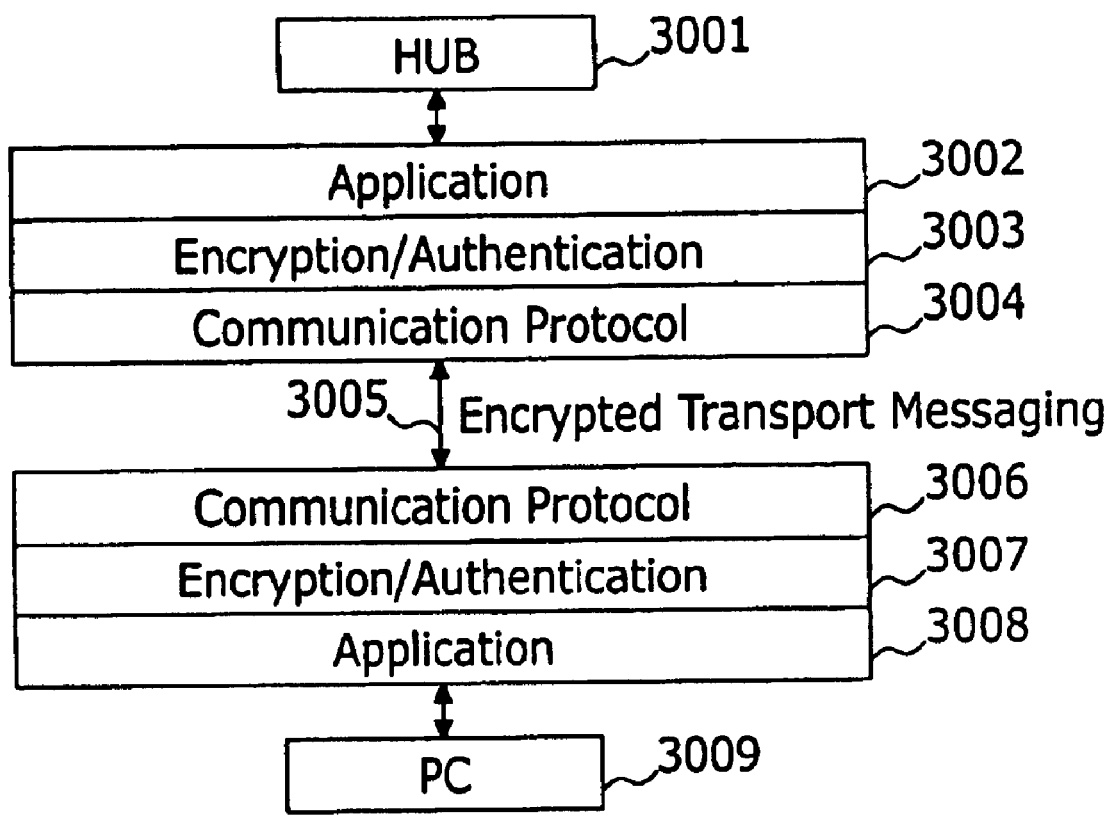
FIG. 30 is a flow diagram illustrating the data flow including security measures between the hub and the end user employing a PC and a web browser in one embodiment of a financial transaction system consistent with the present invention.

In a preferred embodiment of the present invention, data is transported using encryption and authentication, including protocols such as Netscape's Secure Socket Layer (SSL) or secure HTTP. FIG. 30 shows the data flow including such security measures 3002–3008 between the hub 3001 and the end user 3009 employing a PC and a web browser in one embodiment of the invention. Data is passed from the hub 3001 to the client/end user 3009 first via the appropriate application 3002 on the hub, then through a encryption and/or authentication process 3003, and then is translated into the necessary communication protocol 3004, for transmission 3005 (i.e. encrypted transport messaging) to the end user. On the client/end user 3009 end, the data is received via communications protocol 3006, passed to the unencryption and authentication process 3007, after which it is sent to an application 3008 for access by the end user 3009. The authentication method used can be any method of verifying the identity of a user or a component of the invention and can include a security mechanism such as one or more of a digital signature, a PIN number, a password, a smart card, or a "master" or "challenge" key. In one embodiment of the invention, an XML script creates a Java applet which monitors the active application and interacts with a separate security server residing within the application server. The Java applet is configurable to interrupt the current application to prompt for authentication, such as by a digital signature, a PIN number, a password, or a master key, and to communicate with the security server to effect the authentication. If the security operation is successful, the application continues without interruption; otherwise, the application is terminated according to the XML script. Alternatively, the foregoing process or a part thereof may be used for transferring data between any two components in an embodiment of the present invention, including those external to the invention, such as an end user, a client, a financial institution, a back office, an administrator, an e-mail or fax recipient, or a server. One or more of the foregoing security operations may be implemented using application security middleware, such as Ubizen's MultiSecure™ ETS, Multi-Secure™ ASE, or MultiSecure™ WAC.

Client/User Web Interface and Operation

Figure 33:
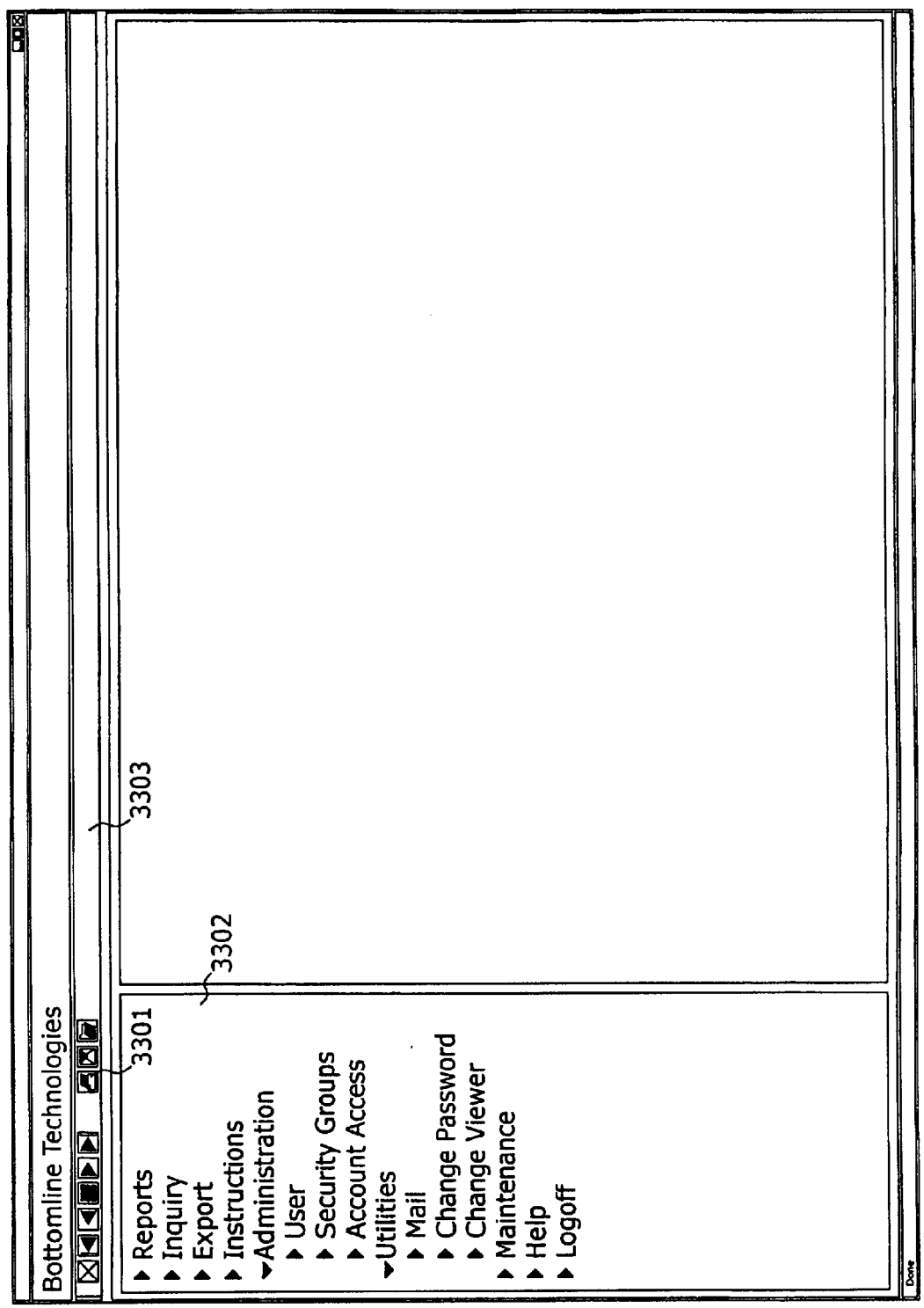
FIG. 33 is an exemplary screen view of a web browser interface in one embodiment of a financial transaction system consistent with the present invention.
Figure 34:
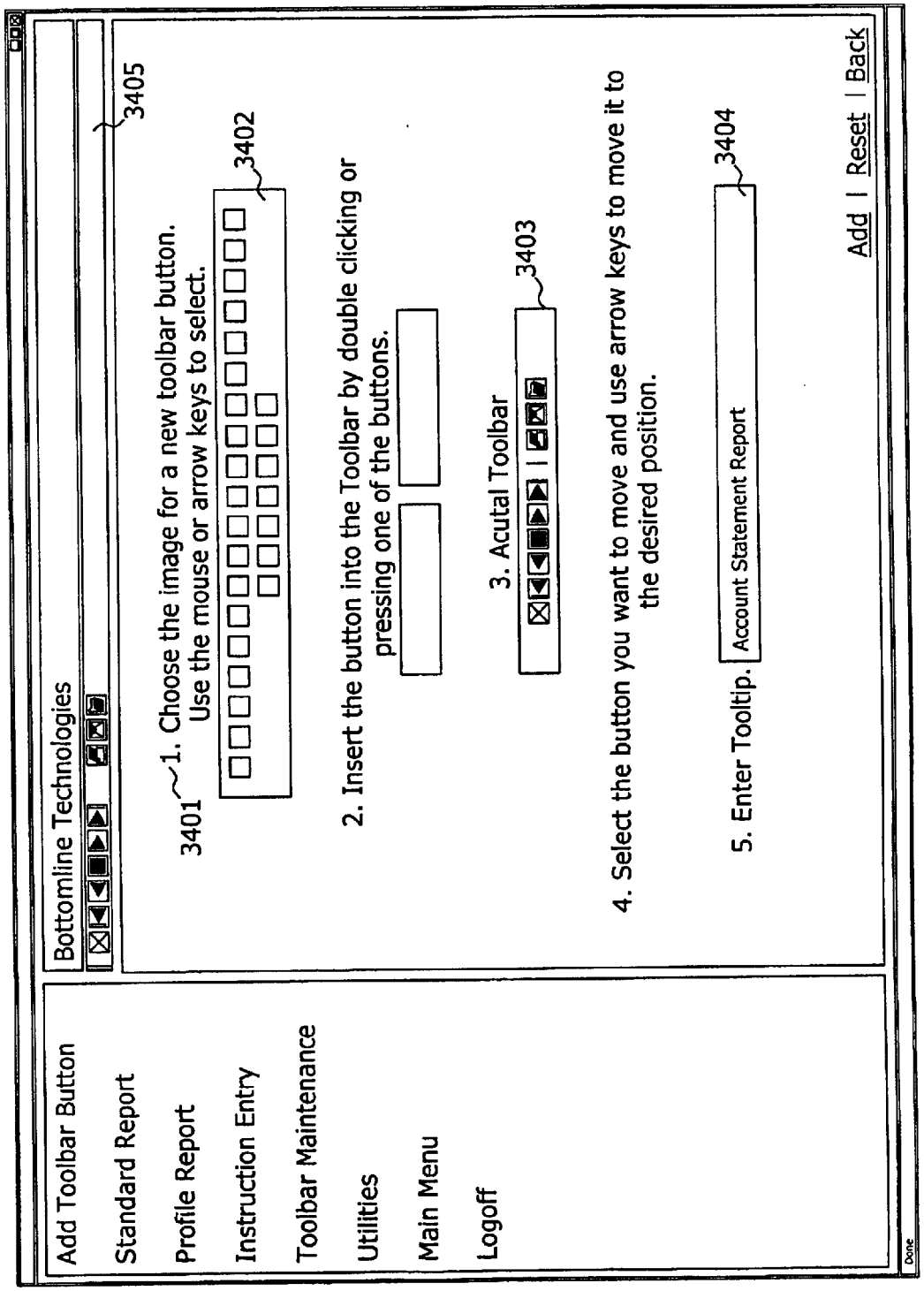
FIG. 34 is an exemplary screen view of a toolbar customization module in one embodiment of a financial transaction system consistent with the present invention.

Access by the end user client is preferably via a web browser interface. FIG. 33 is an exemplary web browser interface in one embodiment of the invention. In this example, once a user is authenticated, either through stand-alone logon or through a single-logon multi-application web site monitor, an interface as shown in FIG. 33 appears, including a customizable, expandable menu 3302 and a plurality of user-definable icons 3301 on a toolbar 3303. The icons 3301 allow a user direct access to specific transactions and reports, and the toolbar 3303 is customizable, so that each user can specify the most often performed functions to be readily invoked, including standard reports, transaction entry screens (e.g. create a Fed Wire transfer), and profile reports (i.e. reports that have customized data filters and sorts to meet specific periodic reporting requirements). In a preferred embodiment, a toolbar customization module 3401, as shown in FIG. 34, is provided. The user can select from a series of bitmaps (or icons) 3402 appropriate to associate with the desired system function, to be placed on the toolbar 3405. The user can then place the selected bitmap in the appropriate location on the toolbar model 3403 and specify a "tool tip" 3404 (a text statement explaining to the user the underlying function associated with the bitmap).

Figure 35:
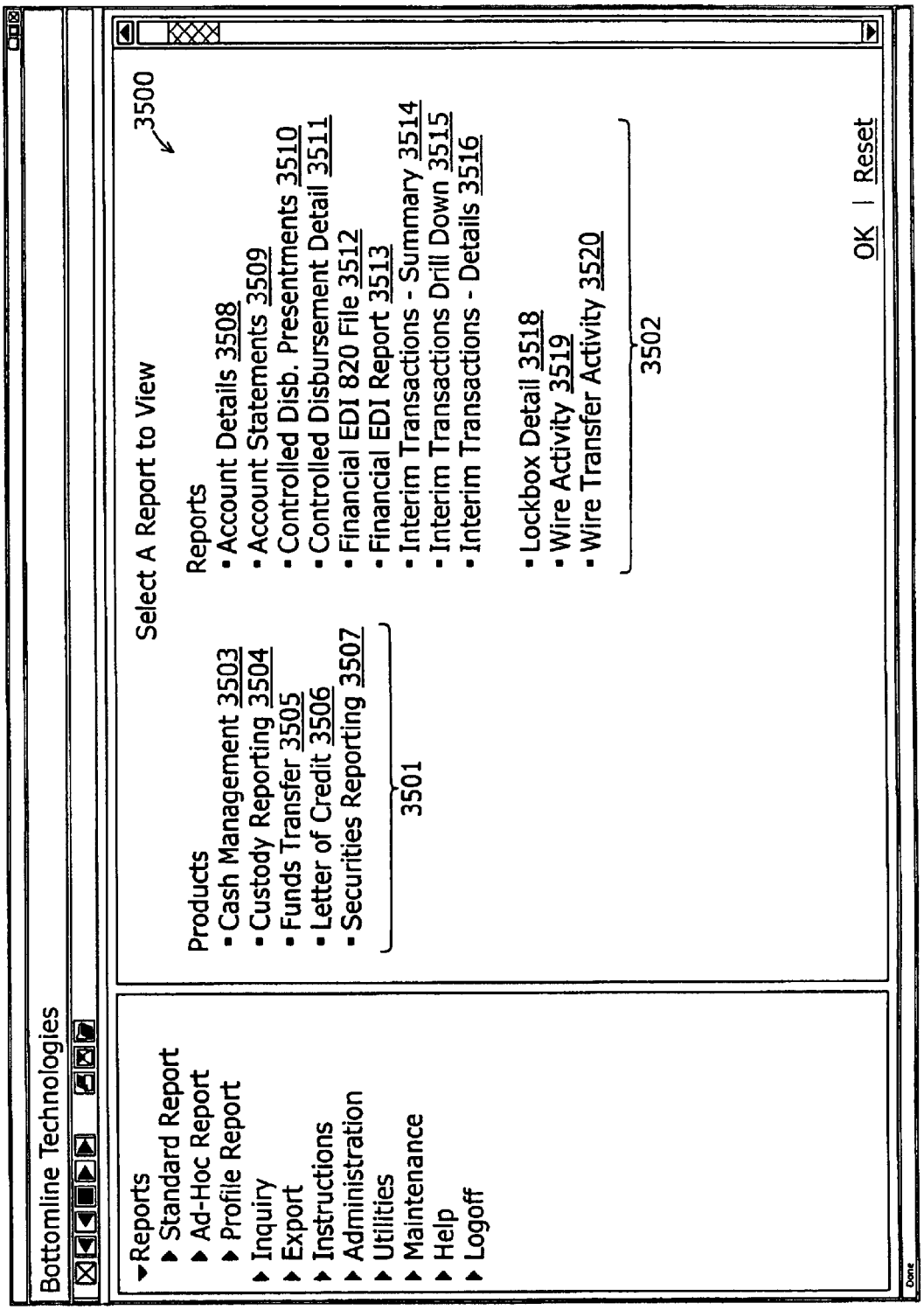
FIG. 35 is an exemplary screen view of a report view menu in one embodiment of a financial transaction system consistent with the present invention.
Figure 38:
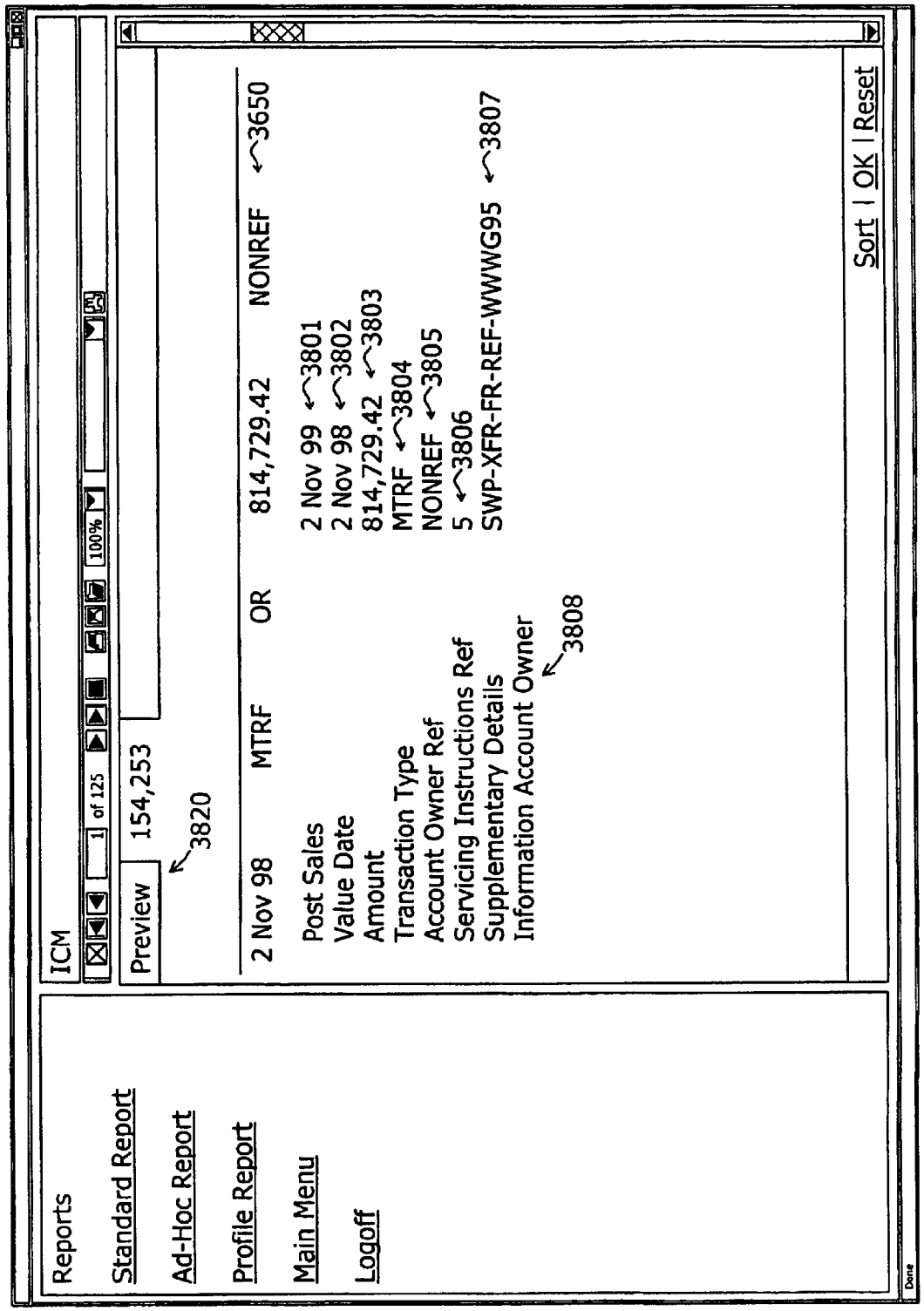
FIG. 38 is an exemplary screen view of a transaction detail view in one embodiment of a financial transaction system consistent with the present invention.
Figure 40:
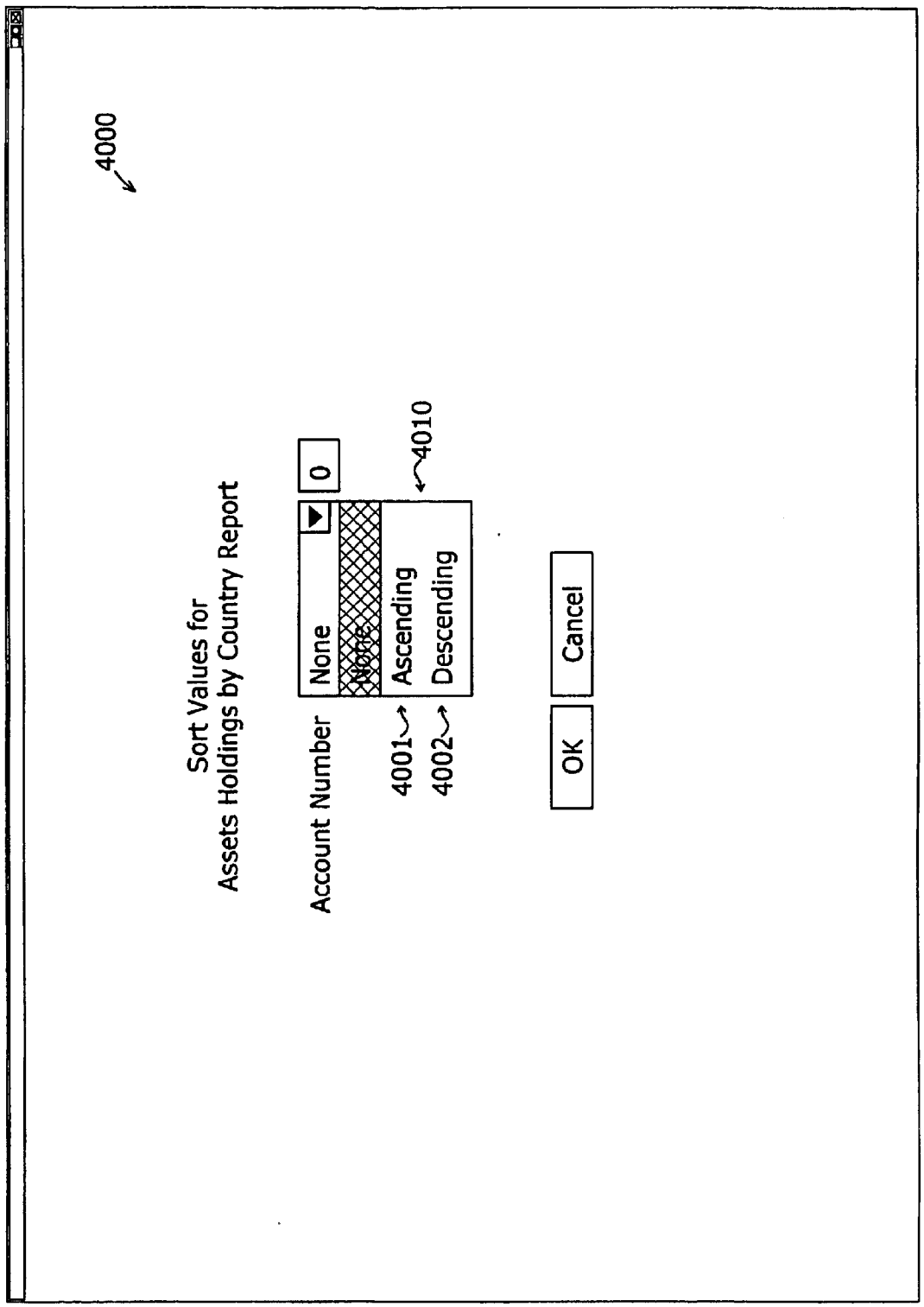
FIG. 40 is an exemplary screen view of a sort selection view in one embodiment of a financial transaction system consistent with the present invention.

Reports for viewing, printing, saving and/or downloading may be generated using the browser interface. In a preferred embodiment, three categories of reports may be generated: standard reports, ad hoc reports, and profile reports. In the standard report, the sort and selection criteria are automatically set for the type of report selected by the client. For example, if the user chooses a "wire activity" report, only current day transactions might be selected for output as a report, depending on predetermined sort and filter criteria. Ad hoc reports allow customization of sort and selection criteria "on the fly", thereby allowing the client to query large quantities of information and specify filter and sort criteria tailored to the search requirements (e.g. amount, transaction number, customer name, etc.). For example, a client may elect to include in the report all checks from the previous day sorted in descending sequence. In the profile report, the client can save ad hoc report settings for later sorting and searching based on the same criteria, thereby eliminating the need to specify customized filtering and sorting criteria each time the same kind of report is needed. As can be seen in FIG. 35, in report view menu 3500, reports 3501 and products 3502 available to the client are set up by the administration system for each client, and only those products 3502 and reports 3501 designated for that client appear as menu options. In this example, products 3502 include cash management 3503, custody reporting 3504, funds transfer 3505, letter of credit 3506, and securities reporting 3507. Reports 3502 include account details 3508, account statements 3509, controlled disbursement presentments 3510, controlled disbursement detail 3511, financial EDI 820 file 3512, financial EDI report 3513, interim transactions summary 3514, interim transactions drill-down 3515, interim transactions details 3516, LMCS report 3517, lockbox detail 3518, wire activity 3519, and wire transfer activity 3520. FIG. 36 illustrates an exemplary interim transaction summary report 3514, including report date 3600, company ID 3601, company name 3602, account number 3603, currency 3604, and for each transaction listed, the value or post date 3605, transaction type 3607, amount 3608, and account owner's reference 3609. FIG. 37 illustrates an exemplary summary funds transfer status report 3700, including report date 3720, transaction/reference number 3701, transaction type 3702, transaction date 3703, payment method 3704, validation date 3705, branch 3706, account number 3707, beneficiary name 3708, account title 3709, amount 3710, and currency 3711. In a preferred embodiment, the client can "drill down" from a summary report to view the associated underlying transaction details or updated information, which action may preferably be performed by the client double-clicking a particular row or entry on the summary view screen (e.g. row 3650 of FIG. 36). FIG. 38 illustrates an exemplary "drill down" or transaction detail view, including the original row 3650 of information from the summary view, post date 3801, value date 3802, amount 3803, transaction type 3804, account owner reference 3805, servicing institution's reference 3806, supplementary details 3807, and information to account owner 3808. A selection button 3820 is provided to navigate the client back to the summary report. As FIG. 39 shows, the client can click on a search button 3901 to search a report 3900 for a text string 3902 (in this case "4567"), wherein each occurrence of the string is annotated by highlighting, underlining, bolding, color change, bordering by a rectangle 3903, or otherwise. A sort button 3904 is provided to the user to perform ad hoc sorts and/or selections from a sort view, which presents each sortable element within the report, with the option to force a presorting of data for presentations. FIG. 40 shows an exemplary sort selection view 4000, wherein a user can choose 4010 to view asset holdings by country based on either an ascending 4001 or descending 4002 account number.

Figure 41:
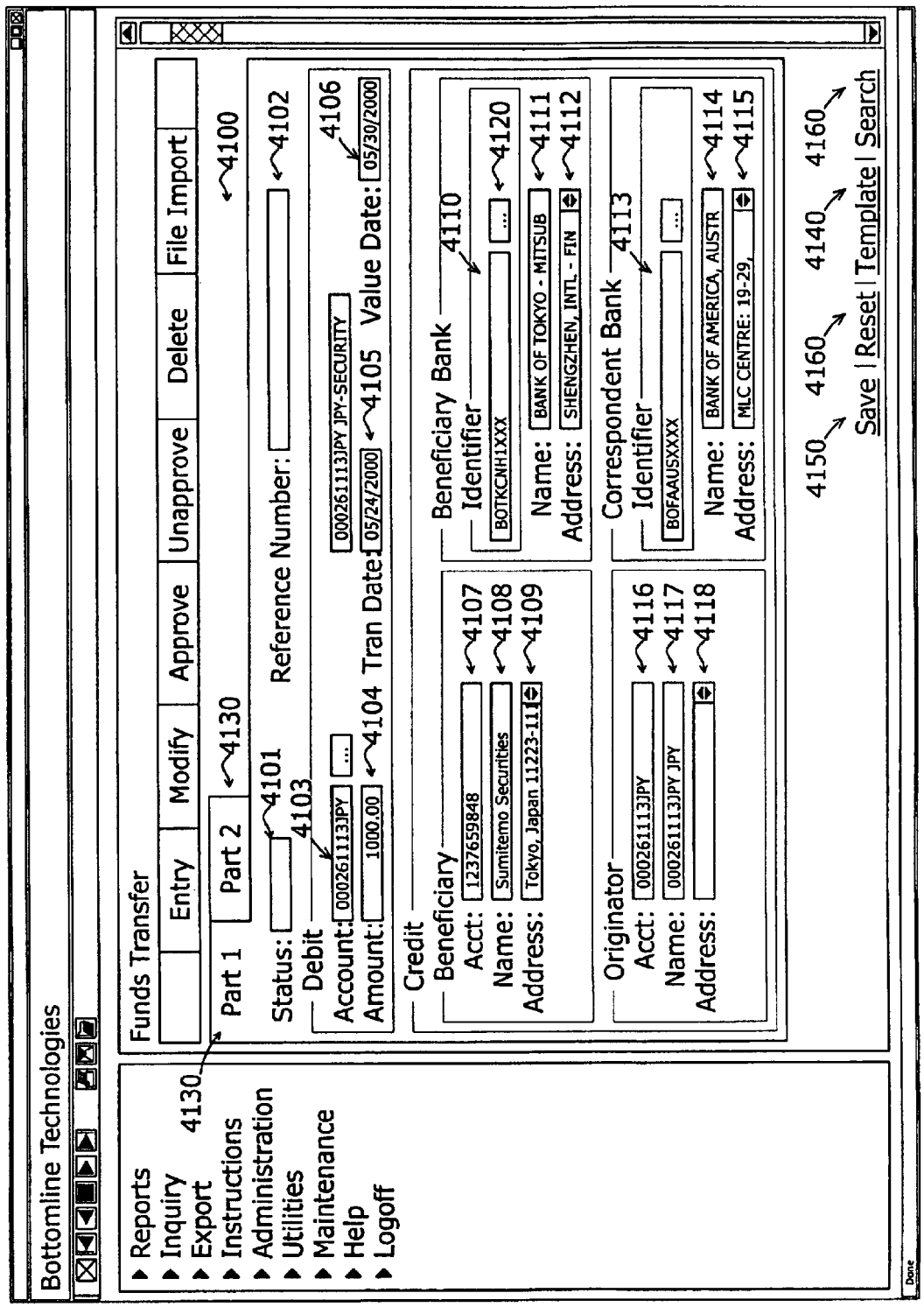
FIG. 41 is an exemplary screen view of a payment transaction entry interface in one embodiment of a financial transaction system consistent with the present invention.

The end user client may enter, modify, delete, approve, unapprove, and/or reject transactions or instructions using the web interface, either by manually entering information or by uploading files via the web interface. Preferably, a customizable payment transaction entry screen is provided, as shown in FIG. 41, wherein once a user has chosen a transaction type, the user is presented with an interface 4100 which provides for the application of bank back-office or straight through processing rules (including, e.g., holiday checks required to prevent transactions from failing within the financial institution clearing system). In one embodiment of the invention, the exemplary transaction interface 4100, as shown in FIG. 41, includes a plurality of fields for entering transaction data, including status 4101, reference number 4102, originating account number 4107, originator name 4117 and address 4118, correspondent bank identifier (e.g. bank code or ABA number) 4113, bank name 4114, and bank address 4115. For credit transactions; fields provided for data entry include account number 4107, beneficiary name 4108 and address 4109, beneficiary bank identifier 4110, and bank name 4111 and address 4112. For debit transactions, fields provided for data entry include account 4103, amount 4104, transaction date 4105 and value date 4106. Also preferably included may be at least one button 4120 which can be used for "popping up" a "pick list" of valid entries from which the user may select, rather than requiring the user to enter the characters comprising the data of a field manually. Additionally, in a preferred embodiment, the end user is not required to enter data for all of the fields, as some of the fields will be automatically supplied by the application server. For example, one the user has selected the identifier 4113 of the beneficiary's bank, the name 4114 and address 4115 of the beneficiary's bank are automatically displayed in interface 4100. A plurality of tabs 4130 may optionally be provided to support complex transaction types requiring the entry of more data than can fit in one screen view at a time, such as letters of credit and securities transactions. In one embodiment of the invention, the user can choose to create a new transaction from scratch, from a prior transaction, or from a template accessed by button 4140, previously saved using button 4150. The user may clear all fields using reset button 4160, or my perform a search, accessed by search button 4160.

Figure 42:
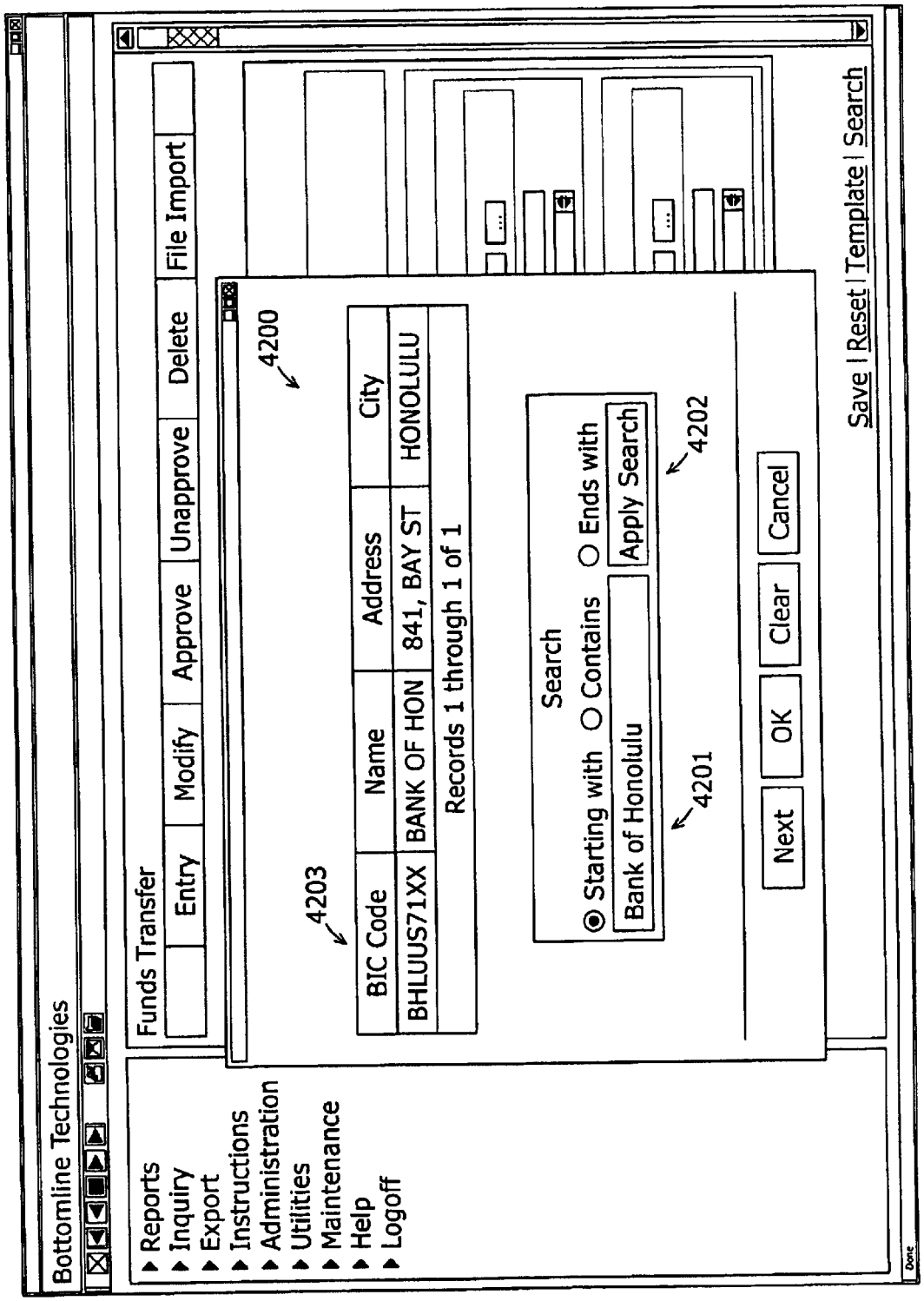
FIG. 42 is an exemplary screen view of a search interface in one embodiment of a financial transaction system consistent with the present invention.

Search functionality is also preferably provided through a web interface, as shown in the exemplary search interface 4200 shown in FIG. 42. Interface 4200 allows the end user client to perform large-scale database lookups for fields and associated interrelationships of accounts, addresses, and other data pertinent to the lookup. In the example shown, a user has searched for "Bank of Honolulu" within the hub database, from among over 60,000 SWIFT BIC directory listings, by entering the string into search field 4201 and pressing the search button 4202. The results are returned in a results view area 4203. Similar searches may be performed on any of the associated fields in which data elements are known. The user may then select from among the results returned 4203 and insert the selection directly into the specific transaction being performed.

Figure 43:
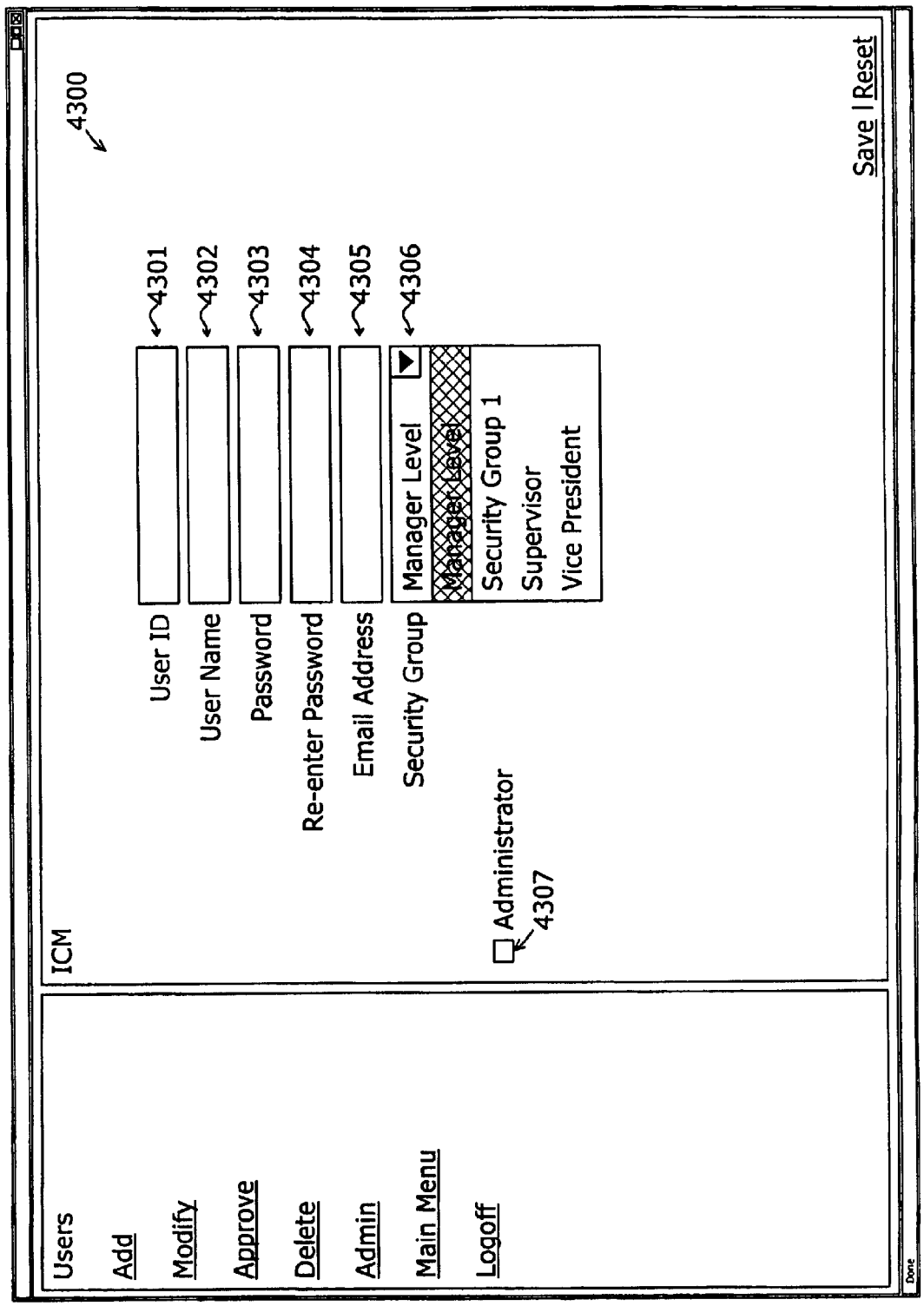
FIG. 43 is an exemplary screen view of a user ID maintenance interface in one embodiment of a financial transaction system consistent with the present invention.
Figure 44:
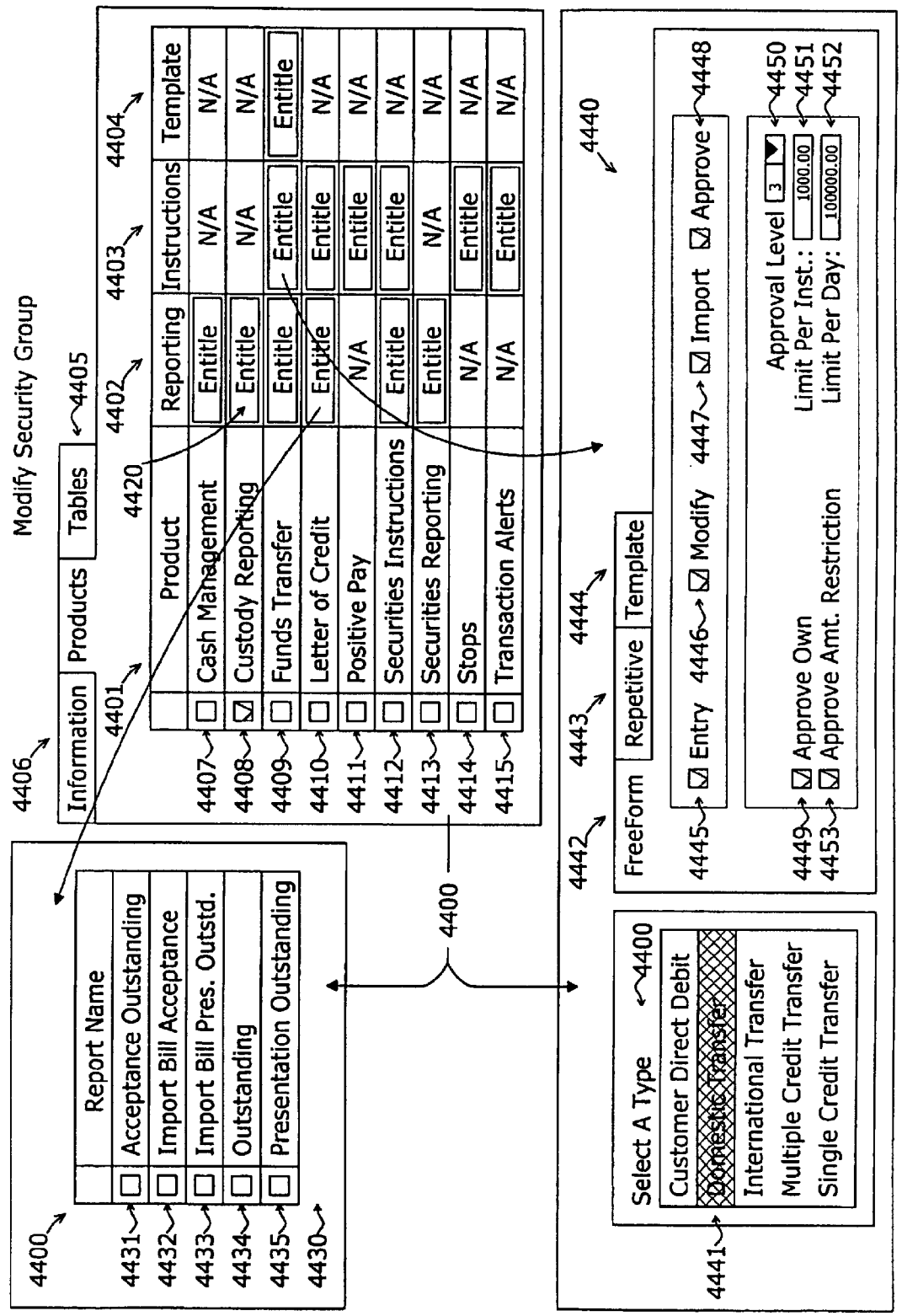
FIG. 44 is an exemplary screen view of a security group maintenance interface in one embodiment of a financial transaction system consistent with the present invention.

In a preferred embodiment of the invention, a user (typically, an administrator) with access rights to modify user IDs, passwords, and/or security groups may also make such modifications via a web interface, or create or delete user IDs, as shown in the exemplary interfaces of FIGS. 43 and 44. FIG. 43 illustrates a user ID maintenance interface 4300 allowing a user with administrative rights to modify fields for another user, including user ID 4301, user name 4302, password 4303, e-mail address 4305, security group 4306, and administrator status 4307. A password verification field 4304 may be provided to ensure correct entry of the password as intended. FIG. 44 illustrates a plurality of screens which are part of the security group maintenance interface 4400 in one embodiment of the invention. For several of a plurality of products 4401, security entitlements for reporting 4402, instructions 4403, and template 4404 access may be selected. Products for which entitlements may be specified include in this example cash management 4407, custody reporting 4408, funds transfer 4409, letter of credit 4410, positive pay 4411, securities instruction 4412, securities reporting 4413, stops 4414, and transaction alerts 4415. Entitlements for access to non-product features, including access to data tables and information functions, may be selected using data tables tab 4405 and information tab 4406. Once a product 4401 and one of reporting 4402, instructions 4403 or template 4404 is selected by an "Entitle" button 4420, the user may then specify entitlement criteria in a submenu, such as report name submenu 4430 or instruction type submenu 4440. The report name submenu 4430 includes the capability to grant a user permission to access one of a plurality of reports, including acceptance outstanding 4431, import bill acceptances 4432, import bill presentations outstanding 4433, outstanding 4434, and presentation outstanding 4435. Instruction type submenu 4440 includes instruction type selector 4441, tabs to select access options for freeform 4442, repetitive 4443, and template 4444 functions, and entitlement selections for entry 4445, modification 4446, import 4447, and approval 4448 functions. Also included are a field for selecting whether a user may approve his or her own transactions 4449, approval level 4450, and whether there is a restriction on approval amount 4453, with fields for the corresponding monetary limit per instruction 4451, and limit per day 4452.

Figure 45:
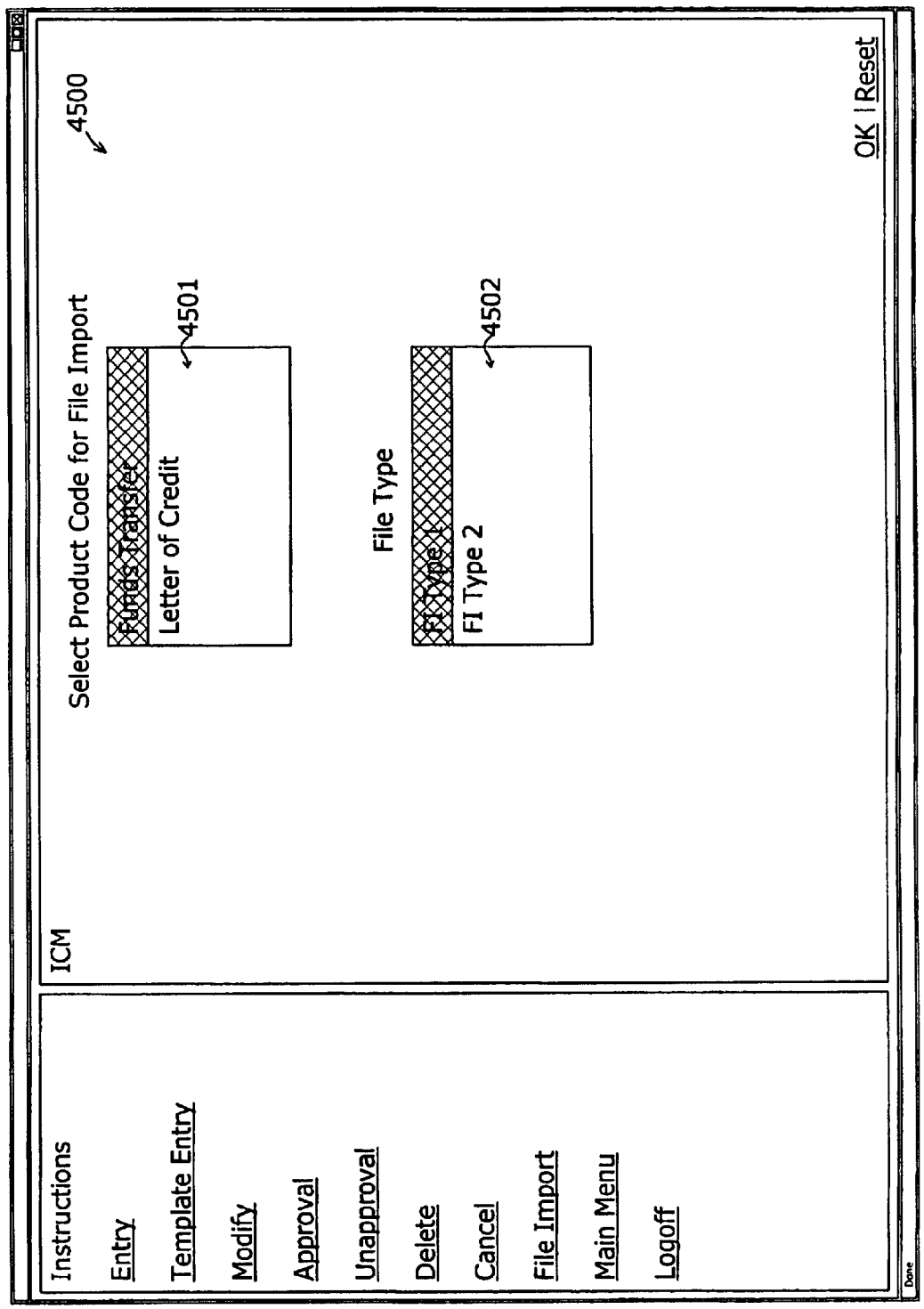
FIG. 45 is an exemplary screen view of a file import interface in one embodiment of a financial transaction system consistent with the present invention.
Figure 46:
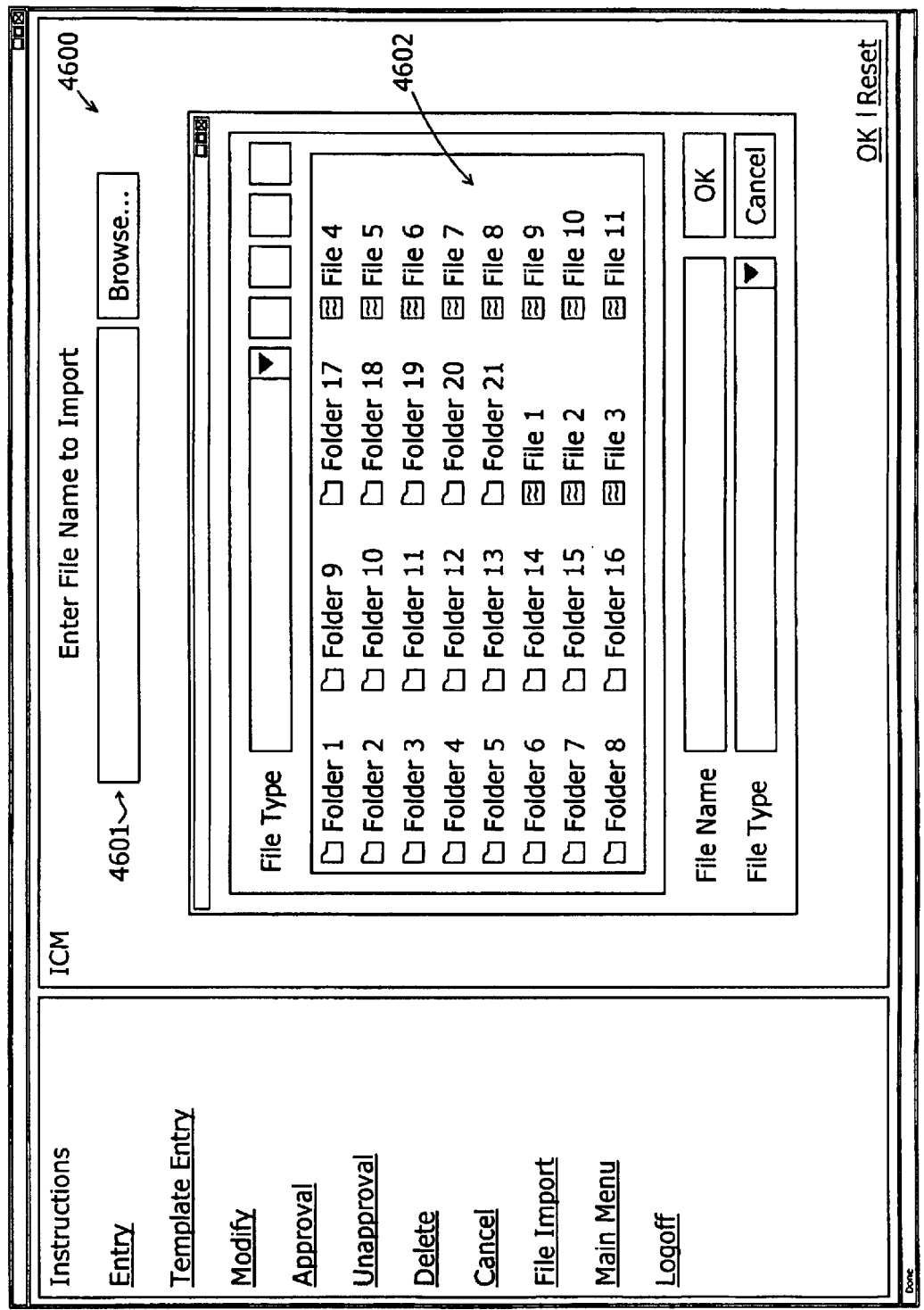
FIG. 46 is an exemplary screen view of a file import filename entry interface in one embodiment of a financial transaction system consistent with the present invention.
Figure 47:
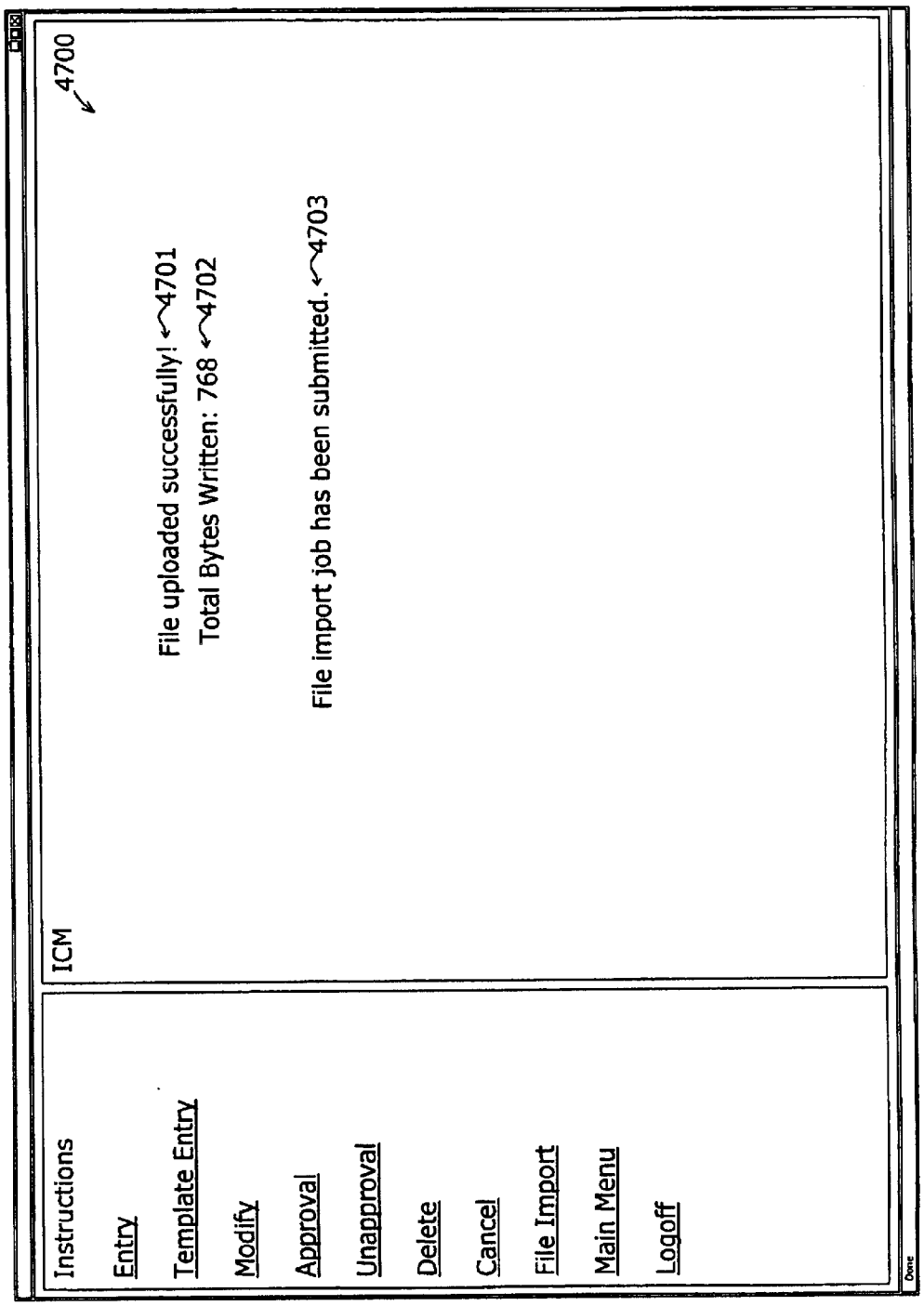
FIG. 47 is an exemplary screen view of a file import confirmation view in one embodiment of a financial transaction system consistent with the present invention.
Figure 48:
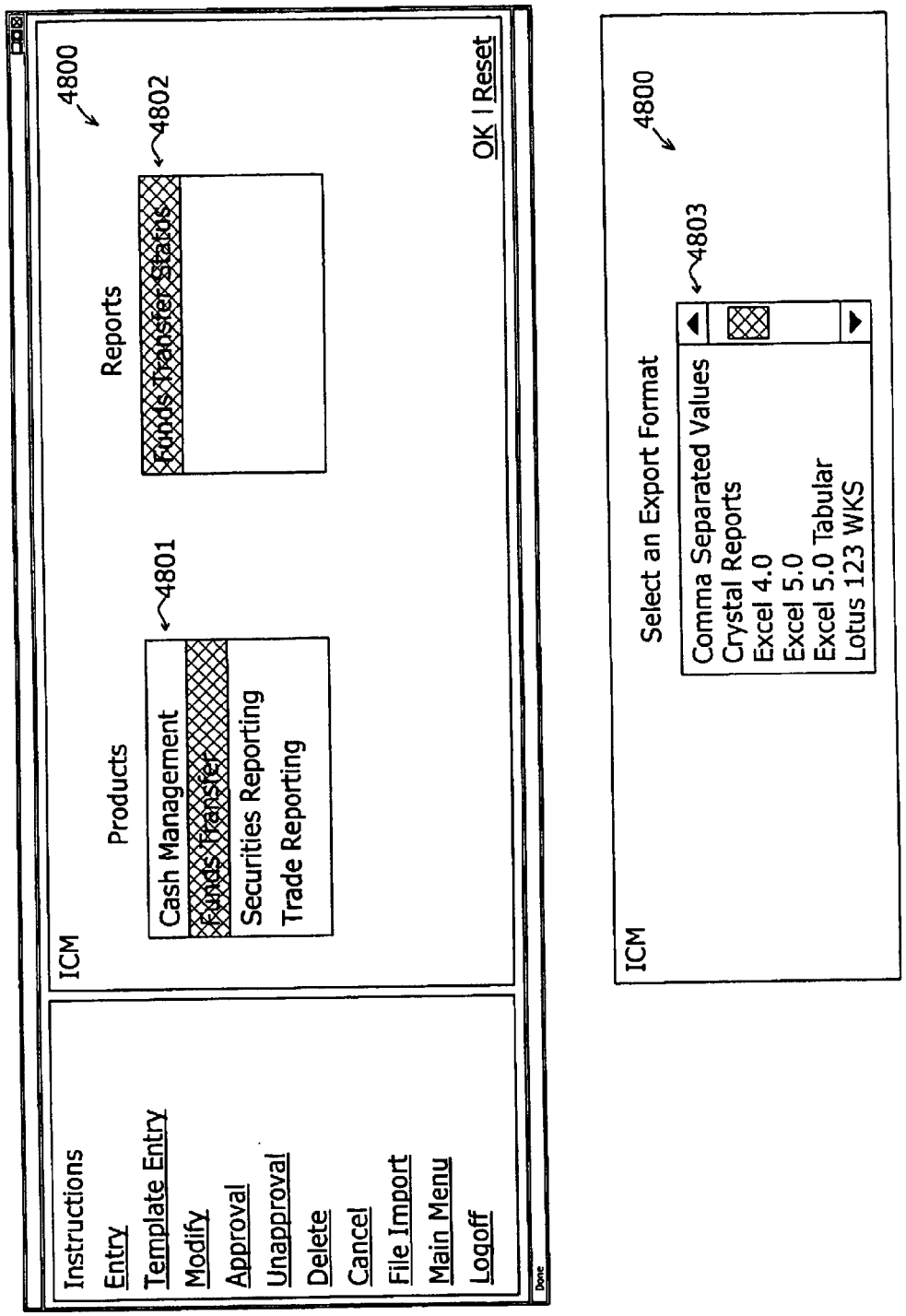
FIG. 48 is an exemplary screen view of a file export interface in one embodiment of a financial transaction system consistent with the present invention.
Figure 49:
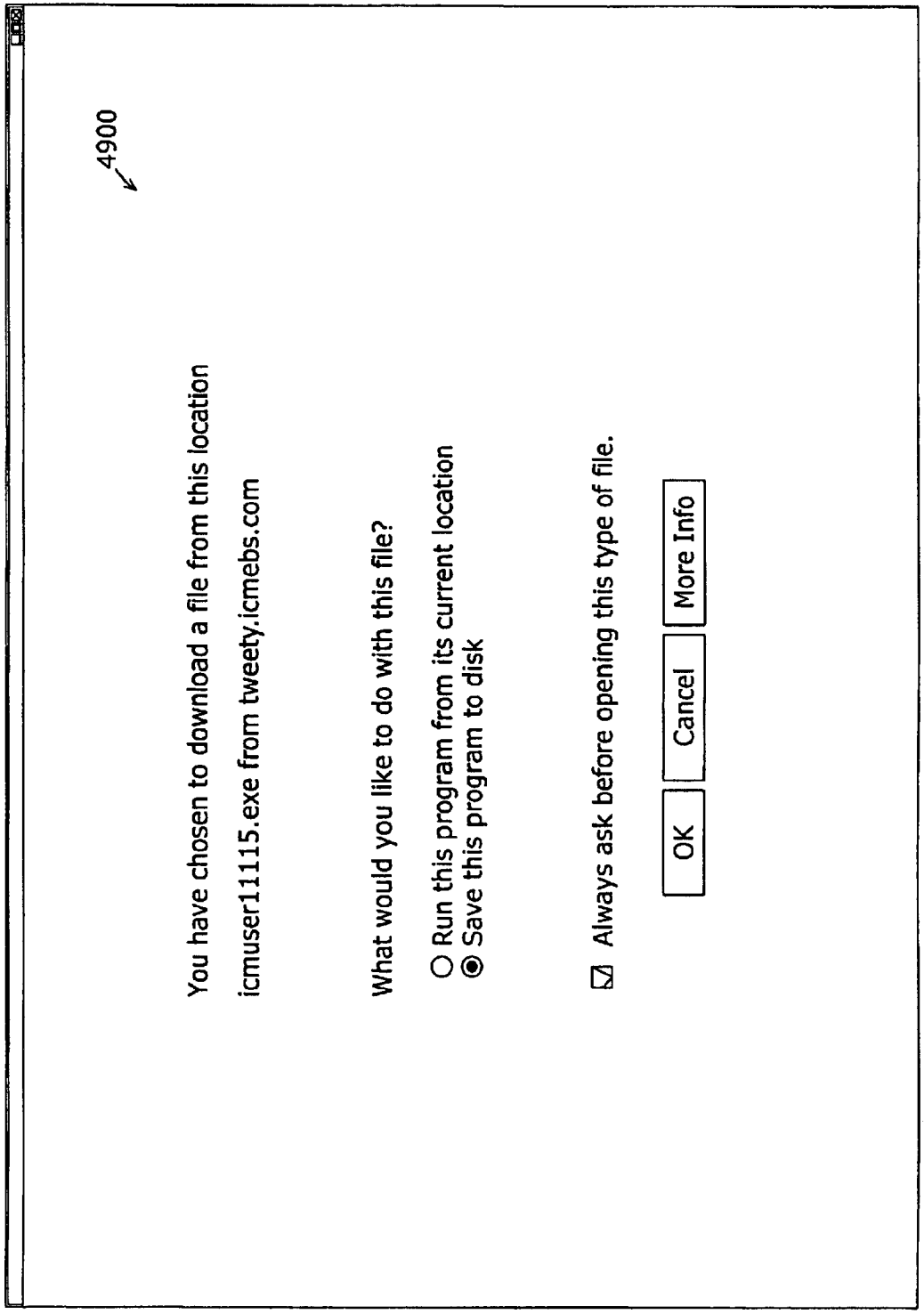
FIG. 49 is an exemplary screen view of a file download interface in one embodiment of a financial transaction system consistent with the present invention.

In addition to manual entry, data entry into the hub may also be performed by uploading or importing a file via the web browser interface. FIG. 45 illustrates an exemplary file import interface 4500 in one embodiment of the invention, wherein product code 4501 and file type 4502 may be selected. FIG. 46 shows file import filename entry interface 4600 in one embodiment of the invention, including filename entry 4601 and/or filename selection interface 4602. FIG. 47 shows file import confirmation view 4700 in one embodiment of the invention, including a success or fail message 4701 and import file size confirmation 4702, as well as confirmation 4703 that the file import job has been submitted to the hub. Import file formats may include delineated, tagged or fixed length. Likewise, data may be exported via a web interface, including data from reports and file layouts. As shown in the example of FIG. 48, using export interface 4800, the user may select a product 4801, a report or file layout 4802, and an export file format 4803. The export file is preferably compressed into a self-extracting format (such as a PKZIP-generated executable file) and made available for download by the user over a secure http (shttp) or SSL transport via an interface 4900 as shown in FIG. 49. After download, the client must simply double-click the "zipped".exe file, whereby the report or other file is extracted for further processing by the client, or for integration into an application, such as a spreadsheet.

Figure 50:
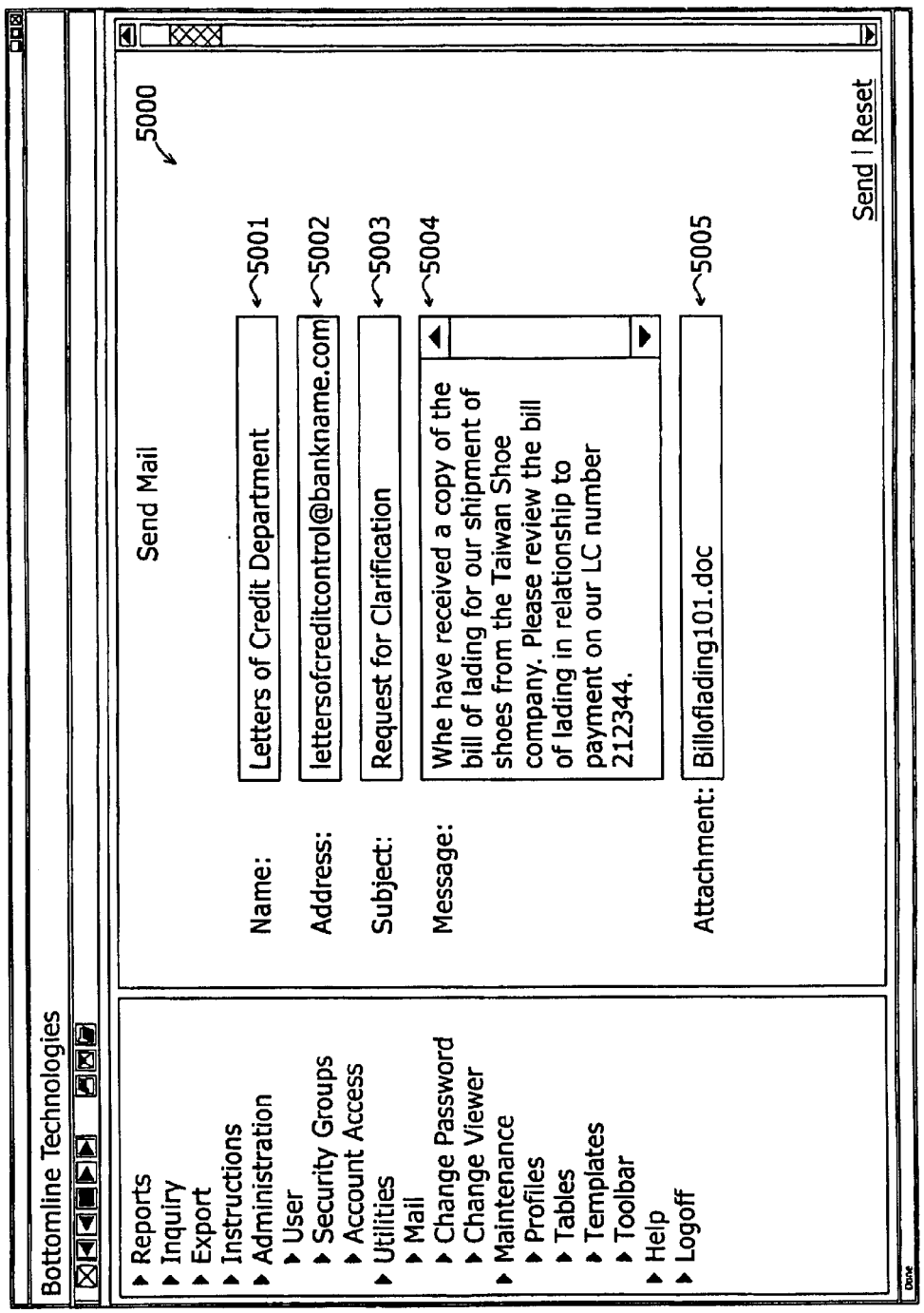
FIG. 50 is an exemplary screen view of an e-mail interface in one embodiment of a financial transaction system consistent with the present invention.
Figure 51:
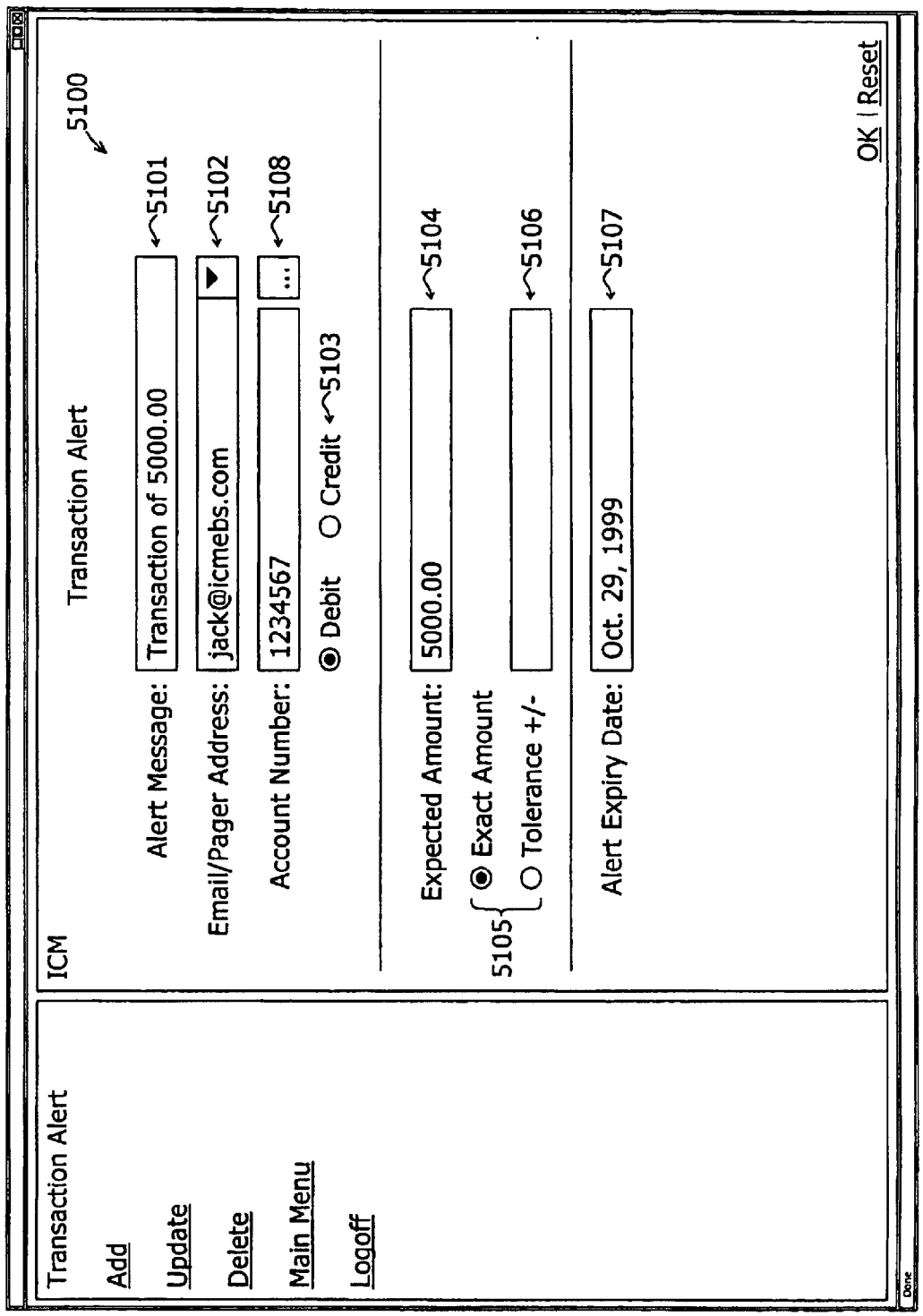
FIG. 51 is an exemplary screen view of a transaction alert interface in one embodiment of a financial transaction system consistent with the present invention.

In a preferred embodiment, an e-mail function is also provided via a web browser, whereby ad hoc non-application related communication may be exchanged between users, including, e.g., predefined personnel, end users or clients, and financial institution personnel. A sample e-mail interface 5000 is shown in FIG. 50, including fields for entry of recipient name 5001 and e-mail address 5002, message subject 5003, message text 5004, and optional binary attachment 5005. Additionally, a transaction alert mechanism may be provided, wherein an alert message may be sent via fax, e-mail, or pager when one or more transactions meeting particular specified criteria occur. A transaction alert interface 5100 in one embodiment of the present invention is shown at FIG. 51, wherein a user may specify an alert message 5101, e-mail or pager address 5102, account number 5108, credit or debit transaction 5103, expected amount 5104, exact amount or tolerance selection 5105, tolerance amount 5106, and alert expiration date 5107.

While the terms "hub" and "hub server" are used generally herein with reference to a particular component of a financial transaction system consistent with the present invention, these terms, as used herein, may also refer to a plurality of hardware and/or software components within a financial transaction system, including the entire financial transaction system. It should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention as defined only by the hereinafter appended claims.

What is claimed is:

1. A financial transaction system comprising:

at least one financial institution transaction processing system;

at least one hub server operable to transmit data to and receive data from said financial institution transaction processing system;

at least one web server operable to transmit data to and receive data from at least one user via an open network, said web server operable to transmit data to and receive data from said hub server;

at least one database server operable to transmit data to and receive data from said hub server and said web server, said database server capable of storing data in a hub database;

said hub server operable to map data received from said financial institution into mapped data and load said mapped data onto said hub database;

said web server operable to:
receive said mapped data from said hub database;
transmit said mapped data onto said user over the open network;
receive a financial transaction message from said user over the open network, the financial transaction message relating to said mapped data conforming to one of a plurality of transaction type profiles;
select a unified transaction format based on the transaction type profile of the transaction;
generate a unified transaction message by converting the transaction message to the unified transaction format;
provide the unified transaction message to the database server for storage in the hub database and to the hub server for delivery to the financial institution transaction processing system;

said hub server further operable to:
look up a financial institution transaction format associated with both the transaction type profile and the financial institution processing;
reformat the unified transaction to the financial institution transaction format; and
route said reformatted transaction to the financial institution transaction processing system.

2. The financial transaction system of claim 1, further comprising a data archive, said archive operable to remove data from said hub database and/or said application database, index said data, and store said data for future retrieval.

3. The financial transaction system of claim 2, wherein said web server further comprises a mechanism allowing said user to at least one of enter and modify the financial transaction message at a time prior to a transaction execution date specified in the financial transaction message, such mechanism performing the steps of:

receiving an instruction message to at least one of enter, modify, and delete the financial transaction message, the instruction message specifying the financial transaction message;

generating a modified unified transaction message combining: i) the unified transaction message corresponding to the specified financial transaction message; and ii) the instruction message; and storing the modified unified transaction message in the application database.

4. The financial transaction system of claim 3, wherein said web server is operable to require approval by a predetermined number of remote approvers prior to providing the unified transaction message to the hub server, the web server performing the steps of:

determining each remote approver required to approve the financial transaction message based on an identity of the user providing the financial transaction message and the transaction type profile;

duplicating the unified transaction message in an approval queue for each remote approver;

receiving an instruction to execute said transaction from each remote approver;

storing each instruction to execute said transaction in the hub database;

routing the unified transaction message to the hub server only after an instruction to execute the transaction has been approved by each remote approver.

5. The financial transaction system of claim 4, wherein said web server is operable to prevent processing of a financial transaction message until the execution date specified in said financial transaction message matches the current date by routing the unified transaction message to the hub server only when the specified execution date matches the current date.

* * * * *